United States Patent
Kim et al.

(10) Patent No.: US 9,930,679 B2
(45) Date of Patent: Mar. 27, 2018

(54) METHOD FOR REDUCING INTERFERENCE IN WIRELESS COMMUNICATION SYSTEM SUPPORTING DEVICE TO-DEVICE COMMUNICATION AND APPARATUS FOR THE SAME

(71) Applicants: LG ELECTRONICS INC., Seoul (KR); SNU R&DB FOUNDATION, Seoul (KR)

(72) Inventors: Hakseong Kim, Seoul (KR); Sunghyun Choi, Seoul (KR); Jongwoo Hong, Seoul (KR)

(73) Assignees: LG Electronics Inc., Seoul (KR); SNU R&DB Foundation, Seoul (KR)

( * ) Notice: Subject to any disclaimer, the term of this patent is extended or adjusted under 35 U.S.C. 154(b) by 0 days.

(21) Appl. No.: 15/119,330

(22) PCT Filed: Feb. 16, 2015

(86) PCT No.: PCT/KR2015/001537
§ 371 (c)(1),
(2) Date: Aug. 16, 2016

(87) PCT Pub. No.: WO2015/126115
PCT Pub. Date: Aug. 27, 2015

(65) Prior Publication Data
US 2017/0013628 A1 Jan. 12, 2017

Related U.S. Application Data

(60) Provisional application No. 61/943,358, filed on Feb. 22, 2014.

(51) Int. Cl.
*H04W 4/00* (2009.01)
*H04W 72/08* (2009.01)
(Continued)

(52) U.S. Cl.
CPC ........ *H04W 72/082* (2013.01); *H04B 17/318* (2015.01); *H04B 17/336* (2015.01);
(Continued)

(58) Field of Classification Search
CPC ............. H04W 72/082; H04W 56/002; H04W 76/023; H04B 17/318; H04B 17/336; H04J 11/0026
See application file for complete search history.

(56) References Cited

U.S. PATENT DOCUMENTS 9,185,690 B2 * 11/2015 Khoshnevis ........ H04W 72/042
9,654,994 B2 * 5/2017 Pelletier .............. H04W 72/085
(Continued)

FOREIGN PATENT DOCUMENTS

WO WO 2014/027867 A1 2/2014

OTHER PUBLICATIONS

Alcatel-Lucent, Alcatel-Lucent Shanghai Bell, "Discovery signals and measurements for small cell on/off", R1-140162, 3GPP TSG RAN WG1 Meeting #76, Prague, Czech Republic, dated Feb. 10-14, 2014.
(Continued)

*Primary Examiner* — Kevin Mew
(74) *Attorney, Agent, or Firm* — Birch, Stewart, Kolasch & Birch, LLP

(57) ABSTRACT

The present invention discloses a method for reducing interference in a wireless communication system supporting D2D communication and an apparatus for the method. More specifically, in a wireless communication system supporting Device-to-Device (D2D) communication, a method for reducing interference in D2D communication comprises receiving, by a user equipment (UE), a D2D signal; determining, by the UE, whether interference is generated from resources in which the D2D signal has been transmitted; and
(Continued)

in case it is determined that interference is generated from the resources in which the D2D signal has been transmitted, transmitting, by the UE, interference resource information for indicating that interference has been generated from the resources in which the D2D signal has been transmitted.

13 Claims, 28 Drawing Sheets

(51) Int. Cl.
    *H04J 11/00*     (2006.01)
    *H04B 17/318*     (2015.01)
    *H04B 17/336*     (2015.01)
    *H04W 56/00*     (2009.01)
    *H04W 76/02*     (2009.01)

(52) U.S. Cl.
    CPC ....... *H04J 11/0026* (2013.01); *H04W 56/002* (2013.01); *H04W 76/023* (2013.01)

(56) References Cited

U.S. PATENT DOCUMENTS

| | | | | |
|---|---|---|---|---|
| 2010/0093364 A1* | 4/2010 | Ribeiro | ............... | H04W 72/082 455/452.2 |
| 2010/0162069 A1 | 6/2010 | Niu et al. | | |
| 2012/0051315 A1* | 3/2012 | Wang | ................. | H04W 72/082 370/329 |
| 2012/0201162 A1* | 8/2012 | Kim | .................... | H04B 17/345 370/252 |
| 2012/0294344 A1* | 11/2012 | Turtinen | ............. | H04W 72/121 375/224 |
| 2013/0012221 A1* | 1/2013 | Zou | ........................ | H04W 72/10 455/452.1 |
| 2013/0252654 A1* | 9/2013 | Dimou | ................ | H04W 76/023 455/509 |
| 2013/0322277 A1* | 12/2013 | Vanganuru | ............ | H04W 24/08 370/252 |
| 2014/0128115 A1* | 5/2014 | Siomina | ................ | H04L 1/0015 455/501 |
| 2014/0226504 A1* | 8/2014 | Tavildar | .............. | H04W 72/082 370/252 |
| 2014/0274088 A1* | 9/2014 | Talwar | ................. | H04J 11/0023 455/452.1 |
| 2014/0274183 A1* | 9/2014 | Zhu | ..................... | H04W 72/082 455/513 |
| 2014/0293968 A1* | 10/2014 | Ebrahimi Tazeh Mahalleh | | ........................... H04W 56/001 370/336 |
| 2014/0307657 A1* | 10/2014 | Baek | .................... | H04W 72/02 370/329 |
| 2015/0201419 A1* | 7/2015 | Zhou | .................... | H04W 72/02 370/329 |

OTHER PUBLICATIONS

LG Electronics, "D2D Communication Physical Channel Design", R1-140331, 3GPP TSG RAN WG1 Meeting #75, Prague, Czech Republic, dated Feb. 10-14, 2014.

\* cited by examiner

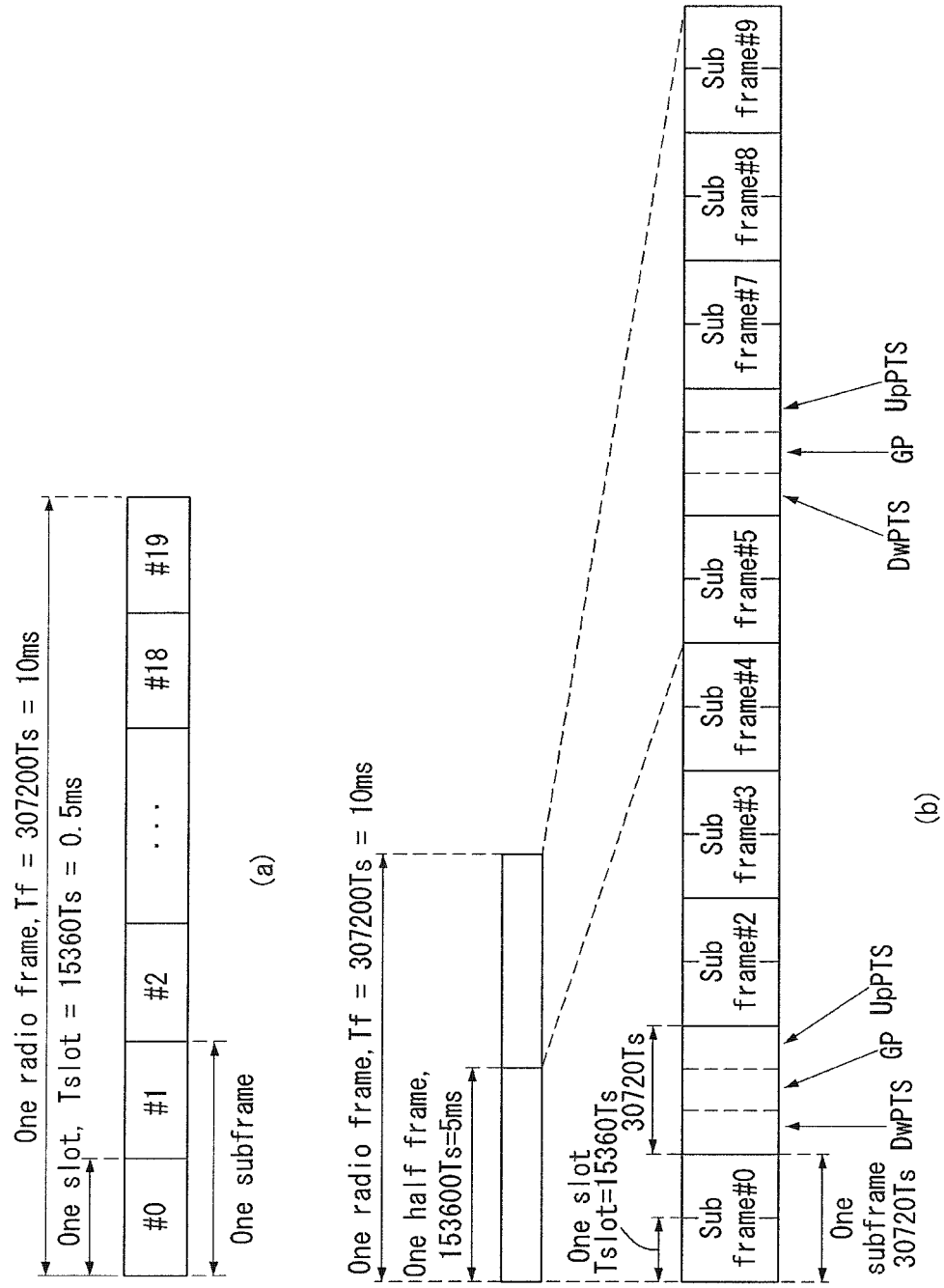
[FIG. 1]

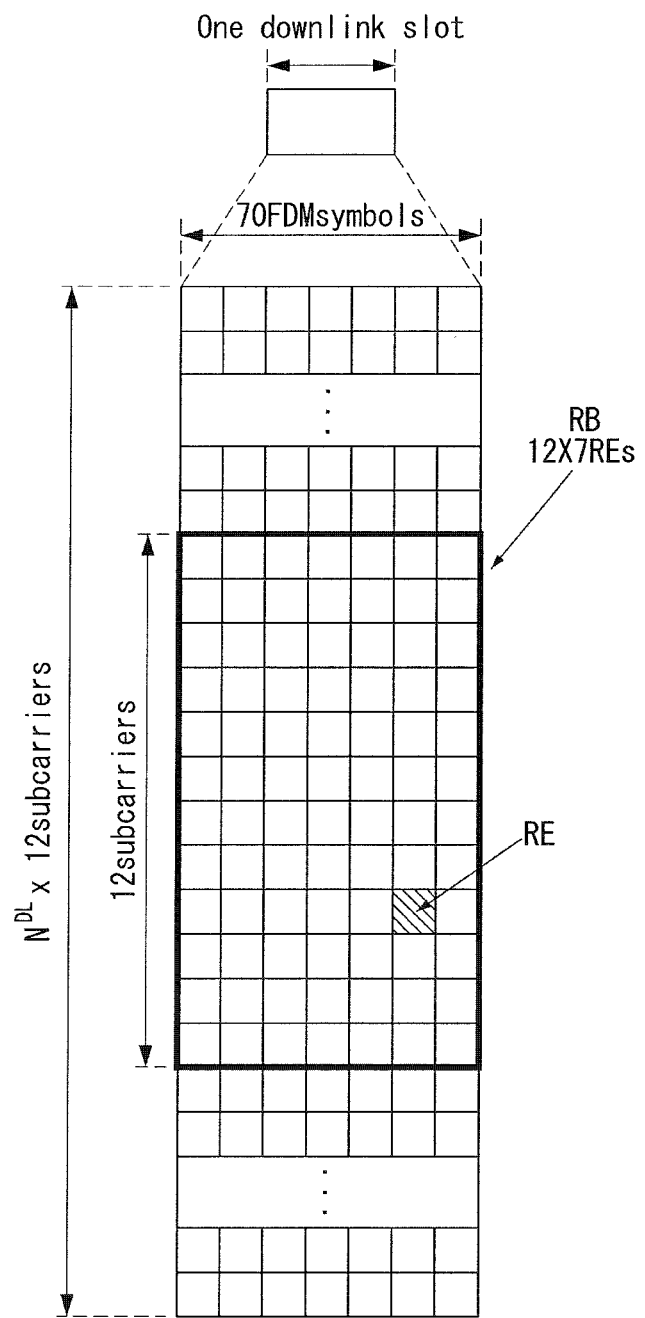
[FIG. 2]

[FIG. 3]
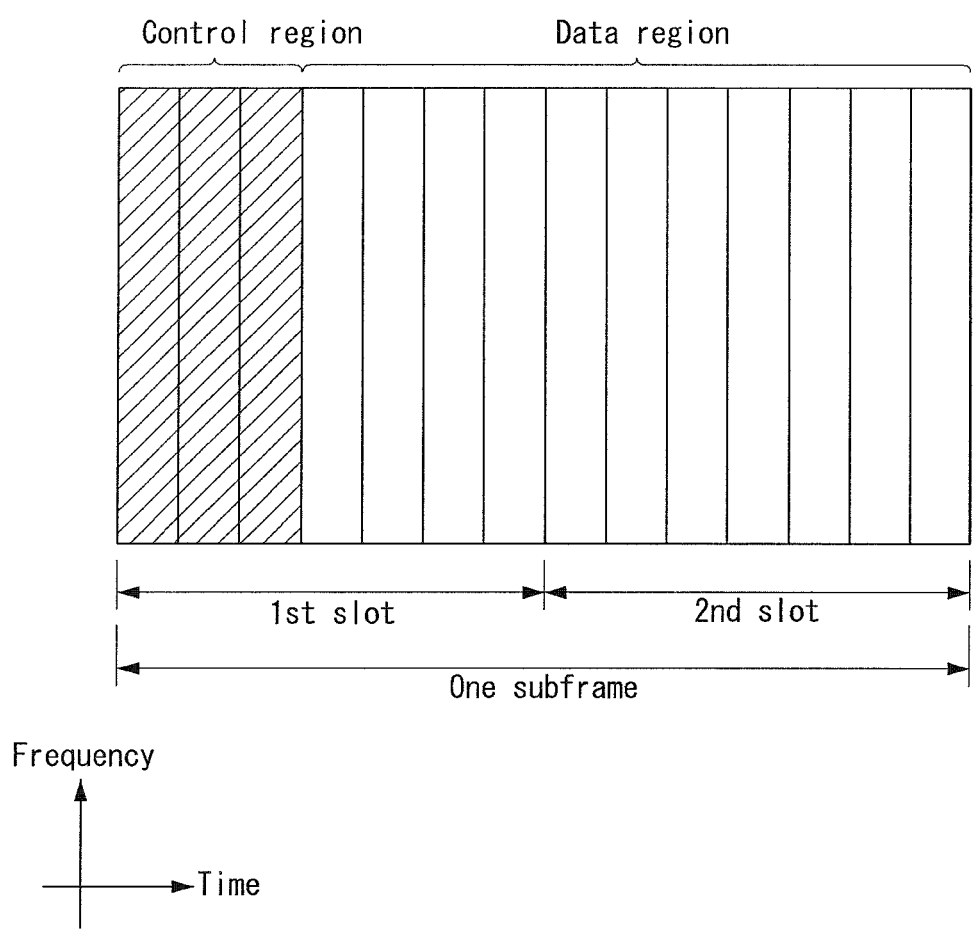

[FIG. 4]
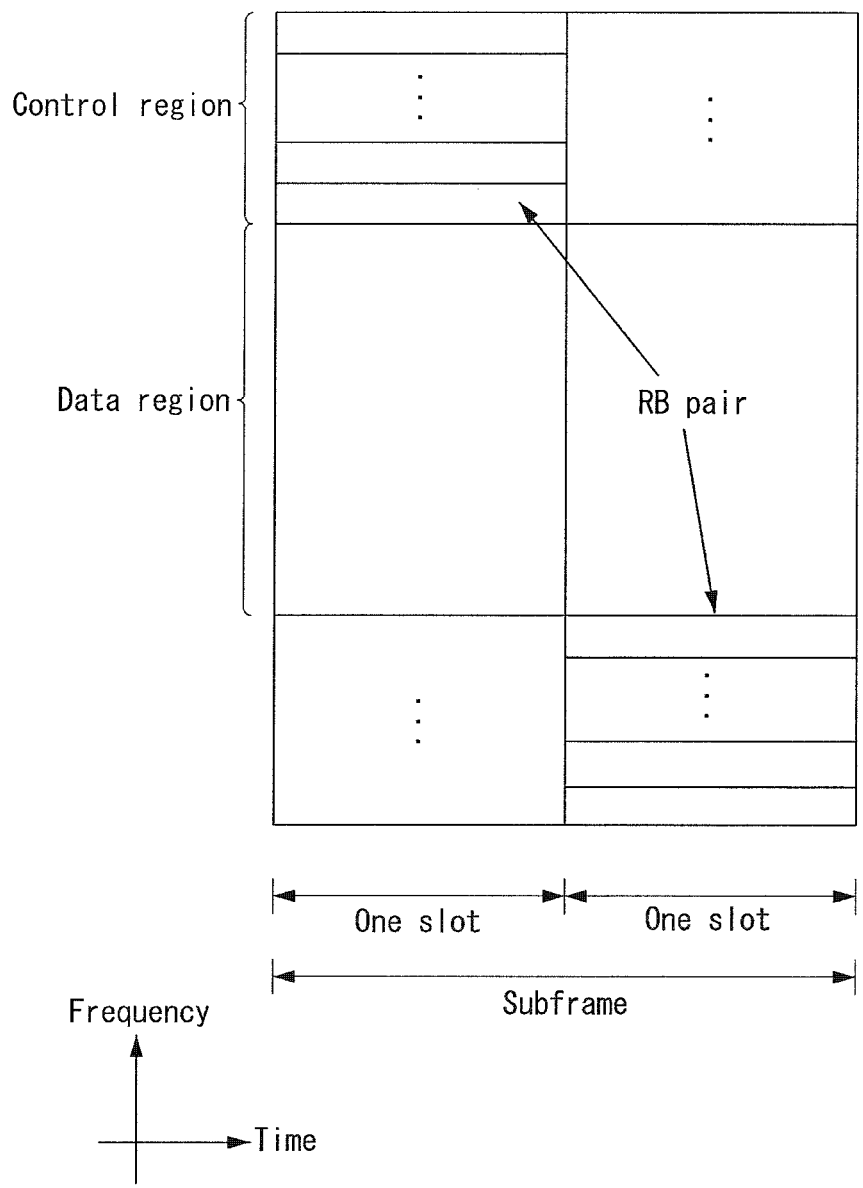

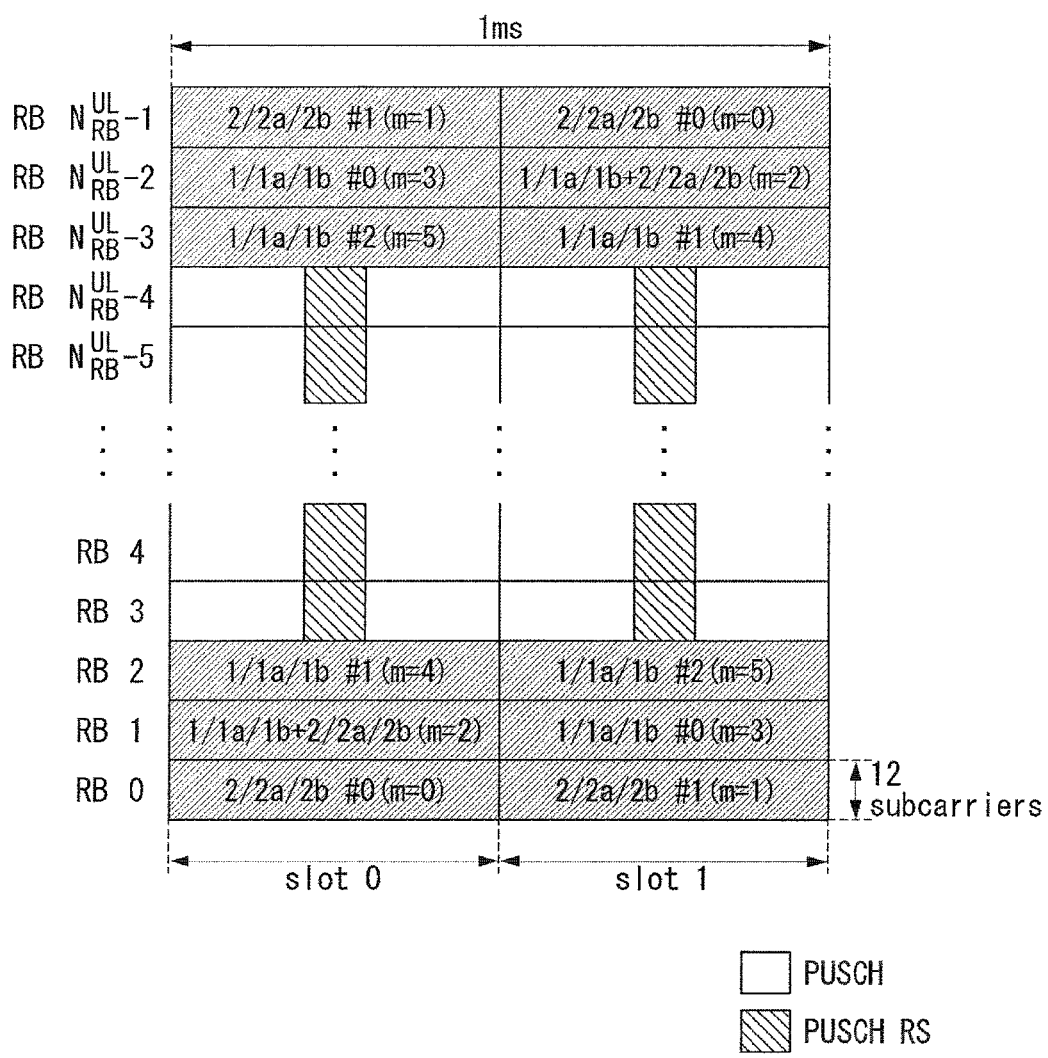
[FIG. 5]

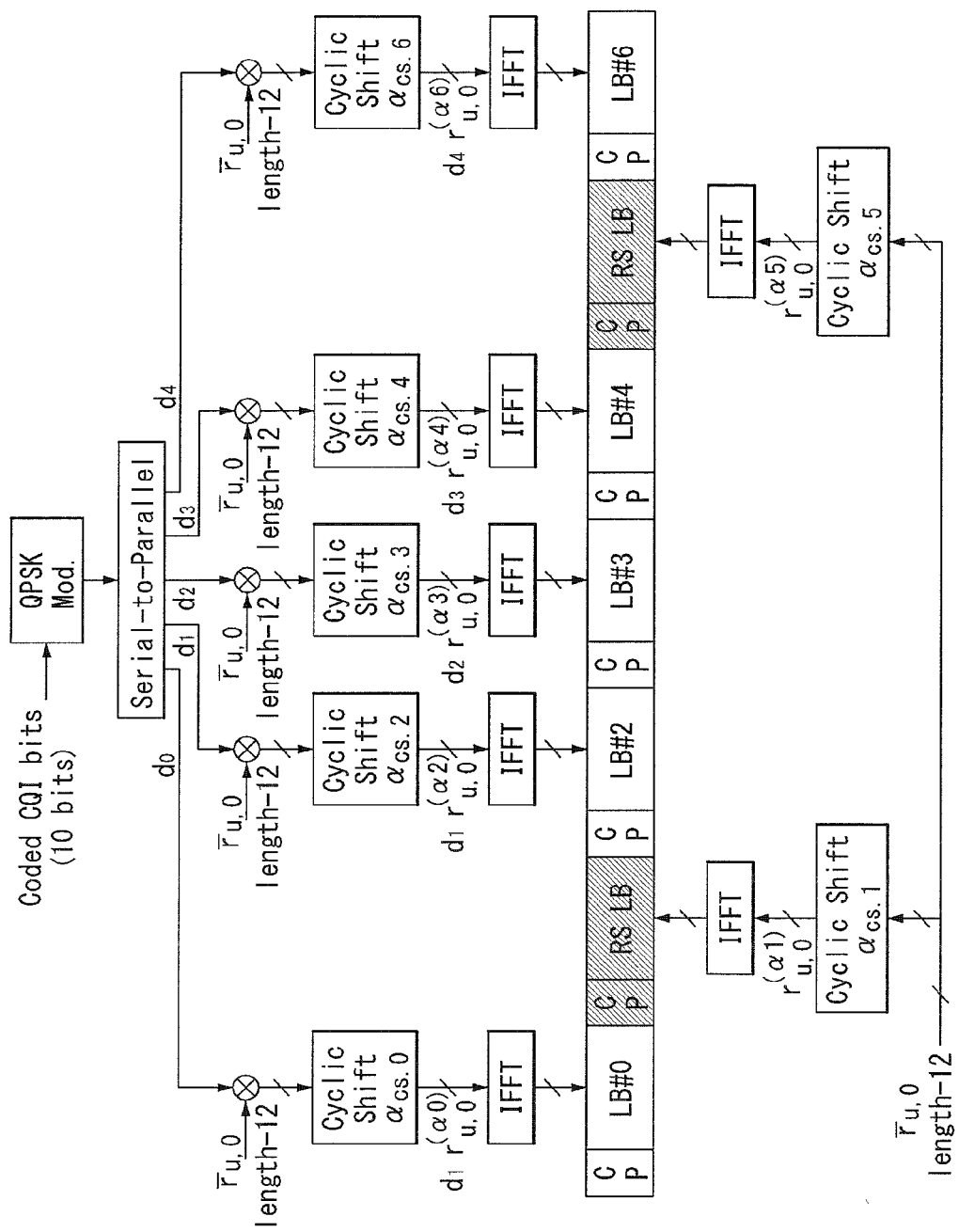
[FIG. 6]

[FIG. 7]
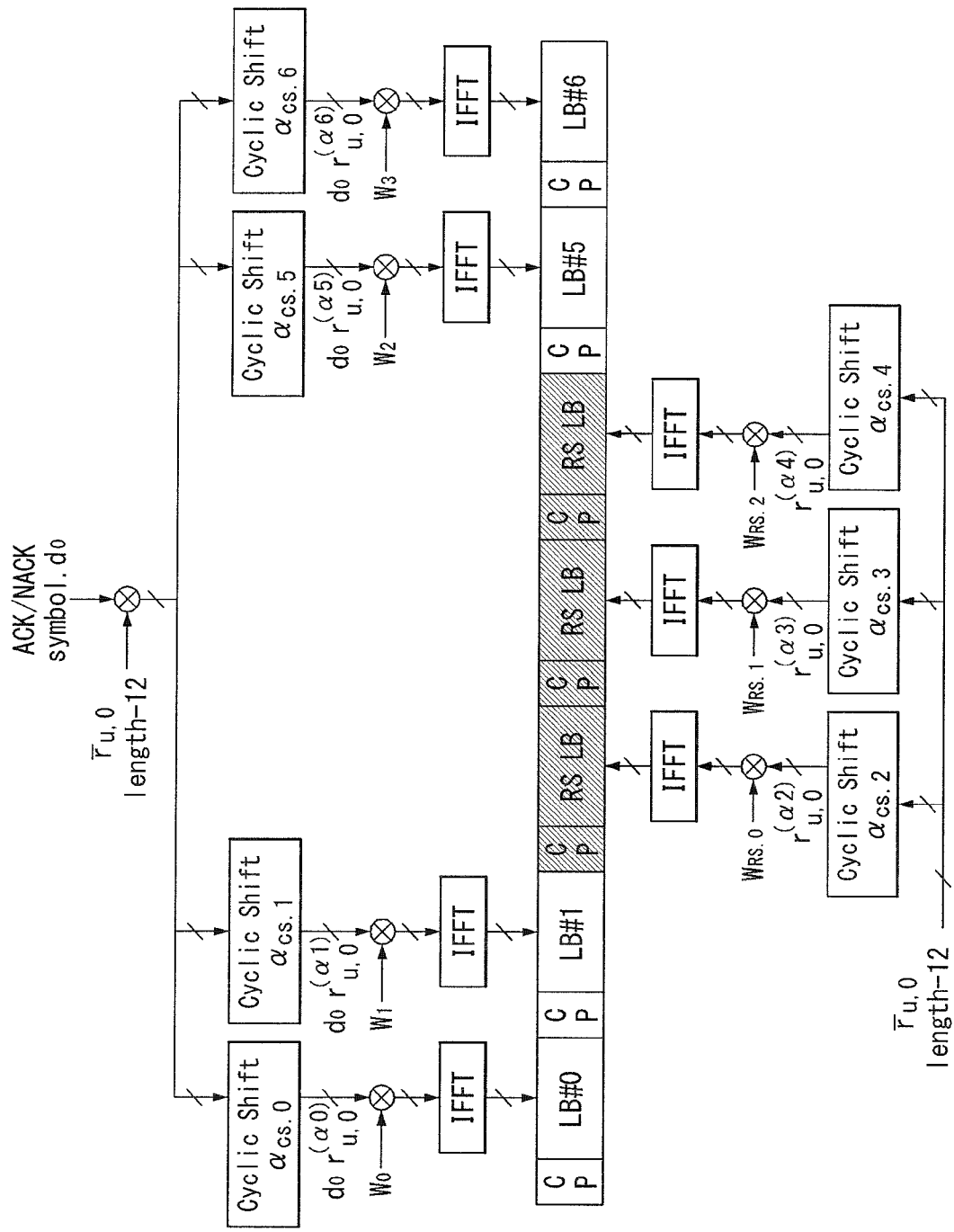

[FIG. 8]
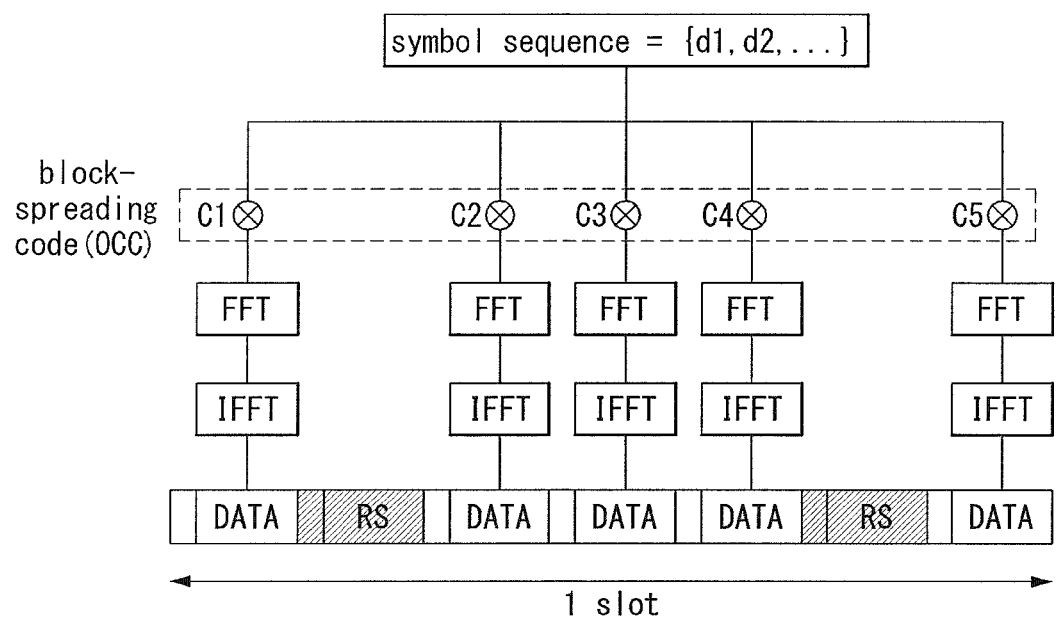

[FIG. 9]
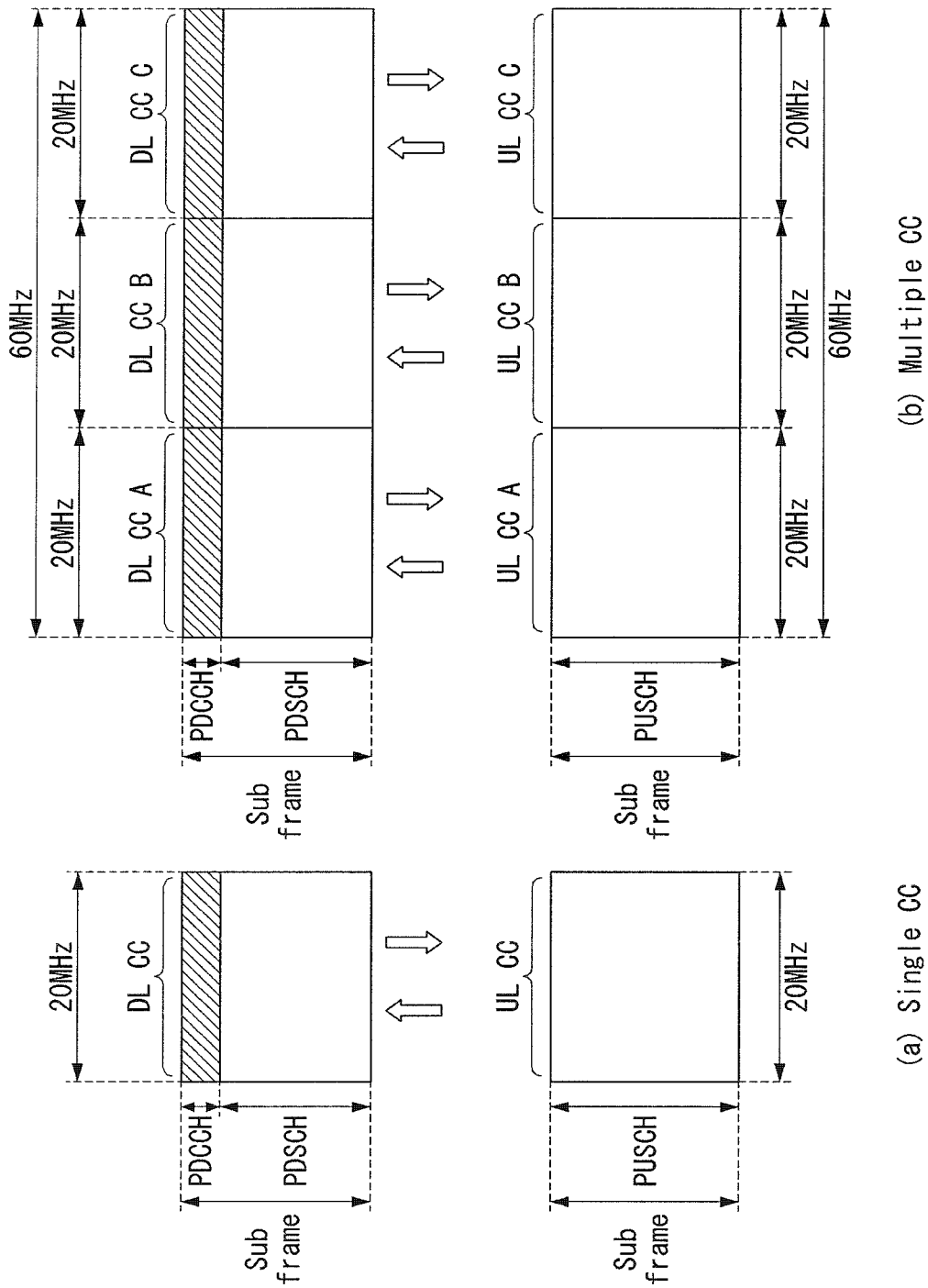

[FIG. 10]
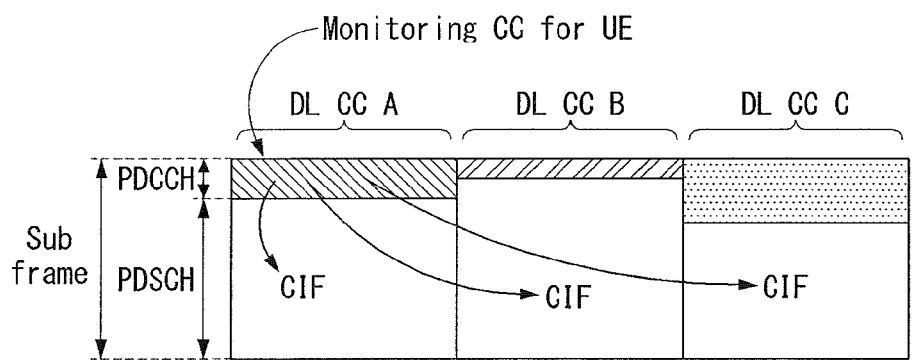
[FIG. 11]
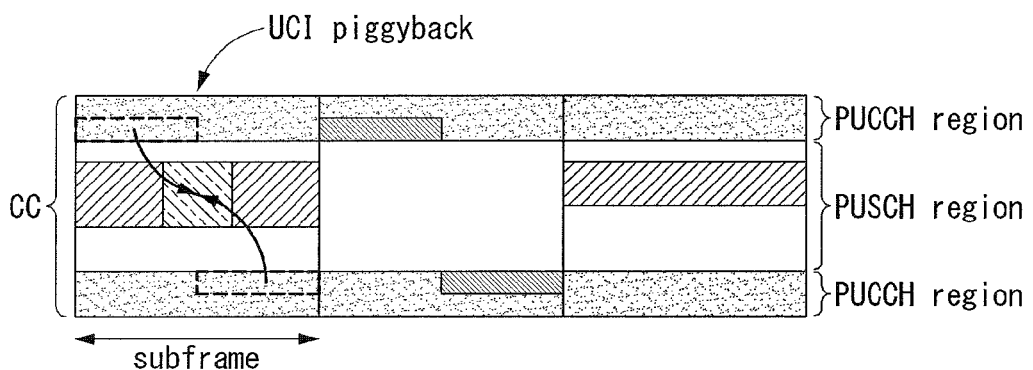

[FIG. 12]
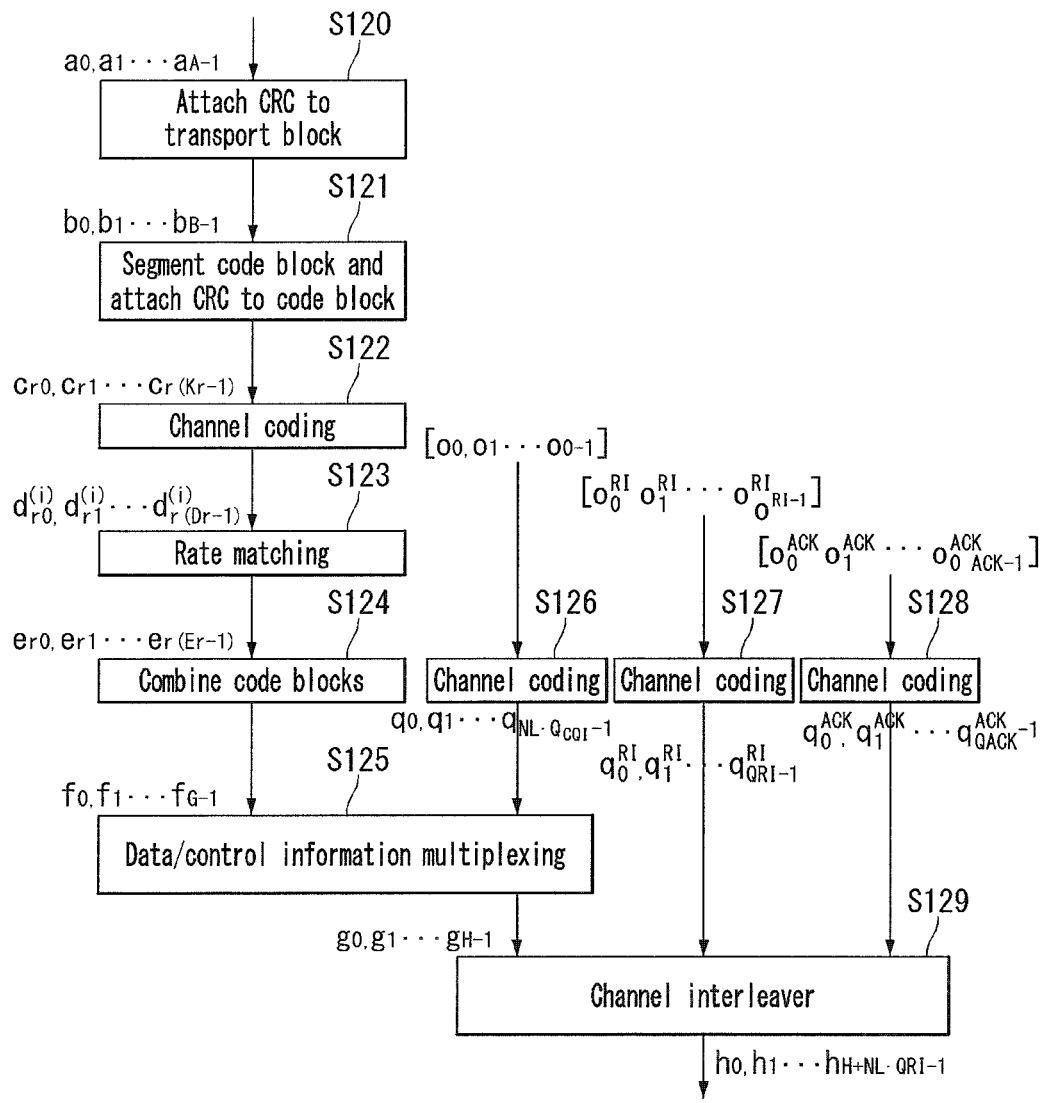

[FIG. 13]
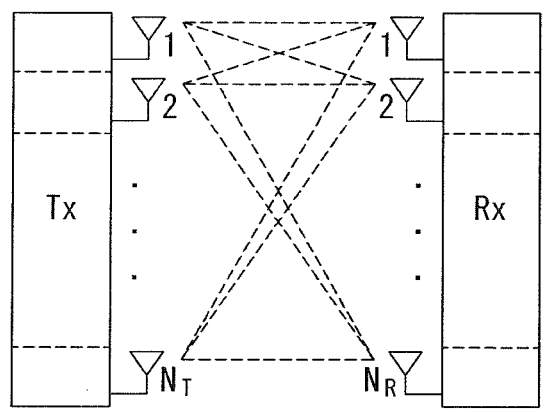
[FIG. 14]
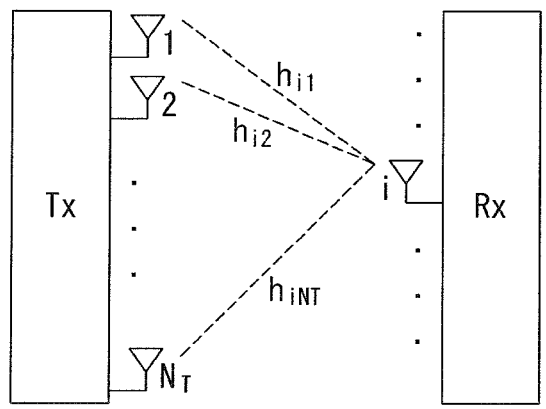

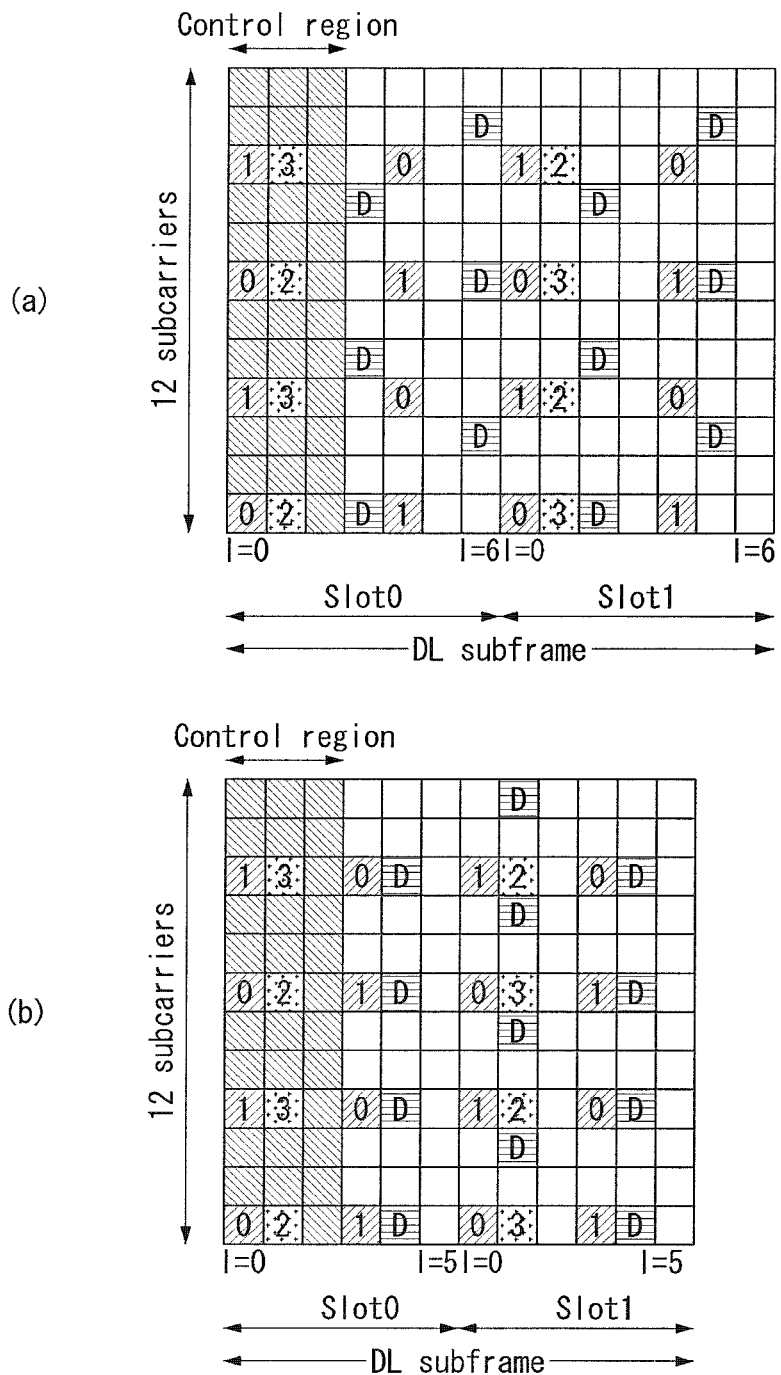
[FIG. 15]

[FIG. 16]
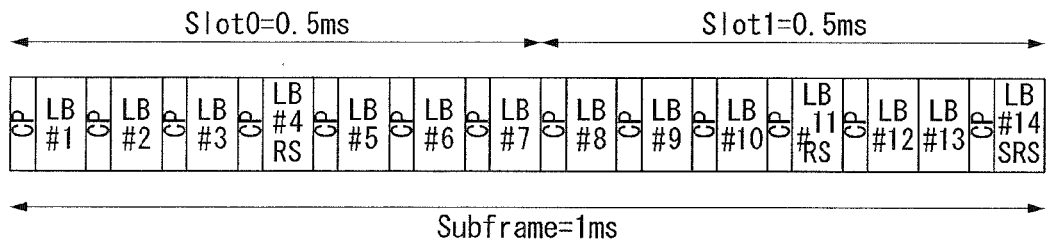
[FIG. 17]
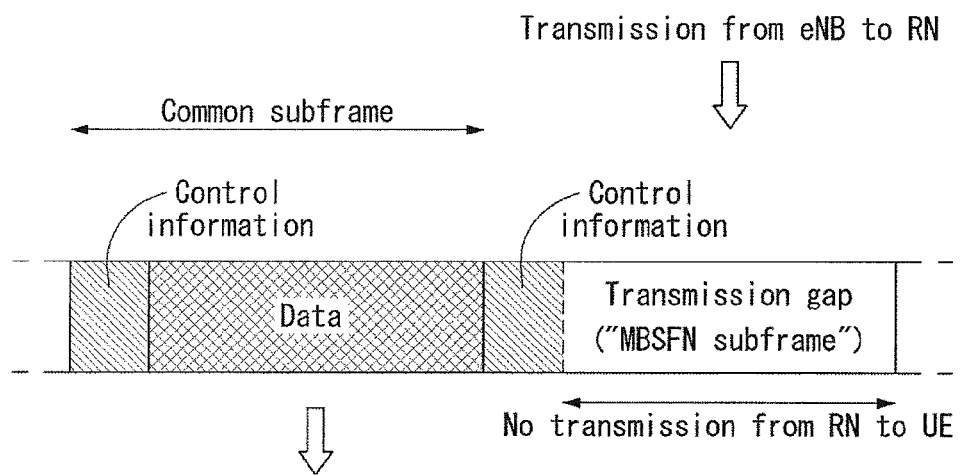
[FIG. 18]
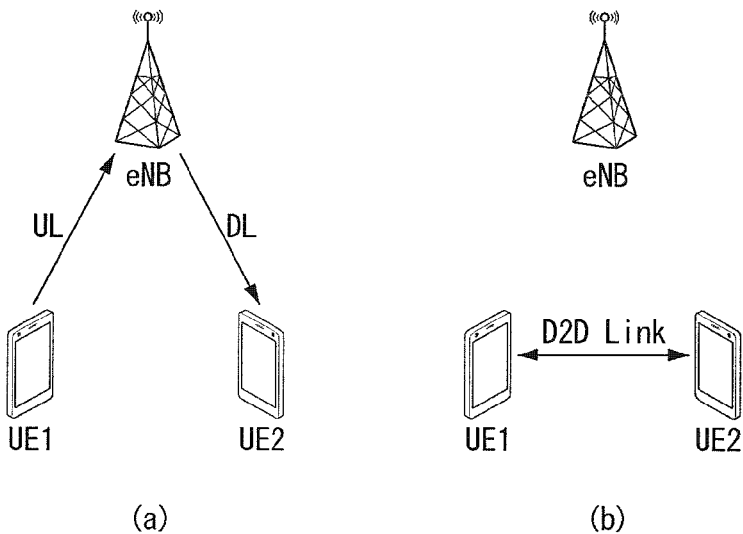
(a)          (b)

[FIG. 19]
(a) 
(b) 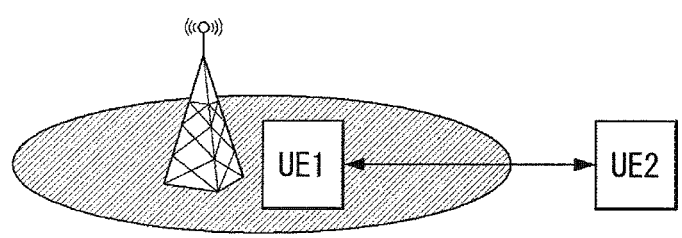
(c) 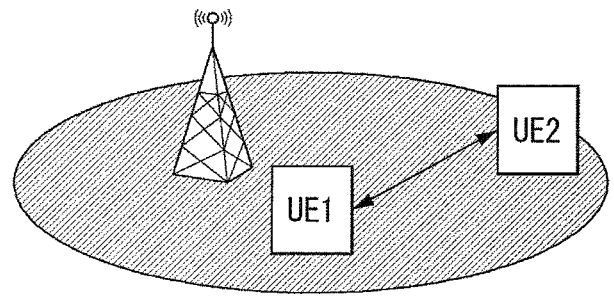
(d) 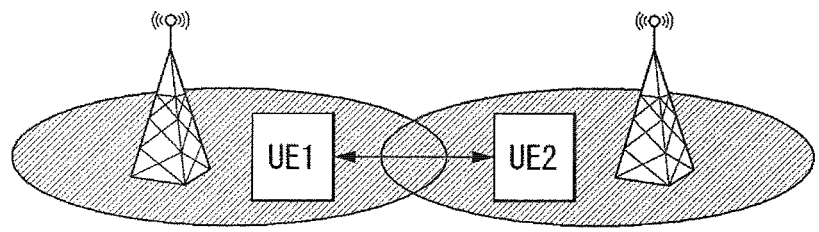

[FIG. 20]
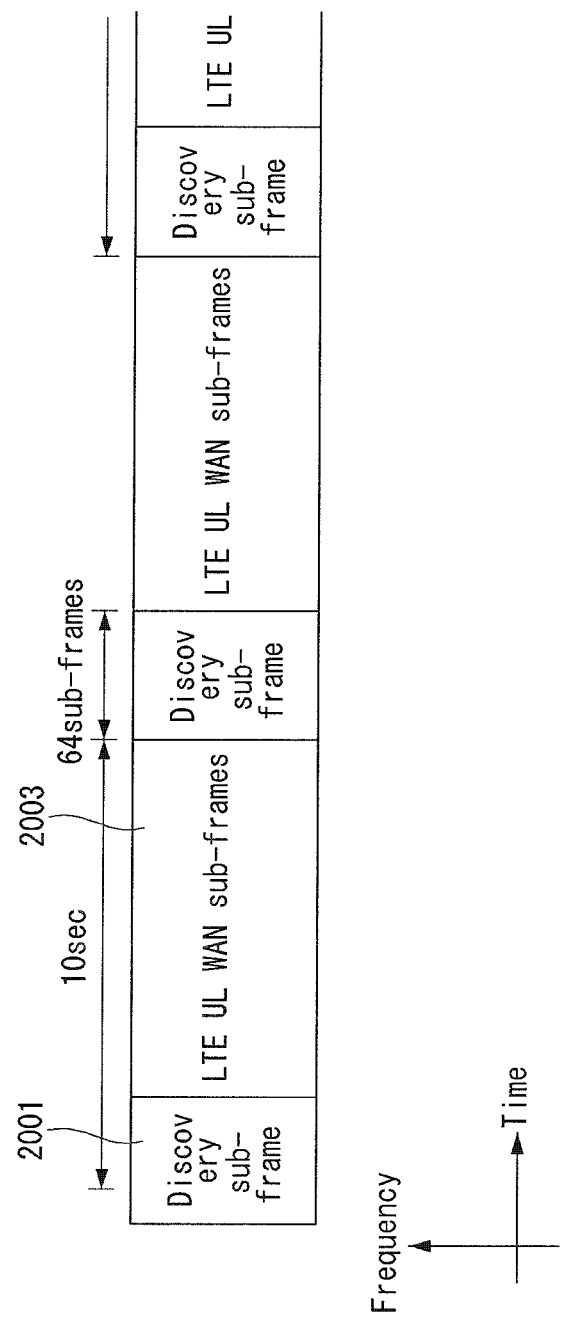

[FIG. 21]
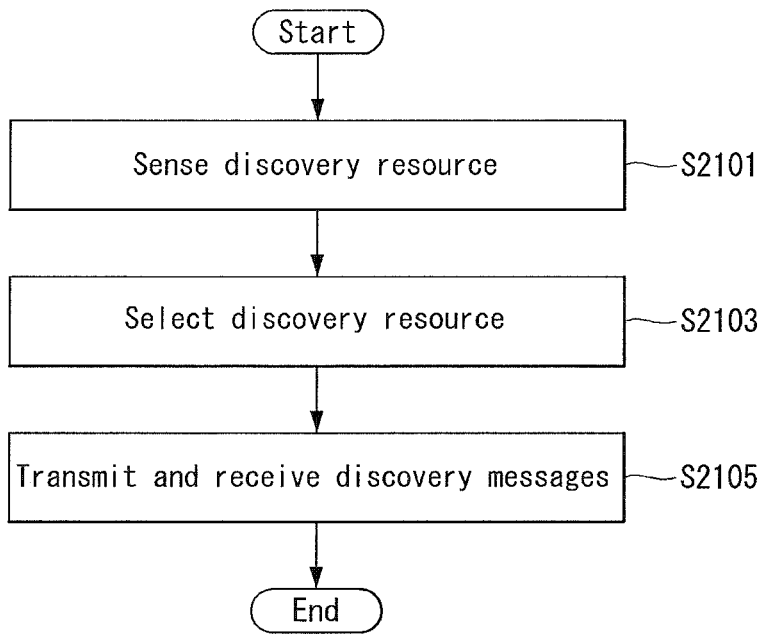
[FIG. 22]
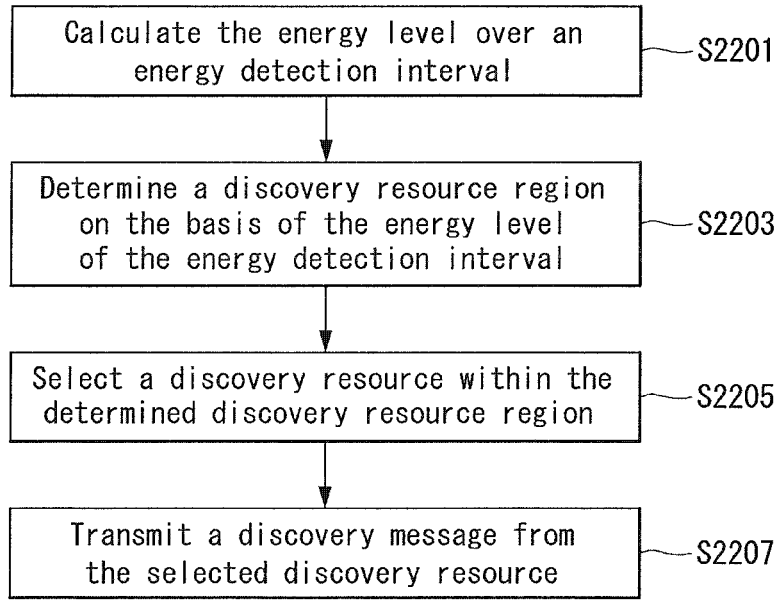

[FIG. 23]
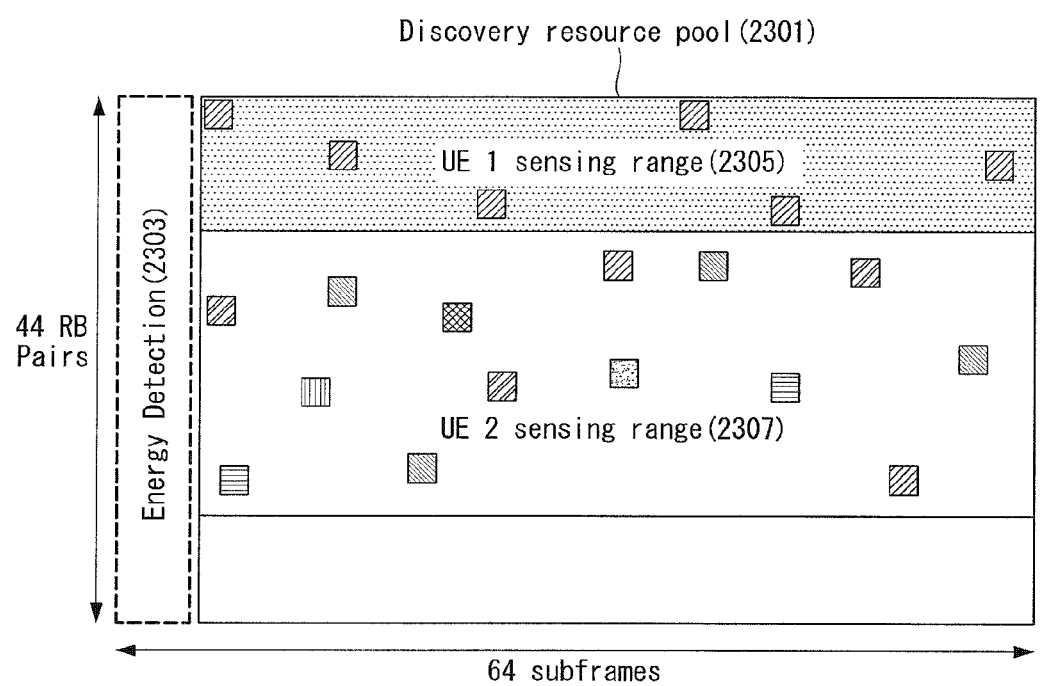

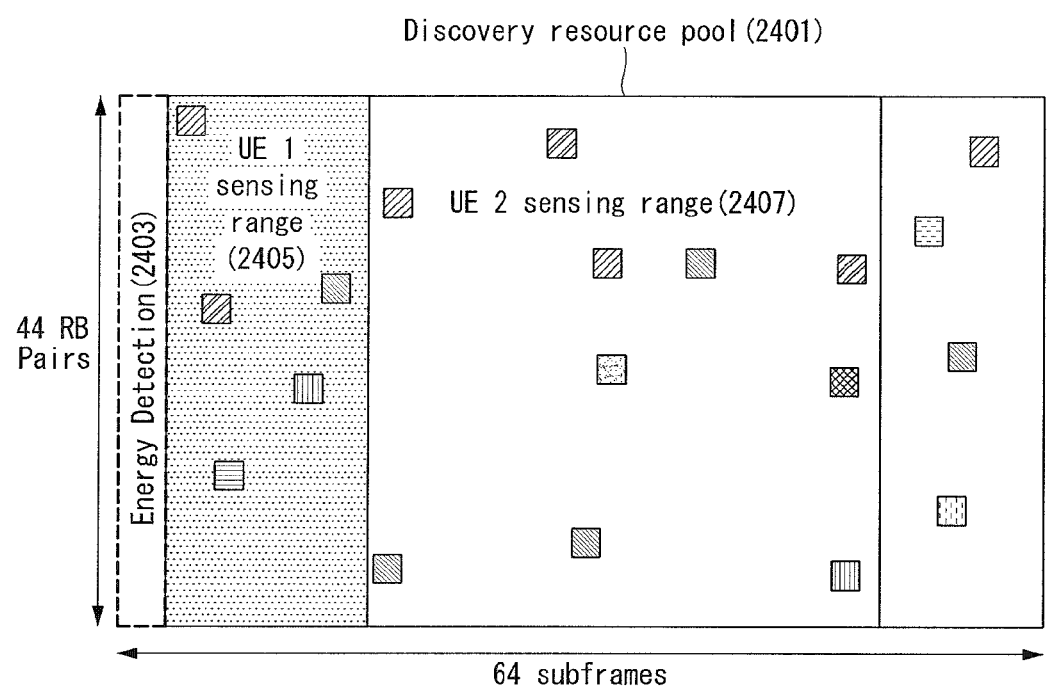
[FIG. 24]

[FIG. 25]
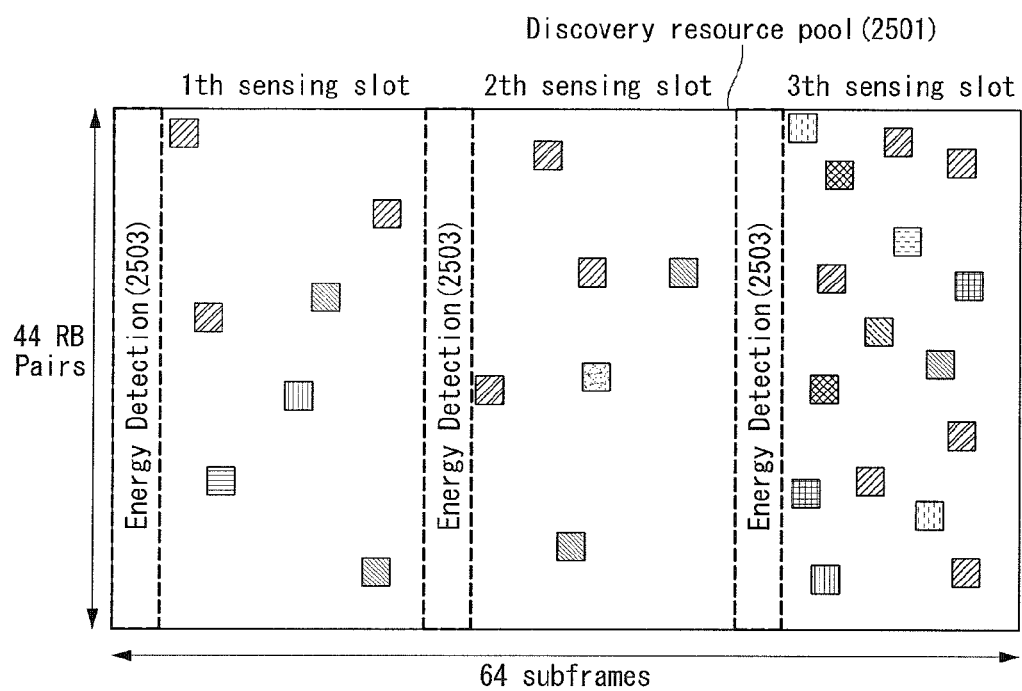

[FIG. 26]
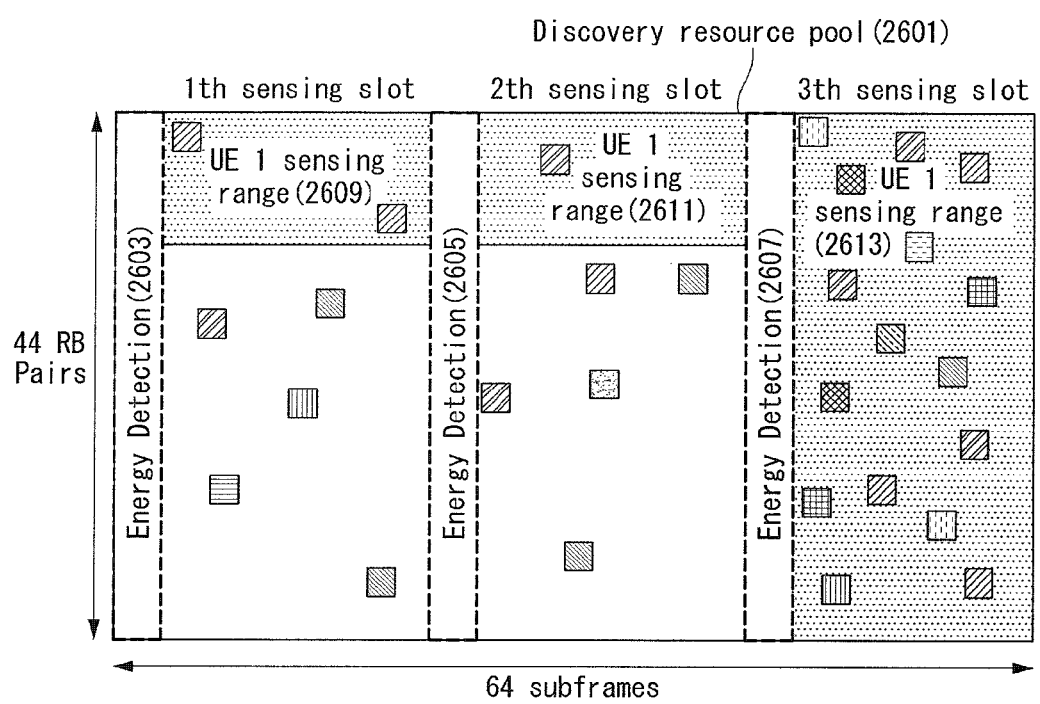

[FIG. 27]
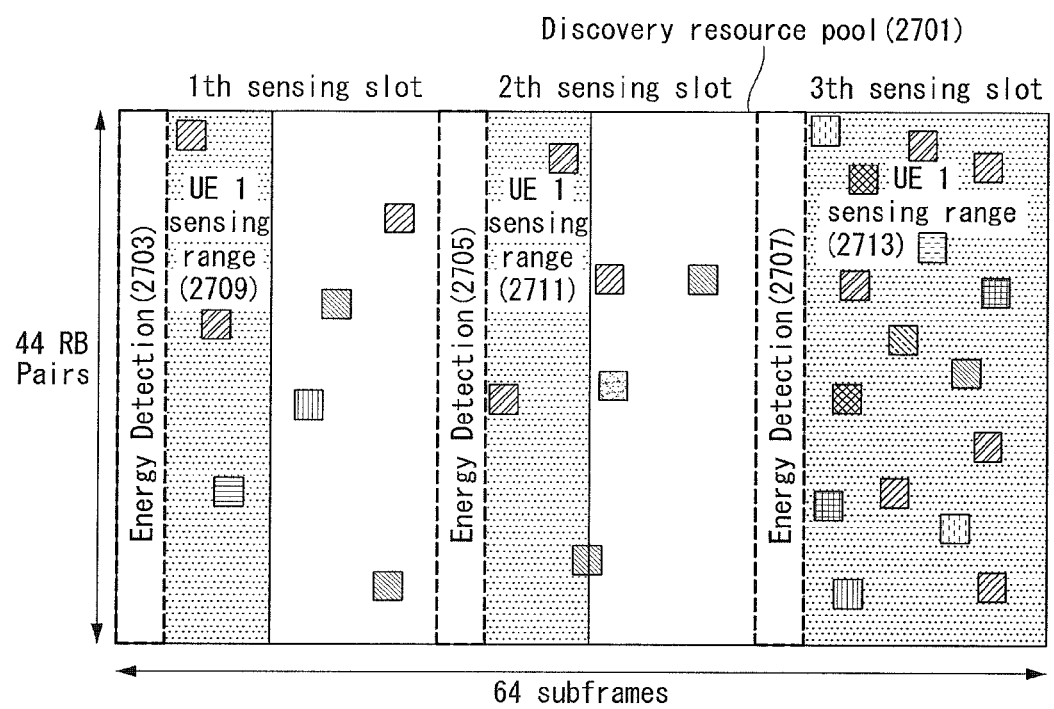

[FIG. 28]
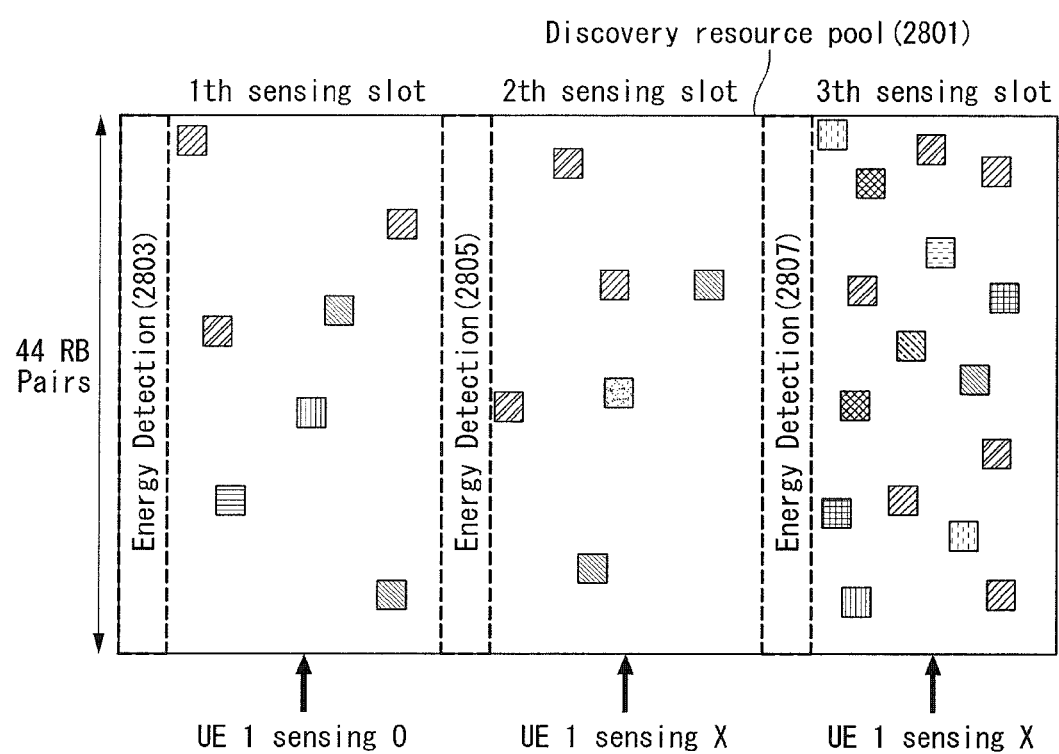

【FIG. 29】
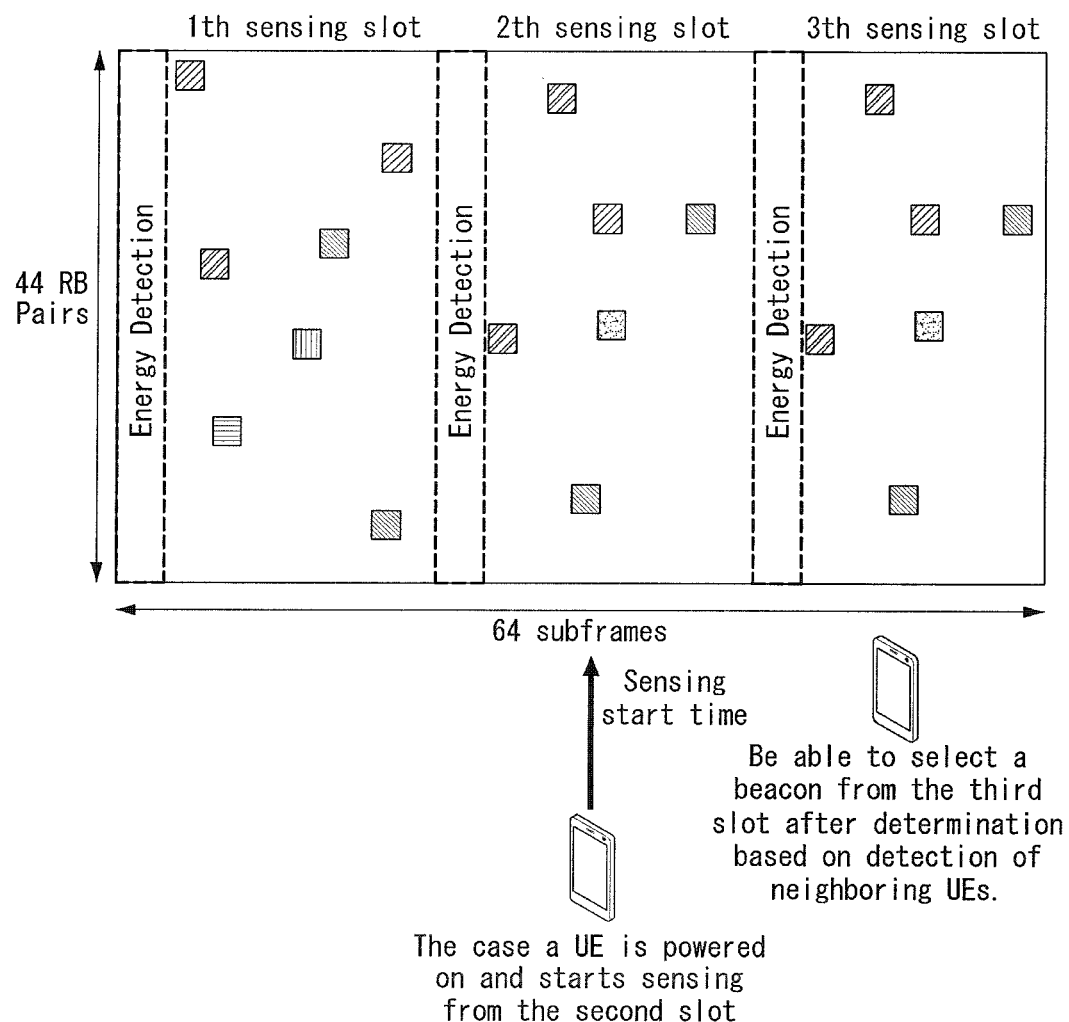

[FIG. 30]
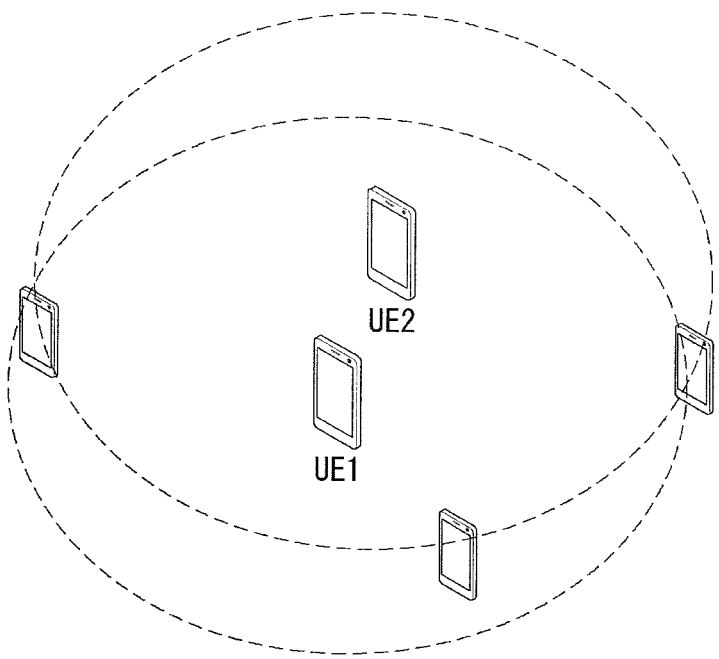
[FIG. 31]
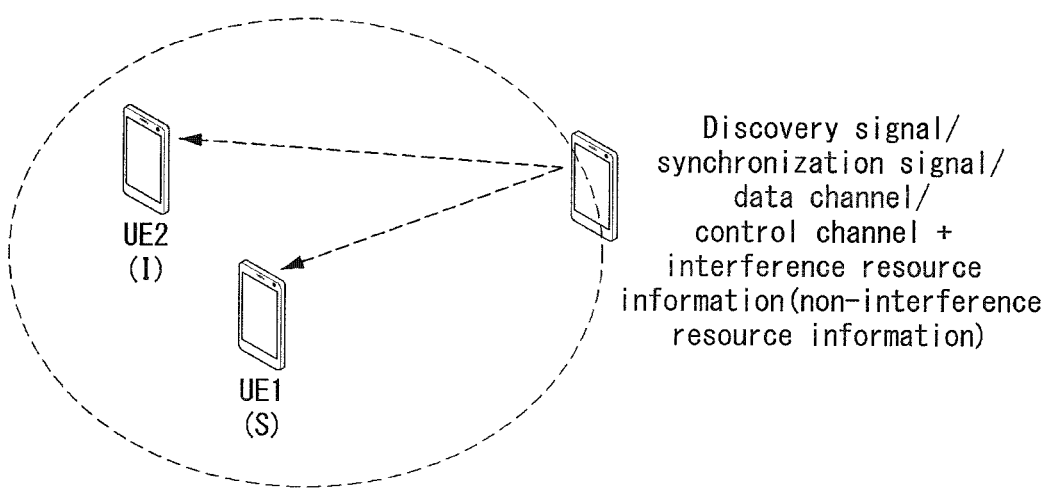

[FIG. 32]
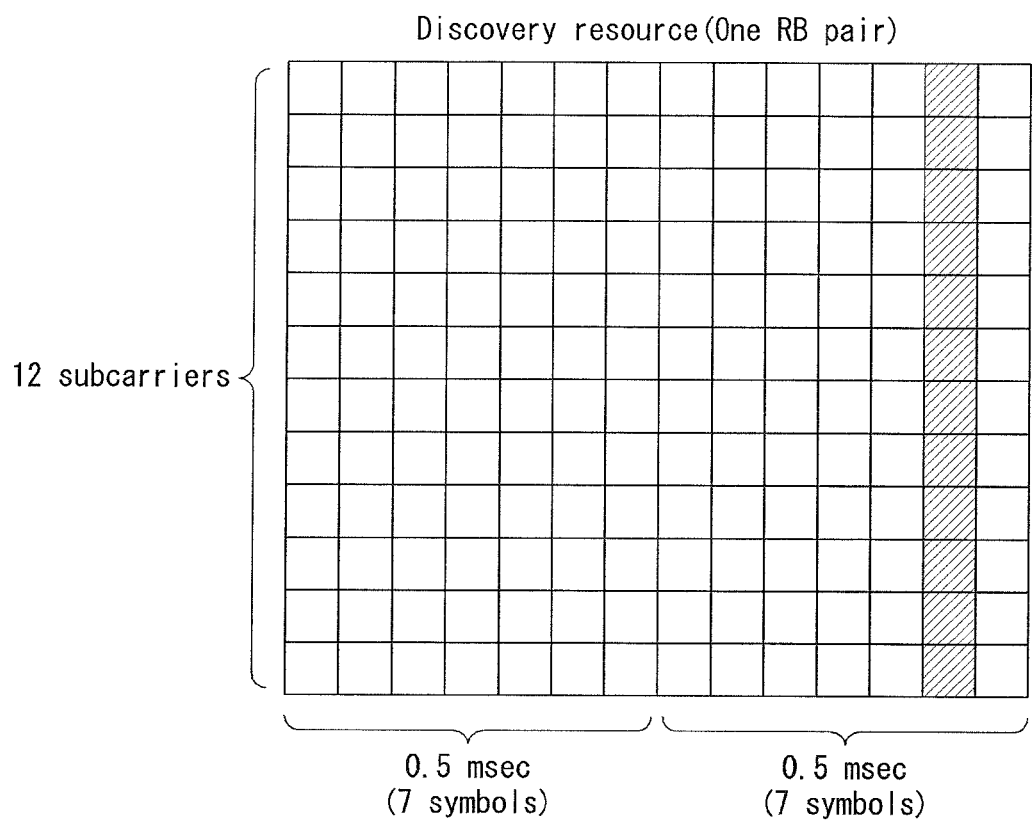

[FIG. 33]
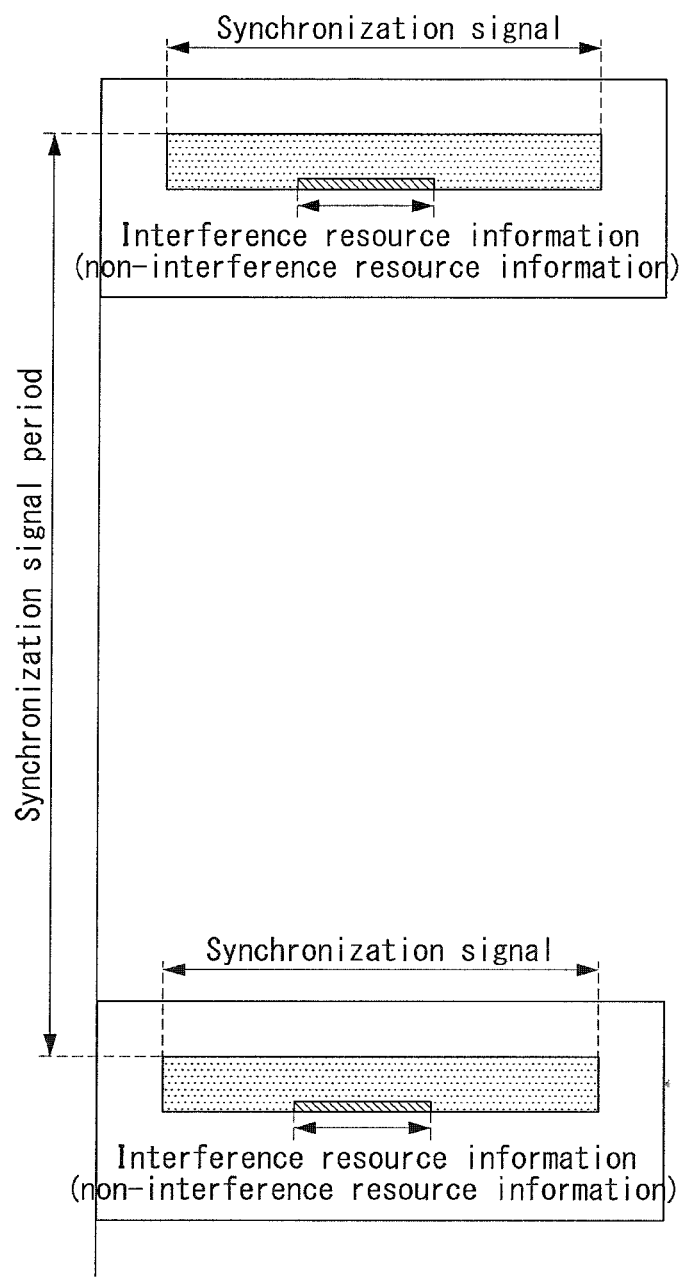

[FIG. 34]
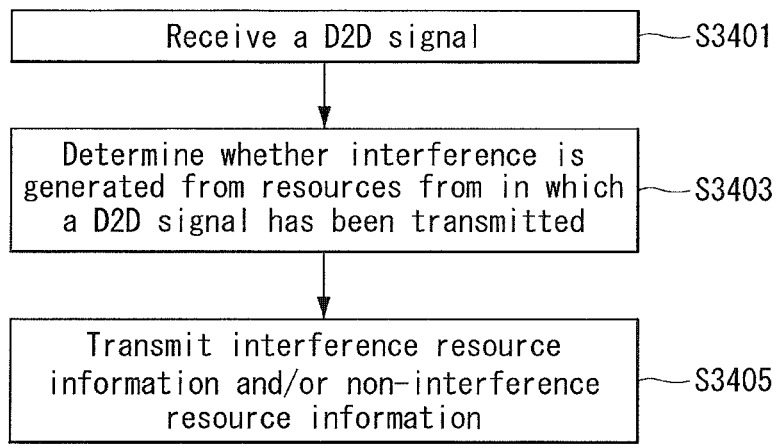
[FIG. 35]
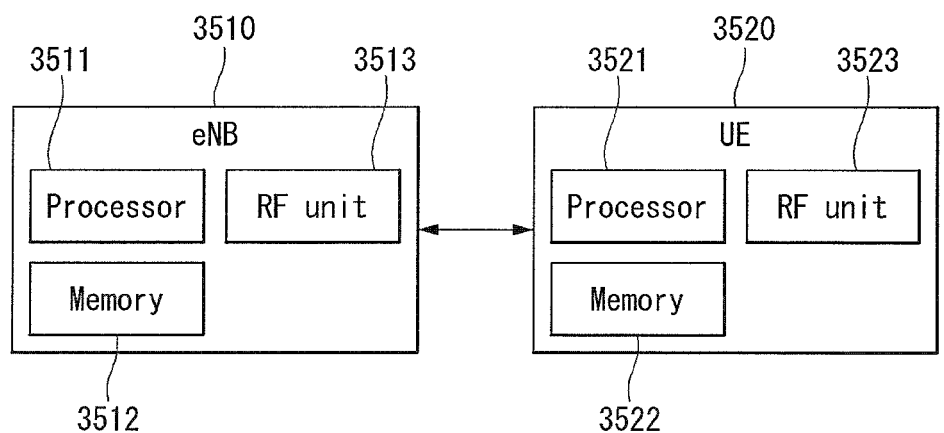

METHOD FOR REDUCING INTERFERENCE IN WIRELESS COMMUNICATION SYSTEM SUPPORTING DEVICE TO-DEVICE COMMUNICATION AND APPARATUS FOR THE SAME

CROSS REFERENCE TO RELATED APPLICATIONS

This application is the National Phase of PCT/KR2015/001537 filed on Feb. 16, 2015, which claims priority under 35 U.S.C. § 119(e) to U.S. Provisional Application No. 61/943,358 filed on Feb. 22, 2014, all of which are hereby expressly incorporated by reference into the present application.

TECHNICAL FIELD

The present invention is related to a wireless communication system and more particularly, a method for reducing interference generated during Device-to-Device (D2D) communication in a wireless communication system supporting D2D communication and an apparatus supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In a wireless communication system supporting D2D communication, D2D interference can be generated due to collision of resources as a plurality of UEs select the same resources while performing D2D discovery or direct communication between UEs, by which performance of D2D communication can be degraded.

To solve the technical problem above, the present invention provides a method for changing transmission resources of UEs colliding during D2D discovery or direct communication between UEs.

The technical problems solved by the present invention are not limited to the above technical problems and those skilled in the art may understand other technical problems from the following description.

Technical Solution

According to one aspect of the present invention, in a wireless communication system supporting D2D communication, a method for reducing interference in D2D communication comprises receiving, by a user equipment (UE), a D2D signal; determining, by the UE, whether interference is generated from resource in which the D2D signal has been transmitted; and in case it is determined that interference is generated from the resource in which the D2D signal has been transmitted, transmitting, by the UE, interference resource information for indicating that interference has been generated from the resource in which the D2D signal has been transmitted.

According to another aspect of the present invention, in a wireless communication system supporting D2D communication, a UE for reducing interference in D2D communication comprises a Radio Frequency (RF) unit for transmitting and receiving a radio signal and a processor, where the processor is configured to receive a D2D signal, to determine whether interference is generated from resource in which the D2D signal has been transmitted, and in case it is determined that interference is generated from the resource in which the D2D signal has been transmitted, to transmit interference resource information for indicating that interference has been generated from the resource in which the D2D signal has been transmitted.

Preferably, the D2D signal can be one of a PSDCH (Physical Sidelink Discovery Channel), PSSCH (Physical Sidelink Shared Channel), and PSCCH (Physical Sidelink Control Channel).

Preferably, if Signal to Interference plus Noise Ratio (SINR) measured over resource which have transmitted the D2D signal is less than a predetermined threshold value, it can be determined that interference has been generated.

Preferably, if SINR measured over the resource in which the D2D signal has been transmitted is less than a predetermined threshold value and RSSI (Received Signal Strength Indicator) is larger than a predetermined threshold value, it can be determined that interference has been generated.

Preferably, the interference resource information can include index of time/frequency resource in which the D2D signal has been transmitted.

Preferably, the interference resource information can be transmitted from one of a PSDCH (Physical Sidelink Discovery Channel), synchronization signal, and PSCCH (Physical Sidelink Control Channel).

Preferably, in case the interference resource information is transmitted on the PSCCH, the interference resource information can include resource re-allocation information for transmission of the D2D signal.

Preferably, in case the interference resource information is transmitted on the PSDCH, the interference resource information can be mapped to one symbol within a resource unit of the PSDCH.

Preferably, in case the interference resource information is transmitted on the synchronization signal, the interference resource information can be mapped to the last symbol within the region to which the synchronization signal is transmitted.

Preferably, if it is determined that interference is not generated from the resource in which the D2D signal has been transmitted, the UE may transmit non-interference resource information for indicating that interference has not been generated from the resource in which the D2D signal has been transmitted.

Preferably, if SINR measured over the resource in which the D2D signal has been transmitted is larger than a predetermined threshold value and RSSI is larger than a predetermined threshold value, it can be determined that interference has not been generated.

Preferably, if SINR measured over the resource in which the D2D signal has been transmitted is larger than a predetermined threshold value and RSSI is less than a predetermined threshold value, it can be determined that interference has not been generated.

Advantageous Effects

According to an embodiment of the present invention, in a wireless communication system supporting D2D communication, resource collision can be reduced (or prevented) by changing transmission resources of UEs colliding during discovery or direct communication between UEs.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows an example of a form in which PUCCH formats are mapped to the PUCCH region of the uplink physical resource block in a wireless communication system to which an embodiment of the present invention may be applied.

FIG. 6 shows the structure of a CQI channel in the case of a normal CP in a wireless communication system to which an embodiment of the present invention may be applied.

FIG. 7 shows the structure of an ACK/NACK channel in the case of a normal CP in a wireless communication system to which an embodiment of the present invention may be applied.

FIG. 8 shows an example in which five SC-FDMA symbols are generated and transmitted during one slot in a wireless communication system to which an embodiment of the present invention may be applied.

FIG. 9 shows an example of component carriers and a carrier aggregation in a wireless communication system to which an embodiment of the present invention may be applied.

FIG. 10 shows an example of the structure of a subframe according to cross-carrier scheduling in a wireless communication system to which an embodiment of the present invention may be applied.

FIG. 11 shows an example of transport channel processing for an UL-SCH in a wireless communication system to which an embodiment of the present invention may be applied.

FIG. 12 shows an example of a signal processing process in an uplink shared channel, that is, a transport channel, in a wireless communication system to which an embodiment of the present invention may be applied.

FIG. 13 shows the configuration of a known Multi-Input Multi-Output (MIMO) communication system.

FIG. 14 is a diagram showing a channel from a plurality of transmission antennas to a single reception antenna.

FIG. 15 illustrates a reference signal pattern mapped to a downlink resource block pair in a wireless communication system to which an embodiment of the present invention may be applied.

FIG. 16 illustrates an uplink subframe including sounding reference signal symbols in a wireless communication system to which an embodiment of the present invention may be applied.

FIG. 17 illustrates the segmentation of a relay node resource in a wireless communication system to which an embodiment of the present invention may be applied.

FIG. 18 is a diagram conceptually illustrating D2D communication in a wireless communication system to which an embodiment of the present invention may be applied.

FIG. 19 shows an example of various scenarios of D2D communication to which a method proposed in this specification may be applied.

FIG. 20 shows an example in which discovery resources have been allocated according to an embodiment of the present invention.

FIG. 21 is a simplified diagram illustrating a discovery process according to an embodiment of the present invention.

FIG. 22 illustrates a method for transmitting a D2D discovery message according to one embodiment of the present invention.

FIG. 23 illustrates a method for adaptively determining a discovery resource region in the frequency domain according to one embodiment of the present invention.

FIG. 24 illustrates a method for adaptively determining a discovery resource region in the time domain according to one embodiment of the present invention.

FIG. 25 illustrates an energy detection interval set in the time domain in a repetitive manner according to one embodiment of the present invention.

FIG. 26 illustrates a method for adaptively determining a discovery resource region in the frequency domain in case an energy detection interval is set repeatedly in the time domain according to one embodiment of the present invention.

FIG. 27 illustrates a method for adaptively determining a discovery resource region in the time domain in case an energy detection interval is set repeatedly in the time domain according to one embodiment of the present invention.

FIG. 28 illustrates a method for adaptively determining a discovery resource region in the time domain in case an energy detection interval is set repeatedly in the time domain according to one embodiment of the present invention.

FIG. 29 illustrates a method for adaptively determining a discovery resource region in the time domain in case an energy detection interval is set repeatedly in the time domain according to one embodiment of the present invention.

FIG. 30 illustrates a situation where D2D signal transmission resources of UEs collide with each other.

FIG. 31 illustrates a method for reducing interference in D2D communication according to one embodiment of the present invention.

FIG. 32 illustrates an example of transmitting interference resource information according to one embodiment of the present invention.

FIG. 33 illustrates an example of transmitting interference resource information according to one embodiment of the present invention.

FIG. 34 illustrates a method for reducing interference in D2D communication according to one embodiment of the present invention.

FIG. 35 illustrates a block diagram of a wireless communication device according to one embodiment of the present invention.

MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(*a*) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(*b*) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Uplink Control Channel (PUCCH)

The Uplink Control Information (UCI) transmitted through a PUCCH can include Scheduling Request (SR), HARQ ACK/NACK information, and downlink channel measurement information as shown below.

SR (Scheduling Request): used for requesting uplink UL-SCH resources. SR is transmitted by On-Off Keying (OOK) scheme.

HARQ ACK/NACK: a signal responding to a downlink data packet on a PDSCH. This signal indicates whether a downlink data packet has successfully received or not. ACK/NACK 1 bit is transmitted in response to a single downlink codeword while ACK/NACK 2 bits are transmitted in response to two downlink codewords.

CSI (Channel State Information): feedback information about a downlink channel. CSI can include at least one of a Channel Quality Indicator (CQI), a Rank Indicator (RI), a Precoding Matrix Indicator (PMI), and a Precoding Type Indicator (PTI). For each subframe, 20 bits are used to represent the CSI.

HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPSK) scheme and a Quadrature Phase Shift Keying (QPSK) scheme. Control information for a plurality of UEs may be transmitted through a PUCCH. If Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of UE. Furthermore, ACK/NACK information about downlink data transmission transmitted through a PUCCH is covered using an orthogonal sequence or an Orthogonal Cover (OC).

Furthermore, control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel. A variety of types of sequences may be used as the base sequence, and the CAZAC sequence is an example of the sequences.

Furthermore, the amount of control information that may be transmitted by UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 7 different formats depending on control information that is transmitted, a modulation scheme, and the amount of control information. The attributes of Uplink Control Information (UCI) transmitted according to each PUCCH format may be summarized as in Table 2 below.

TABLE 2

| PUCCH Format | Uplink Control Information(UCI) |
|---|---|
| Format 1 | Scheduling Request(SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

The PUCCH format 1 is used for SR-only transmission. In the case of SR-only transmission, a not-modulated waveform is applied. This is described in detail later.

The PUCCH format 1a or 1b is used to send HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b. PUCCCH format 2 is used for transmission of CQI, and PUCCH format 2a or 2b is used for transmission of CQI and HARQ ACK/NACK. In the case of extended CP, PUCCH format 2 may be used for transmission of CQI and HARQ ACK/NACK.

PUCCH format 3 is used for carrying an encoded UCI of 48 bits. PUCCH format 3 can carry HARQ ACK/NACK about a plurality of serving cells, SR (if exists), and a CSI report about one serving cell.

FIG. 5 shows an example of a form in which the PUCCH formats are mapped to the PUCCH region of the uplink physical resource block in a wireless communication system to which an embodiment of the present invention may be applied.

In FIG. 5, $N_{RB}^{UL}$ is indicative of the number of RBs in uplink, and 0, 1, . . . , $N_{RB}^{UL}-1$ means the number of physical RBs. Basically, a PUCCH is mapped to both edges of an uplink frequency block. As shown in FIG. 5, the PUCCH format 2/2a/2b is mapped to a PUCCH region indicated by m=0, 1. This may represent that the PUCCH format 2/2a/2b is mapped to RBs located at a band edge. Furthermore, the PUCCH format 2/2a/2b and the PUCCH format 1/1a/1b may be mixed and mapped to a PUCCH region indicated by m=2. Furthermore, the PUCCH format 1/1a/1b may be mapped to a PUCCH region indicated by m=3, 4, 5. UEs within a cell may be notified of the number $N_{RB}^{(2)}$ of PUCCH RBs which may be used by the PUCCH format 2/2a/2b through broadcasting signaling.

The PUCCH format 2/2a/2b is described below. The PUCCH format 2/2a/2b is a control channel for transmitting channel measurement feedback (i.e., a CQI, a PMI, and an RI).

The report cycle of channel measurement feedback (hereinafter commonly called "CQI information") and a frequency unit (or frequency resolution) to be measured may be controlled by an eNB. In a time domain, a periodic or aperiodic CQI report may be supported. The PUCCH format 2 may be used for a periodic report, and a PUSCH may be used for an aperiodic report. In the case of an aperiodic report, an eNB may instruct UE to carry an individual CQI report on a resource scheduled to transmit uplink data.

FIG. 6 shows the structure of a CQI channel in the case of a normal CP in a wireless communication system to which an embodiment of the present invention may be applied.

The SC-FDMA symbols 1 and 5 (i.e., the second and the sixth symbols) of the SC-FDMA symbols 0 to 6 of one slot are used to transmit a demodulation reference signal (DMRS), and the remaining SC-FDMA symbols of the SC-FDMA symbols 0 to 6 of the slot may be used to CQI information. Meanwhile, in the case of an extended CP, one SC-FDMA symbol (SC-FDMA symbol 3) is used for DMRS transmission.

In the PUCCH format 2/2a/2b, modulation by a CAZAC sequence is supported, and a QPSK-modulated symbol is multiplied by a CAZAC sequence of a length 12. A Cyclic Shift (CS) of the sequence is changed between a symbol and a slot. Orthogonal covering is used for a DMRS.

A reference signal (DMRS) is carried on 2 SC-FDMA symbols that belong to 7 SC-FDMA symbols included in one slot and that is spaced at 3 SC-FDMA symbols. CQI information is carried on the remaining 5 SC-FDMA symbols of the 7 SC-FDMA symbols. Two RSs are used in one slot in order to support high-speed UE. Furthermore, UEs are distinguished from each other using Cyclic Shift (CS) sequences. CQI information symbols are modulated into all SC-FDMA symbols and transferred. The SC-FDMA symbols consist of one sequence. That is, UE modulates a CQI using each sequence and sends the CQI.

The number of symbols which may be transmitted in one TTI is 10, and the modulation of CQI information is determined up to QPSK. If QPSK mapping is used for an SC-FDMA symbol, a CQI value of 10 bits may be carried on one slot because a CQI value of 2 bits may be carried on the SC-FDMA symbol. Accordingly, a CQI value having a maximum of 20 bits may be carried on one subframe. Frequency domain spread code is used to spread CQI information in a frequency domain.

A CAZAC sequence (e.g., ZC sequence) of a length 12 may be used as the frequency domain spread code. Control channels may be distinguished from each other by applying CAZAC sequences having different cyclic shift values. IFFT is performed on frequency domain-spread CQI information.

12 different UEs may be subjected to orthogonal multiplexing on the same PUCCH RB by 12 cyclic shifts having the same interval. In the case of a normal CP, a DMRS sequence on the SC-FDMA symbols 1 and 5 (on an SC-FDMA symbol 3 in the case of an extended CP) are similar to a CQI signal sequence on a frequency domain, but modulation, such as CQI information, is not applied to the DMRS sequence.

UE may be semi-statically configured by higher layer signaling so that it periodically reports different CQI, PMI and RI Types on PUCCH resources indicated by PUCCH resource indices $n_{PUCCH}^{(1,\tilde{p})}$, $n_{PUCCH}^{(2,\tilde{p})}$, and $n_{PUCCH}^{(3,\tilde{p})}$. In this case, the PUCCH resource index $n_{PUCCH}^{(2,\tilde{p})}$ is information indicative of a PUCCH region that is used to transmit the PUCCH format 2/2a/2b and the value of a Cyclic Shift (CS) to be used.

Hereinafter, the PUCCH format 1a and 1b is described below.

In the PUCCH format 1a/1b, a symbol modulated using a BPSK or QPSK modulation scheme is multiplied by a CAZAC sequence of a length 12. For example, the results of a is modulation symbol d(0) by a CAZAC sequence r(n) (n=0, 1, 2, . . . , N−1) of a length N become y(0), y(1), y(2), . . . , y(N−1). The symbols y(0), . . . , y(N−1) may be called a block of symbols. After the modulation symbol is multiplied by the CAZAC sequence, block-wise spread using an orthogonal sequence is applied.

A Hadamard sequence of a length 4 is used for common ACK/NACK information, and a Discrete Fourier Transform (DFT) sequence of a length 3 is used for shortened ACK/NACK information and a reference signal.

In the case of an extended CP, a Hadamard sequence of a length 2 is used in a reference signal.

FIG. 7 shows the structure of an ACK/NACK channel in the case of a normal CP in a wireless communication system to which an embodiment of the present invention may be applied.

FIG. 7 illustrates a PUCCH channel structure for transmitting HARQ ACK/NACK without a CQI.

A Reference Signal (RS) is carried on 3 contiguous SC-FDMA symbol that belong to 7 SC-FDMA symbols included in one slot and that are placed in a middle portion, and an ACK/NACK signal is carried on the remaining 4 SC-FDMA symbols of the 7 SC-FDMA symbols.

Meanwhile, in the case of an extended CP, an RS may be carried on 2 contiguous symbols placed in the middle of one slot. The number and positions of symbols used in an RS may be different depending on control channels, and the number and positions of symbols used in an ACK/NACK signal associated with the control channels may be changed depending on the number and positions of symbols used in the RS.

ACK information (not-scrambled state) of 1 bit and 2 bits may be represented as one HARQ ACK/NACK modulation symbol using respective BPSK and QPSK modulation schemes. Positive ACK (ACK) may be encoded as "1", and negative ACK (NACK) may be encoded as "0".

When a control signal is to be transmitted within an allocated bandwidth, two-dimensional spreading is applied in order to increase multiplexing capacity. That is, in order to increase the number of UEs or the number of control channels that may be multiplexed, frequency domain spreading and time domain spreading are used at the same time.

In order to spread an ACK/NACK signal in a frequency domain, a frequency domain sequence is used as a base sequence. A Zadoff-Chu (ZC) sequence which is one of CAZAC sequences, may be used as the frequency domain sequence. For example, by applying a different Cyclic Shift (CS) to a ZC sequence which is a base sequence, different UEs or different control channels may be multiplexed. The number of CS resources supported in a SC-FDMA symbol for PUCCH RBs for transmitting HARQ ACK/NACK is configured by a cell-specific upper layer signaling parameter $\Delta_{shift}^{PUCCH}$.

An ACK/NACK signal spread in a frequency domain is spread in a time domain using orthogonal spreading code. A Walsh-Hadamard sequence or DFT sequence may be used as the orthogonal spreading code. For example, an ACK/NACK signal may be spread for 4 symbols using an orthogonal sequence w0, w1, w2, or w3 of a length 4. Furthermore, an RS is also spread using an orthogonal sequence of a length 3 or length 2. This is called Orthogonal Covering (OC).

A plurality of UEs may be multiplexed using a Code Division Multiplexing (CDM) method using CS resources in a frequency domain and OC resources in a time domain, such as those described above. That is, ACK/NACK information and RSs of a large number of UEs may be multiplexed on the same PUCCH RB.

The number of spreading code supported for ACK/NACK information is restricted by the number of RS symbols with respect to such time domain spreading CDM. That is, the multiplexing capacity of an RS is smaller than the multiplexing capacity of ACK/NACK information because the number of SC-FDMA symbols for RS transmission is smaller than the number of SC-FDMA symbols for ACK/NACK information transmission.

For example, in the case of a normal CP, ACK/NACK information may be transmitted in 4 symbols. 3 pieces of orthogonal spreading code not 4 are used for ACK/NACK information. The reason for this is that only 3 pieces of orthogonal spreading code may be used for an RS because the number of symbols for RS transmission is limited to 3.

In case that 3 symbols of one slot may be used for RS transmission and 4 symbols of the slot may be used for ACK/NACK information transmission in a subframe of a normal CP, for example, if 6 Cyclic Shifts (CSs) may be used in a frequency domain and 3 Orthogonal Cover (OC) resources may be used in a time domain, HARQ ACK from a total of 18 different UEs may be multiplexed within one PUCCH RB. In case that 2 symbols of one slot are used for RS transmission and 4 symbols of one slot are used for ACK/NACK information transmission in a subframe of an extended CP, for example, if 6 CSs may be used in a frequency domain and 2 OC resources may be used in a time domain, HARQ ACK from a total of 12 different UEs may be multiplexed within one PUCCH RB.

The PUCCH format 1 is described below. A Scheduling Request (SR) is transmitted in such a way as to make a request or does not make a request that UE is scheduled. An SR channel reuses an ACK/NACK channel structure in the PUCCH format 1a/1b and consists of an On-Off Keying (OKK) method based on an ACK/NACK channel design. An RS is not transmitted in the SR channel. Accordingly, a sequence of a length 7 is used in the case of a normal CP, and a sequence of a length 6 is used in the case of an extended CP. Different cyclic shifts or orthogonal covers may be allocated to an SR and ACK/NACK. That is, in order to send a positive SR, UE sends HARQ ACK/NACK through a resource allocated for the SR. In order to send a negative SR, UE sends HARQ ACK/NACK through a resource allocated for ACK/NACK.

An enhanced-PUCCH (e-PUCCH) format is described below. An e-PUCCH may correspond to the PUCCH format 3 of an LTE-A system. A block spreading scheme may be applied to ACK/NACK transmission using the PUCCH format 3.

Unlike in the existing PUCCH format 1 series or 2 series, the block spreading scheme is a method of modulating control signal transmission using an SC-FDMA method. As shown in FIG. 8, a symbol sequence may be spread in a time domain using Orthogonal Cover Code (OCC) and transmitted. By using OCC, the control signals of a plurality of UEs may be multiplexed on the same RB. In the case of the PUCCH format 2, one symbol sequence is transmitted in a time domain, and the control signals of a plurality of UEs are multiplexed using a Cyclic Shift (CS) of a CAZAC sequence. In contrast, in the case of a block spreading-based PUCCH format (e.g., the PUCCH format 3), one symbol sequence is transmitted in a frequency domain, and the control signals of a plurality of UEs are multiplexed using time domain spreading using OCC.

FIG. 8 shows an example in which 5 SC-FDMA symbols are generated and transmitted during one slot in a wireless communication system to which an embodiment of the present invention may be applied.

FIG. 8 shows an example in which 5 SC-FDMA symbols (i.e., a data part) are generated using OCC of a length=5 (or SF=5) in one symbol sequence during 1 slot and transmitted. In this case, 2 RS symbols may be used during the 1 slot.

In the example of FIG. 8, the RS symbols may be generated from a CAZAC sequence to which a specific CS value has been applied and may be transmitted in a form in which a specific OCC may be applied (or multiplied) to a plurality of RS symbols. Furthermore, in the example of FIG. 8, assuming that 12 modulation symbols are used in each OFDM symbol (or SC-FDMA symbol) and each of the modulation symbols is generated by QPSK, a maximum number of bits capable of being transmitted in one slot are 12×2=24 bits. Accordingly, a total number of bits capable of being transmitted in 2 slots are 48 bits. As described above, if a PUCCH channel structure using a block spreading method is used, control information having an extended size compared to the existing PUCCH format 1 series and 2 series can be transmitted.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 9 shows an example of component carriers and a carrier aggregation in a wireless communication system to which an embodiment of the present invention may be applied.

FIG. 9a shows the structure of a single carrier used in an LTE system. A component carrier includes a DL CC and an UL CC. One component carrier may have a frequency range of 20 MHz.

FIG. 9b shows the structure of a carrier aggregation used in an LTE-A system. FIG. 9b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (MN) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specific, UE group-specific, or cell-specific way.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PDSCH for UE, an eNB transmits a PDCCH through a PDCCH monitoring set only.

FIG. 10 shows an example of the structure of a subframe according to cross-carrier scheduling in a wireless communication system to which an embodiment of the present invention may be applied.

FIG. 10 shows an example in which 3 DL CCs are aggregated in a DL subframe for LTE-A UE and a DL CC "A" has been configured as a PDCCH monitoring DL CC. IF a CIF is not used, each DL CC may send a PDCCH for scheduling its PDSCH without a CIF. In contrast, if a CIF is used through higher layer signaling, only the single DL CC "A" may send its PDSCH or a PDCCH for scheduling a PDSCH of a different CC using the CIF. In this case, the DL CCs "B" and "C" not configured as PDCCH monitoring DL CCs do not send a PDCCH.

General ACK/NACK Multiplexing Method

In a situation in which UE has to simultaneously send a plurality of ACK/NACKs corresponding to a plurality of data units received from an eNB, an ACK/NACK multiplexing method based on the selection of a PUCCH resource may be taken into consideration in order to maintain the single frequency characteristic of an ACK/NACK signal and to reduce ACK/NACK transmission power.

The content of ACK/NACK responses for a plurality of data units, together with ACK/NACK multiplexing, is identified by a combination of a PUCCH resource used in actual ACK/NACK transmission and the resource of QPSK modulation symbols.

For example, if one PUCCH resource sends 4 bits and a maximum of 4 data units are transmitted, ACK/NACK results may be identified in an eNB as in Table 3 below.

TABLE 3

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |

TABLE 3-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3, HARQ-ACK (i) is indicative of ACK/NACK results for an i-th data unit. In Table 3, discontinuous transmission (DTX) means that there is no data unit transmitted for a corresponding HARQ-ACK(i) or that UE does not detect a data unit corresponding to the HARQ-ACK(i).

In accordance with Table 3, a maximum of 4 PUCCH resources $n_{PUCCH,0}^{(1)}$, $n_{PUCCH,1}^{(1)}$, $n_{PUCCH,2}^{(1)}$, and $n_{PUCCH,3}^{(1)}$ are present, and b(0), b(1) has 2 bits transmitted using a selected PUCCH.

For example, if UE successfully receives all of the 4 data units, the UE sends 2 bits (1, 1) using the PUCCH resource $n_{PUCCH,1}^{(1)}$.

If UE fails in decoding in first and third data units and succeed in decoding in second and fourth data units, the UE sends bits (1, 0) using the PUCCH resource $n_{PUCCH,3}^{(1)}$.

In the selection of an ACK/NACK channel, if at least one ACK is present, NACK and DTX are coupled. The reason for this is that all of ACK/NACK states are unable to be represented using a combination of a reserved PUCCH resource and a QPSK symbol. If ACK is not present, however, DTX is decoupled from NACK.

In this case, a PUCCH resource linked to a data unit corresponding to one clear NACK may be reserved in order to send a signal for a plurality of ACKs/NACKs.

PDCCH Validation for Semi-Persistent Scheduling

Semi-Persistent Scheduling (SPS) is a scheduling method for allocating resources to specific UE so that the resources continue to be maintained during a specific time interval.

If a specific amount of data is transmitted during a specific time as in a Voice over Internet Protocol (VoIP), the waste of control information can be reduced using the SPS method because the control information does not need to be transmitted at each data transmission interval for resource allocation. In a so-called SPS method, a time resource area in which resources may be allocated is first allocated to UE.

In this case, in the semi-persistent allocation method, a time resource area allocated to specific UE may be configured to have a cycle. Next, the allocation of time-frequency resources is completed by allocating a frequency resource area, if necessary. The allocation of a frequency resource area as described above may be called so-called activation. If the semi-persistent allocation method is used, resource allocation is maintained by one signaling during a specific period. Accordingly, signaling overhead can be reduced because resource allocation does not need to be repeatedly performed.

Thereafter, if resource allocation for the UE is not required, signaling for releasing the frequency resource allocation may be transmitted from an eNB to the UE. The release of the allocation of a frequency resource area as described above may be called deactivation.

In current LTE, for SPS for uplink and/or downlink, first, UE is notified of that SPS transmission/reception need to be performed in what subframes through Radio Resource Control (RRC) signaling. That is, a time resource of time-frequency resources allocated for SPS is first designated through RRC signaling. In order to notify the UE of available subframes, for example, the UE may be notified of the cycle and offset of a subframe. However, the UE does not immediately perform transmission/reception according to SPS although it has received RRC signaling because only the time resource area is allocated to the UE through RRC signaling. The allocation of the time-frequency resources is completed by allocating a frequency resource area, if necessary. The allocation of a frequency resource area as described above may be called activation, and the release of the allocation of a frequency resource area may be called deactivation.

Accordingly, the UE receives a PDCCH indicative of activation, allocates a frequency resource based on RB allocation information included in the received PDCCH, and starts to perform transmission/reception based on a subframe cycle and offset allocated through RRC signaling by applying a modulation scheme and coding rate according to Modulation and Coding Scheme (MCS) information.

Next, when receiving a PDCCH indicative of deactivation from an eNB, the UE stops the transmission/reception. When a PDCCH indicative of activation or reactivation is received after the transmission/reception is stopped, the UE resumes transmission/reception using a subframe cycle and offset allocated through RRC signaling using RBs and an MCS designated in the corresponding PDCCH. That is, the allocation of time resources is performed through RRC signaling, but the transmission/reception of actual signals may be performed after a PDCCH indicative of the activation and reactivation of SPS is received. The stop of signal transmission/reception is performed after a PDCCH indicative of the deactivation of SPS is received.

If the following conditions are all satisfied, the UE may validate a PDCCH including an SPS indication. First, CRC parity bits added for PDCCH payload need to be scrambled with an SPS C-RNTI. Second, a New Data Indicator (NDI) field needs to be set to 0. In this case, in the case of the DCI formats 2, 2A, 2B, and 2C, an NDI field is indicative of one of activated transport blocks.

Furthermore, the validation of each field used in the DCI format is completed when each field is set based on Table 4 and Table 5 below. When such a validation is completed, the UE recognizes the received DCI information as being valid SPS activation or deactivation (or release). In contrast, if the validation is not completed, the UE recognizes that non-matching CRC is included in a received DCI format.

Table 4 illustrates fields for PDCCH validation indicative of SPS activation.

TABLE 4

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 illustrates fields for PDCCH validation indicative of SPS deactivation (or release).

TABLE 5

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

If a DCI format is indicative of SPS downlink scheduling activation, a TPC command value for a PUCCH field may be used an index indicative of 4 PUCCH resource values set by a higher layer.

PUCCH Piggybacking

FIG. 11 shows an example of transport channel processing for an UL-SCH in a wireless communication system to which an embodiment of the present invention may be applied.

In a 3GPP LTE system (=E-UTRA, Rel. 8), in the case of UL, in order to efficiently use the power amplifier of UE, a Peak-to-Average Power Ratio (PAPR) characteristic or Cubic Metric (CM) characteristic affecting performance of the power amplifier are set to maintain good single carrier transmission. That is, in the case of PUSCH transmission in an existing LTE system, the single carrier characteristic of data may be maintained through DFT-precoding. In the case of PUCCH transmission, a single carrier characteristic may be maintained by carrying information on a sequence having a single carrier characteristic and sending the information. However, if DFT-precoded data is discontiguously allocated based on a frequency axis, or a PUSCH and a PUCCH are transmitted at the same time, such a single carrier characteristic is not maintained. Accordingly, if PUSCH transmission is to be w performed in the same subframe as that of PUCCH transmission as in FIG. 11, Uplink Control Information (UCI) information to be transmitted through a PUCCH is transmitted (piggybacked) along with data through a PUSCH in order to maintain the single carrier characteristic.

In a subframe in which a PUSCH is transmitted, a method of multiplexing Uplink Control Information (UCI) (a CQI/PMI, HARQ-ACK, an RI, etc.) with a PUSCH region is used because existing LTE UE is unable to send a PUCCH and a PUSCH at the same time as described above.

For example, if a Channel Quality Indicator (CQI) and/or a Precoding Matrix Indicator (PMI) are to be transmitted in a subframe allocated to send a PUSCH, UL-SCH data and the CQI/PMI may be multiplexed prior to DFT-spreading and may be transmitted along with control information and data. In this case, the UL-SCH data is subjected to rate matching by taking the CQI/PMI resources into consideration. Furthermore, a method of puncturing the UL-SCH data into control information, such as HARQ ACK, and an RI, and multiplexing the results with a PUSCH region is used.

FIG. 12 shows an example of a signal processing process in an uplink shared channel, that is, a transport channel, in a wireless communication system to which an embodiment of the present invention may be applied.

Hereinafter, a signal processing process for an uplink shared channel (hereinafter called an "UL-SCH") may be applied to one or more transport channels or control information types.

Referring to FIG. 12, an UL-SCH transfers data to a coding unit in the form of a Transport Block (TB) once for each Transmission Time Interval (TTI).

CRC parity bits $p_0, p_1, p_2, p_3, \ldots, p_{L-1}$ are attached to the bits $a_0, a_1, a_2, a_3, \ldots, a_{A-1}$ of the transport block received from a higher layer at step S120. In this case, A is the size of the transport block, and L is the number of parity bits. The input bits to which the CRC parity bits have been attached are $b_0, b_1, b_2, b_3, \ldots, b_{B-1}$. In this case, B is indicative of the number of bits of the transport block including the CRC parity bits.

The input bits $b_0, b_1, b_2, b_3, \ldots, b_{B-1}$ are segmented into several Code Blocks (CBs) based on the TB size. A CRC is attached to the segmented several CBs at step S121. Bits after the segmentation of the CBs and the attachment of the CRC are $c_{r0}, c_{r1}, c_{r2}, c_{r3}, \ldots, c_{r(K_r-1)}$. In this case, r is a CB number (r=0, ..., C−1), and Kr is the number of bits according to a CB r. Furthermore, C is a total number of CBs.

Next, channel coding is performed at step S122. Output bits after the channel coding are $d_{r0}^{(i)}, d_{r1}^{(i)}, d_{r2}^{(i)}, d_{r3}^{(i)}, \ldots, d_{r(D_r-1)}^{(i)}$. In this case, i is a coded stream index and may have a value 0, 1, or 2 value. $D_r$ is the number of bits of the i-th-coded stream for the CB r. r is a CB number (r=0, ..., C−1), and C a total number of CBs. Each CB may be coded by turbo coding.

Next, rate matching is performed at step S123. Bits after the rate matching are $e_{r0}, e_{r1}, e_{r2}, e_{r3}, \ldots, e_{r(E_r-1)}$. In this case, r is a CB number (r=0, ..., C−1), and C is a total number of CBs. $E_r$ is the number of bits of a r-th code block that has been subjected to rate matching.

Next, a concatenation between the CBs is performed again at step S124. Bits after the concatenation of the CBs are $f_0, f_1, f_2, f_3, \ldots, f_{G-1}$. In this case, G is a total number of coded bits for transmission. When control information is multiplexed with UL-SCH transmission, the number of bits used for control information transmission is not included.

Meanwhile, when control information is transmitted in a PUSCH, channel coding is independently performed on a CQI/PMI, an RI, and ACK/NACK, that is, the control information, at steps S126, S127, and S128. The pieces of control information have different coding rates because different coded symbols are allocated for the transmission of the control information.

In Time Division Duplex (TDD), ACK/NACK feedback mode supports two types of ACK/NACK bundling mode and ACK/NACK multiplexing mode by the configuration of a higher layer. For ACK/NACK bundling, ACK/NACK information bits include 1 bit or 2 bits. For ACK/NACK multiplexing, ACK/NACK information bits include 1 bit to 4 bits.

After the concatenation between the CBs at step S124, the multiplexing of the coded bits $f_0, f_1, f_2, f_3, \ldots, f_{G-1}$ of the UL-SCH data and the coded bits $q_0, q_1, q_2, q_3, \ldots, q_{N_L \cdot Q_{CQI}-1}$ of the CQI/PMI are performed at step S125. The results of the multiplexing of the UL-SCH data and the CQI/PMI are $g_0, g_1, g_2, g_3, \ldots, g_{H'-1}$. In this case, $g_i$ (i=0, ..., H'−1) is indicative of a column vector having a length ($Q_m \cdot N_L$). $H=(G+N_L \cdot Q_{CQI})$ and $H'=H/(N_L \cdot Q_m)$. $N_L$ and is the number of layers to which an UL-SCH transport block has been mapped. H is a total number of coded bits allocated to the $N_L$ transmission layers to which the transport block has been mapped for the UL-SCH data and CQI/PMI information.

Next, the multiplexed data and CQI/PMI and the separately channel-coded RI and ACK/NACK are subjected to channel interleaving, thereby generating an output signal at step S129.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 13 shows the configuration of a known MIMO communication system.

Referring to FIG. 13, if the number of transmission (Tx) antennas is increased to $N_T$ and the number of reception (Rx) antennas is increased to $N_R$ at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment $R_i$ by a maximum transfer rate $R_o$ if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (NT×NR) of the number of transmission antennas (NT) and the number of reception antennas (NR).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 13, it is assumed that NT transmission antennas and NR reception antennas are present.

First, a transmission signal is described below. If the NT transmission antennas are present as described above, a maximum number of pieces of information which can be transmitted are NT, which may be represented using the following vector.

$$s = [s_1, s_2, \ldots, s_{N_T}]^T \qquad \text{[Equation 2]}$$

Meanwhile, transmission power may be different in each of pieces of transmission information $s_1, s_2, \ldots, s_{N_T}$. In this case, if pieces of transmission power are $P_1, P_2, \ldots, P_{N_T}$, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Furthermore, ŝ may be represented as follows using the diagonal matrix P of transmission power.

$$\hat{s} = \begin{bmatrix} p_1 & & & 0 \\ & p_2 & & \\ & & \ddots & \\ 0 & & & p_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ having controlled transmission power is multiplied by a weight matrix W, thus forming $N_T$ transmission signals $x_1, x_2, \ldots, x_{NT}$ that are actually transmitted. In this case, the weight matrix functions to properly distribute the transmission information to antennas according to a transport channel condition. The following may be represented using the transmission signals $x_1, x_2, \ldots, x_{NT}$.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In this case, wij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If $N_R$ reception antennas are present, the reception signals $y_1, y_2, \ldots, y_{NR}$ of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as $h_{ij}$. In this case, it is to be noted that in order of the index of $h_{ij}$, the index of a reception antenna comes first and the index of a transmission antenna then comes.

Several channels may be grouped and expressed in a vector and matrix form. For example, a vector expression is described below.

FIG. 14 is a diagram showing a channel from a plurality of transmission antennas to a single reception antenna.

As shown in FIG. 14, a channel from a total of NT transmission antennas to a reception antenna i may be represented as follows.

$$h_i^T = [h_{i1}, h_{i2}, \ldots, h_{iN_T}] \quad \text{[Equation 7]}$$

Furthermore, if all channels from the $N_T$ transmission antenna to $N_R$ reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN $n_1, n_2, \ldots, n_{NR}$ added to the $N_R$ reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas $N_R$, and the number of columns becomes equal to the number of transmission antennas $N_T$. That is, the channel matrix H becomes an $N_R \times N_T$ matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission when signal is transmitted through a channel and a method of transmitting signal known to both the transmission side and the reception side is mostly used. The aforementioned signal is called a pilot signal or Reference Signal (RS).

When data is transmitted/received using a multi-input/output antenna, a channel state between a transmission antenna and a reception antenna needs to be detected in order to accurately receive a signal. Accordingly, each transmission antenna needs to have an individual reference signal.

A downlink reference signal includes a Common Reference Signal (CRS) shared by all UEs within one cell and a Dedicated Reference Signal (DRS) for specific UE. Information for demodulation and channel measurement may be provided using such reference signals.

The reception side (i.e., UE) measures a channel state based on a CRS and feeds indicators related to channel quality, such as a Channel Quality Indicator (CQI), a Precoding Matrix Index (PMI) and/or a Rank Indicator (RI), back to the transmission side (i.e., an eNB). The CRS is also called a cell-specific RS. In contrast, a reference signal related to the feedback of Channel State Information (CSI) may be defined as a CSI-RS.

The DRS may be transmitted through resource elements if data on a PDSCH needs to be demodulated. UE may receive information about whether a DRS is present through a higher layer, and the DRS is valid only if a corresponding PDSCH has been mapped. The DRS may also be called a UE-specific RS or demodulation RS (DMRS).

FIG. 15 illustrates a reference signal pattern mapped to a downlink resource block pair in a wireless communication system to which an embodiment of the present invention may be applied.

Referring to FIG. 15, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 15a) and has a length of 12 OFDM symbols in the case of an extended CP (FIG. 15b). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

A rule for mapping a CRS to a resource block is defined as follows.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l denote a subcarrier index and a symbol index, respectively, and p denotes an antenna port. $N_{symb}^{DL}$ denotes the number of OFDM symbols in one downlink slot, and $N_{RB}^{DL}$ denotes the number of radio resources allocated to downlink. $n_s$ denotes a slot index, and $N_{ID}^{cell}$ denotes a cell ID. mod denotes modulo operation. The position of a reference signal is different depending on a value $v_{shift}$ in a frequency domain. Since the value $v_{shift}$ depends on a cell ID, the position of a reference signal has various frequency shift values depending on a cell.

More specifically, in order to improve channel estimation performance through a CRS, the position of a CRS may be shifted in a frequency domain. For example, if reference signals are placed at an interval of 3 subcarriers, reference signals in one cell are allocated to a 3k-th subcarrier, and reference signals in the other cell are allocated to a (3k+1)-th subcarrier. From the point of view of a single antenna port, reference signals are arrayed at an interval of 6 resource elements in a frequency domain. Reference signals are spaced apart from reference signals allocated in other antenna ports at an interval of 3 resource elements.

In a time domain, reference signals are started from the symbol index 0 of each slot and are arrayed at a constant interval. A time interval is different defined depending on the length of a cyclic prefix. In the case of a normal cyclic prefix, reference signals are placed in the symbol indices 0 and 4 of a slot. In the case of an extended cyclic prefix, reference signals are placed in the symbol indices 0 and 3 of a slot. A reference signal for an antenna port that belongs to 2 antenna ports and that has a maximum value is defined within one OFDM symbol. Accordingly, in the case of 4 transmission antenna transmission, reference signals for RS antenna ports 0 and 1 are placed in the symbol indices 0 and 4 of a slot (i.e., symbol indices 0 and 3 in the case of an extended cyclic prefix), and reference signals for antenna ports 2 and 3 are placed in the symbol index 1 of the slot. The positions of reference signals for antenna ports 2 and 3 in a frequency domain are changed in a second slot.

A DRS is described in more detail below. The DRS is used to demodulate data. In multi-input/output antenna transmission, precoding weight used for specific UE is combined with a transport channel transmitted by each transmission antenna when the UE receives a reference signal and is used to estimate a corresponding channel without any change.

A 3GPP LTE system (e.g., release-8) supports a maximum of 4 transmission antennas and uses a DRS for rank beamforming. The DRS for rank 1 beamforming also indicates a reference signal for an antenna port index 5.

A rule on which a DRS is mapped to a resource block is defined as follows. Equation 13 illustrates a normal cyclic prefix, and Equation 14 illustrates an extended cyclic prefix.

$$k = (k') \bmod N_{sc}^{RB} + N_{sc}^{RB} \cdot n_{PRB}$$ [Equation 13]

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

-continued $$k = (k') \bmod N_{sc}^{RB} + N_{sc}^{RB} \cdot n_{PRB}$$ [Equation 14]

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 12 to 14, k and p denote a subcarrier index and an antenna port, respectively. $N_{RB}^{DL}$, $n_s$, and $N_{ID}^{cell}$ denote the number of RBs allocated to downlink, the number of slot indices, and the number of cell IDs. The position of an RS is different depending on the value $v_{shift}$ from the point of view of a frequency domain.

In Equations 13 and 14, k and l denote a subcarrier index and a symbol index, respectively, and p denotes an antenna port. $N_{sc}^{RB}$ denotes the size of an RB in a frequency domain and is represented as the number of subcarriers. $n_{PRB}$ denotes the number of physical RBs. $N_{RB}^{PDSCH}$ denotes the frequency bandwidth of an RB for PDSCH transmission. $n_s$ denotes the index of a slot, and $N_{ID}^{cell}$ denotes the ID of a cell. mod denotes modulo operation. The position of a reference signal is different depending on the value $v_{shift}$ in a frequency domain. Since the value $v_{shift}$ depends on the ID of a cell, the position of a reference signal has various frequency shift values depending on a cell.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead can be provided according to a deployment scenario.

A sixteenth array completely turns off the switch of an SRS within a cell, which is mostly suitable for a serving cell which provides service to high-speed UEs.

FIG. 16 illustrates an uplink subframe including the symbols of a Sounding Reference Signal (SRS) in a wireless communication system to which an embodiment of the present invention may be applied.

Referring to FIG. 16, an SRS is always transmitted through the last SC-FDMA symbol in an arrayed subframe. Accordingly, an SRS and DMRS are placed in different SC-FDMA symbols. The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

Coordinated Multi-Point (CoMP) Transmission and Reception

In line with the demand of LTE-advanced, there has been proposed CoMP transmission in order to improve system performance. CoMP is also called co-MIMO, collaborative MIMO, or network MIMO. CoMP is expected to improve performance of UE located in a cell edge and to improve the average throughput of a cell (or sector).

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in a cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a Coordinated Scheduling/Beamforming (CS/CB) method.

In the JP method, data may be used in each point (ie, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

Relay Node (RN)

In a relay node, data transmitted/received between an eNB and UE is transferred through two different links (i.e., a backhaul link and an access link). An eNB may include a donor cell. A relay node is wirelessly connected to a radio access network through a donor cell.

In relation to the use of the bandwidth (or spectrum) of a relay node, a case where a backhaul link operates in the same frequency bandwidth as that of an access link is called an "in-band", and a case where a backhaul link and an access link operate in different frequency bandwidths is called an "out-band." In both the in-band and the out-band, UE (hereinafter called "legacy UE") operating in accordance with an existing LTE system (e.g., release-8) needs to be able to access a donor cell.

A relay node may be divided into a transparent relay node and a non-transparent relay node depending on whether UE recognizes a relay node. The term "transparent" means whether UE communicates with a network through a relay node is not recognized. The term "non-transparent" means whether UE communicates with a network through a relay node is recognized.

In relation to control of a relay node, a relay node may be divided into a relay node formed as part of a donor cell and a relay node autonomously controlling a cell.

A relay node formed as part of a donor cell may have a relay node identity (relay ID), but does not have its own cell identity.

If at least part of Radio Resource Management (RRM) is controlled by an eNB belonging to a donor cell, it is called a relay node formed as part of a donor cell although the remaining parts of the RRM are placed in the relay node. Such a relay node may support legacy UE. For example, various types of smart repeaters, decode-and-forward relays, and second layer (L2) relay nodes and a Type-2 relay node correspond to such a relay node.

In the case of a relay node autonomously controlling a cell, the relay node controls one or a plurality of cells, and a unique physical layer cell identity is provided to each of the cells controlled by the relay node. Furthermore, the cells controlled by the relay node may use the same RRM mechanism. From a viewpoint of UE, there is no difference between access to a cell controlled by a relay node and access to a cell controlled by a common eNB. A cell controlled by such a relay node can support legacy UE. For example, a self-backhauling relay node, a third layer (L3) relay node, a Type-1 relay node, and a Type-1a relay node correspond to such a relay node.

The Type-1 relay node is an in-band relay node and controls a plurality of cells, and each of the plurality of cells is seen by UE as a separate cell different from a donor cell. Furthermore, the plurality of cells has different physical cell IDs (this is defined in LIE release-8), and the relay node may send its own synchronization channel and reference signal. In the case of one cell operation, UE directly may receive scheduling information and HARQ feedback from a relay node and send its own control channels (e.g., a Scheduling Request (SR), a CQI, and ACK/NACK) to the relay node. Furthermore, the Type-1 relay node is seen by legacy UE (i.e., UE operating in accordance with an LTE release-8 system) as a legacy eNB (i.e., an eNB operating in accordance with an LTE release-8 system). That is, the Type-1 relay node has backward compatibility. Meanwhile, the Type-1 relay node is seen by UEs operating in accordance with an LTE-A system as an eNB different from a legacy eNB, thereby being capable of providing improved performance.

The Type-1a relay node has the same characteristics as the Type-1 relay node except that it operates in an out-band. The operation of the Type-1a relay node may be configured so that an influence on a first layer (L1) operation is minimized.

The Type-2 relay node is an in-band relay node, and it does not have a separate physical cell ID and thus does not form a new cell. The Type-2 relay node is transparent to legacy UE, and the legacy UE does not recognize the presence of the Type-2 relay node. The Type-2 relay node may send a PDSCH, but does not send at least CRS and PDCCH.

In order to prevent a relay node from operating in in-band, some resources in a time-frequency domain may need to be reserved for a backhaul link and may be configured so that they are not used for an access link. This is called resource partitioning.

A known principle in resource partitioning in a relay node may be described as follows. Backhaul downlink and access downlink may be multiplexed according to a Time Division Multiplexing (TDM) method on one carrier frequency (i.e., only one of a backhaul downlink and an access downlink in a specific time is activated). Likewise, backhaul uplink and access uplink may be multiplexed according to a TDM method on one carrier frequency (i.e., only one of a backhaul uplink and an access uplink in a specific time is activated).

In backhaul link multiplexing in FDD, backhaul downlink transmission may be performed in a downlink frequency bandwidth, and the transmission of a backhaul uplink may be performed in an uplink frequency bandwidth. In backhaul link multiplexing in TDD, backhaul downlink transmission may be performed in a downlink subframe of an eNB and a relay node, and the transmission of a backhaul uplink may be performed in an uplink subframe of an eNB and a relay node.

In the case of an in-band relay node, for example, when the reception of a backhaul downlink from an eNB and the transmission of an access downlink to UE are performed in the same frequency bandwidth at the same time, signal interference may be generated in the reception end of a relay node due to a signal transmitted by the transmission end of the relay node. That is, signal interference or RF jamming may be generated in the RF front end of the relay node. Likewise, when the transmission of a backhaul uplink to an eNB and the reception of an access uplink from UE are performed in the same frequency bandwidth at the same time, signal interference may be generated.

Accordingly, in order for a relay node to send/receive signals in the same frequency bandwidth at the same time, a sufficient separation needs to be provided between a reception signal and a transmission signal (e.g., that the reception signal and the transmission signal need to be sufficiently separated geographically, such as that a transmission antenna and a reception antenna are installed on the ground and in the grave, respectively).

One method for solving such signal interference is to allow a relay node to operate in such a way as not to send a signal to UE while receiving a signal from a donor cell. That is, a gap is generated in transmission from the relay node to the UE, and the UE (including legacy UE) is configured to not expect any transmission from the relay node during the gap. Such a gap may be configured by configuring a Multicast Broadcast Single Frequency Network (MBSFN) subframe.

FIG. 17 illustrates the segmentation of a relay node resource in a wireless communication system to which an embodiment of the present invention may be applied.

In FIG. 17, a first subframe is a common subframe, and a downlink (i.e., access downlink) control signal and data are transmitted from a relay node to UE in the first subframe. In contrast, a second subframe is an MBSFN subframe, and a control signal is transmitted from the relay node to the UE in the control region of the downlink subframe, but no transmission is performed from the relay node to the UE in the remaining region of the downlink subframe. In this case, since legacy UE expects the transmission of a PDCCH in all downlink subframes (i.e., a relay node needs to provide support so that legacy UEs within the region of the relay node perform measurement functions by receiving a PDCCH every subframe), the PDCCH needs to be transmitted in all downlink subframes for the correct operation of the legacy UE. Accordingly, the relay node does not perform backhaul downlink reception, but needs to perform access downlink transmission in the first N (N=1, 2 or 3) OFDM symbol period of a subframe (i.e., the second subframe) on the subframe configured for downlink (i.e., backhaul downlink) transmission from an eNB to the relay node. For this, the relay node may provide backward compatibility to serving legacy UE because a PDCCH is transmitted from the relay node to the UE in the control region of the second subframe. The relay node may receive transmission from the eNB while no transmission is performed from the relay node to the UE in the remaining region of the second subframe. Accordingly, access is downlink transmission and backhaul downlink reception may not be performed at the same time in an in-band relay node through such a resource partitioning method.

The second subframe using an MBSFN subframe is described in detail. The control region of the second subframe may be said to be a relay node non-hearing period. The relay node non-hearing interval means an interval in which a relay node does not receive a backhaul downlink signal, but sends an access downlink signal. The interval may be configured to have a 1, 2 or 3 OFDM length, such as that described above. A relay node performs access downlink transmission to UE in a relay node non-hearing interval, but may perform backhaul downlink reception from an eNB in the remaining region. In this case, time is taken for the relay node to switch from transmission mode to reception mode because the relay node is unable to perform transmission/reception in the same frequency bandwidth at the same time. Accordingly, a Guard Time (GP) needs to be configured so that the relay node switches to transmission/reception mode in the first some interval of a backhaul downlink reception region. Likewise, a guard time for enabling the relay node to switch to reception/transmission mode may be configured although the relay node operates in such a way as to receive a backhaul downlink from the eNB and to send an access downlink to the UE. The length of such a guard time may be set as a value in a time domain. For example, the length of the guard time may be set as a k (k≥1) time sample (Ts) value or may be set as one or more OFDM symbol length. Alternatively, relay node backhaul downlink subframes may be contiguously configured, or the guard time of the last part of a subframe may not be defined or configured according to a specific subframe timing alignment relationship. Such a guard time may be defined only in a frequency domain configured for backhaul downlink subframe transmission in order to maintain backward compatibility (if a guard time is configured in an access downlink interval, legacy UE cannot be supported). In a backhaul downlink reception interval other than the guard time, the relay node can receive a PDCCH and a PDSCH from the eNB. This may be represented by a relay-PDCCH (R-PDCCH) and a relay-PDSCH (R-PDSCH) in the meaning of a relay node-dedicated physical channel.

Channel State Information (CSI) Feedback

An MIMO method may be divided into an open-loop method and a closed-loop method. In the open-loop method, a transmission end performs MIMO transmission without the feedback of CSI from an MIMO reception end. In the closed-loop MIMO method, a transmission end receives CSI fed back by an MIMO reception end and performs MIMO transmission. In the closed-loop MIMO method, in order to obtain the multiplexing gain of an MIMO transmission antenna, each of a transmission end and a reception end may perform beamforming based on CSI. A transmission end (e.g., an eNB) may allocate an uplink control channel or an uplink shared channel to a reception end (e.g., UE) so that a reception end (e.g., UE) is able to feed CSI back.

The feedback CSI may include a Rank Indicator (RI), a Precoding Matrix Index (PMI), and a Channel Quality Indicator (CQI).

The RI is information about a channel rank. The channel of a rank means a maximum number of layers (or streams) in which different information may be transmitted through the same time-frequency resource. A rank value may be fed back in a longer cycle (i.e., less frequently) than a PMI and CQI because it is mostly determined by long term fading of a channel.

The PMI is information about a precoding matrix which is used in transmission from a transmission end and is a value into which the spatial characteristic of a channel is reflected. The term "precoding" means that a transmission layer is mapped to a transmission antenna, and a layer-antenna mapping relationship may be determined based on a precoding matrix. The PMI corresponds to the PMI of an eNB, which is preferred by UE based on a metric, such as a Signal-to-Interference plus Noise Ratio (SINR). In order to reduce feedback overhead of precoding information, a method of previously sharing, by a transmission end and a reception end, a codebook including several precoding matrices and feeding only an index indicative of a specific precoding matrix in the corresponding codebook back may be used.

The CQI is information indicative of the intensity of channel or quality of channel. The CQI may be represented as a predetermined MCS combination. That is, a CQI index that is fed back is indicative of a corresponding modulation scheme and coding rate. In general, the CQI is a value into which a reception SINR which may be obtained when an eNB configures a space channel using a PMI is reflected.

In a system (e.g., LTE-A system) supporting an extended antenna configuration, to obtain additional multi-user diversity using a multi-user-MIMO (MU-MIMO) method is taken into consideration. In the MU-MIMO method, an interference channel is present between UEs multiplexed in an antenna region. Accordingly, it is necessary to prevent interference from occurring in another UE if an eNB performs downlink transmission using CSI fed back by one UE of multiple users. Accordingly, in order for an MU-MIMO operation to be correctly performed, CSI having higher accuracy compared to a single user-MIMO (SU-MIMO) method needs to be fed back.

A new CSI feedback method using improved CSI including an existing RI, PMI, and CQI may be used so that more accurate CSI can be measured and reported as described above. For example, precoding information fed back by a reception end may be indicated by a combination of two PMIs. One (the first PMI) of the two PMIs has the attributes of a long term and/or a wideband and may be called W1. The other (the second PMI) of the two PMIs has the attributes of a short term and/or a sub-band and may be called W2. The final PMI may be determined by a combination (or function) of W1 and W2. For example, assuming that the final PMI is W, W=W1*W2 or W=W2*W1 may be defined.

In this case, the average characteristics of a channel in terms of the frequency and/or time are reflected in W1. In other words, W1 may be defined as CSI in which the characteristics of a long term channel in terms of time are reflected, the characteristics of a wideband channel in terms of frequency are reflected, or the characteristics of a long term channel in terms of time and a wideband channel in terms of frequency are incorporated. In order to simply represent such characteristics of W1, W1 is called CSI of long term-wideband attributes (or a long term wideband PMI).

A channel characteristic that is instantaneous compared to W1 is reflected in W2. In other words, W2 may be defined as CSI in which the characteristics of a short term channel in terms of time are reflected, the characteristics of a sub-band channel in terms of frequency are reflected, or the characteristics of a short term channel in terms of time and a sub-band channel in terms of frequency are reflected. In order to simply represent such characteristics of W2, W2 is called CSI of a short term-sub-band attributes (or a short term sub-band PMI).

In order for one final precoding matrix W to be determined based on information about 2 different attributes (e.g., W1 and W2) indicative of a channel state, it is necessary to configure a separate codebook including precoding matrices indicative of channel information about attributes (i.e., a first codebook for W1 and a second codebook for W2). The form of a codebook configured as described above may be called a hierarchical codebook. Furthermore, to determine a codebook to be finally used using the hierarchical codebook may be called hierarchical codebook transformation.

If such a codebook is used, channel feedback of higher accuracy compared to a case where a single codebook is used is made possible. Single cell MU-MIMO and/or multi-cell cooperation communication may be supported using channel feedback of higher accuracy as described above.

Enhanced PMI for MU-MIMO or CoMP

In a next-generation communication standard, such as LTE-A, there has been proposed transmission schemes, such as MU-MIMO and CoMP, in order to achieve a high transfer rate. In order to implement such improved transmission schemes, UE needs to feed more complicated and various CSI back to an eNB.

For example, in MU-MIMO, a CSI feedback method of uploading, by UE-A, the PMI (hereinafter called a "best companion PMI (BCPMI)") of UE to be scheduled along with the UE-A, together with the desired PMI of the UE-A, when the UE-A selects a PMI is taken into consideration.

That is, when co-scheduled UE is used as a precoder in a precoding matrix codebook, it calculates a BCPMI that provides less interference to UE-A and additionally feeds the calculated BCPMI back to an eNB.

The eNB schedules the UE-A and another UE which prefers BCPM (Best Companion Precoding Matrix (BCPM) corresponding to a BCPMI) precoding using the information.

A BCPMI feedback method is divided into explicit feedback and implicit feedback depending on whether feedback payload is present or not.

First, there is an explicit feedback method having feedback payload.

In the explicit feedback method, UE-A determines a BCPMI within a precoding matrix codebook and feeds the BCPMI back to an eNB through a control channel. In one method, UE-A may select an interference signal precoding matrix that maximizes an estimated SINR within a codebook and feed the interference signal precoding matrix back as a BCPMI value.

An advantage of the explicit feedback method is to select a BCPMI more effective in removing interference and to send the selected BCPMI. The reason for this is that, assuming that each of all codewords within a codebook is one interference beam, UE determines a value most effective in removing interference to be a BCPMI by performing comparison on metrics, such as SINRs. A greater feedback payload size is required because candidate BCPMIs are increased as a codebook size is increased.

Second, there is an implicit feedback method not having feedback payload.

In the implicit feedback method, UE-A does not search a codebook for a codeword having the least interference and select the retrieved codebook as a BCPMI, but a corresponding BCPMI is statically determined once a desired PMI is determined. In this case, a BCPMI may include vectors orthogonal to the determined desired PMI.

The reason for this is that it is effective to reduce interference from an interference signal when desired PM is selected in directions other than the direction of a PM because the desired PM has been configured in the direction in which the channel gain of a channel H can be maximized in order to maximize a reception SINR. If the channel H is analyzed as a plurality of independent channels through Singular Value Decomposition (SVD), such a BCPMI decision method is further justified. A 4×4 channel H may be decomposed through SVD as in Equation 15 below.

$$H = ULV^H = [u_1 \ u_2 \ u_3 \ u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix}$$ [Equation 15]

In Equation 15, U, V is a unitary matrix. $u_i$, $v_i$, and $\lambda_i$ are the 4×1 left singular vector, 4×1 right singular vector, and singular value of a channel H and are arranged in $\lambda_i > \lambda_{i+1}$ in descending order. All channel gains which may be theoretically obtained if a beamforming matrix V is used in a transmission end and a beamforming matrix $U^H$ is used in a reception end can be obtained without a loss.

In the case of a rank 1, optimal performance may be obtained from the point of view of an SNR because a channel gain $|\lambda_i|^2$ is obtained when a transmission beamforming vector $v_1$ and a reception beamforming vector u1 are used. For example, it is advantage for UE-A to select a PM most similar to $v_1$ in the case of a rank 1. If a desired PM is ideally matched up with $v_1$, an interference signal can be perfectly removed without a loss of a desired signal by setting a reception beam as $u_1$ and setting the transmission beam of the interference signal in a direction orthogonal to the PM. If there is some difference between a desired PM and $v_1$ due to a quantization error, however, an interference signal may not be perfectly removed without a loss of a desired signal because the transmission beam of the interference signal set in the direction orthogonal to the PM is no longer the same as a beam orthogonal to but it may help control the interference signal if the quantization error is small.

As an example of implicit feedback, if an LTE codebook is used, a BCPMI may be statically determined to be a vector index orthogonal to a PMI.

In this case, it has been assumed that the number of transmission antennas is 4 and UE which has fed the PMI back has a reception rank of 1, and 3 vectors orthogonal to a desired PMI are represented as 3 BCPMIs.

For example if a PMI is 3, a BCPMI is determined to be 0, 1, or 2. The PMI and the BCPMI are indicative of the indices of a 4×1 vector codeword within a codebook. An eNB considers the BCPMI set (BCPMI=0, 1, 2) to be a valid precoding index for removing interference and uses some of or the entire BCPMI set as the precoder of co-schedule UE.

An advantage of an implicit PMI is that there is no additional feedback overhead because a desired PMI and a BCPMI set are mapped in a 1:1 way. However, a BCPM dependent on desired PM may have an error in the direction of an optimal interference removal beam due to the quantization error of the desired PM (i.e., a precoding matrix corresponding to a PMI). If a quantization error is not present, all 3 BCPMs represent interference beams (ideal interference beams) for perfectly removing interference. If a quantization error is present, however, there is a difference between the beam of each of the 3 BCPMs and an ideal interference beam.

Furthermore, a difference between the ideal interference beams of the BCPMs is the same in average, but may be different on a specific moment. For example, if a desired PMI=3, it may be effective to remove an interference signal in order of BCPMIs 0, 1, and 2. In this case, there is a possibility that an eNB unaware of a to relative error between the BCPMIs 0, 1, and 2 may determine the BCPMI 2 having the greatest error with an ideal interference beam to be the beam of an interference signal and may perform communication in the state in which strong interference is present between co-scheduled UEs.

General (Device-to-Device) D2D Communication

In general, D2D communication is limitedly used as a term indicative of communication between things or thing intelligence communication. In an embodiment of the present invention, however, D2D communication may include all types of communication between a variety of types of devices having a communication function, such as smart phones and personal computers, in addition to simple devices having a communication function.

FIG. 18 is a diagram conceptually illustrating D2D communication in a wireless communication system to which an embodiment of the present invention may be applied.

FIG. 18a shows an existing communication method based on an eNB. UE1 may send data to an eNB in uplink, and the eNB may send data to UE2 in downlink. Such a communication method may be called an indirect communication method through an eNB. An Un link (i.e., a link between eNBs or a link between an eNB and a relay node, which may be called a backhaul link), that is, a link defined in an existing wireless communication system, and/or an Uu link (i.e., a link between an eNB and UE or a link between a relay node and UE, which may be called an access link) may be related to the indirect communication method.

FIG. 18b shows a UE-to-UE communication method, that is, an example of D2D communication. The exchange of data between UEs may be performed without the intervention of an eNB. Such a communication method may be called a direct communication method between devices. The D2D direct communication method has advantages of reduced latency and the use of lesser radio resources compared to the existing indirect communication method through an eNB.

FIG. 19 shows an example of various scenarios of D2D communication to which a method proposed in this specification may be applied.

A scenario for D2D communication may be basically divided into (1) an out-of-coverage network, (2) a partial-coverage network, and (3) an in-coverage network depending on where UE1 and UE2 are placed within cell coverage (i.e., in-coverage) and out of cell coverage (i.e. out-of-coverage).

The in-coverage network may be divided into an in-coverage-single-cell and an in-coverage-multi-cell depending on the number of cells corresponding to coverage of an eNB.

FIG. 19(a) shows an example of an out-of-coverage network scenario for D2D communication.

The out-of-coverage network scenario means that D2D communication is performed between D2D UEs without control of an eNB.

From FIG. 19(a), it may be seen that only UE1 and UE2 are present and the UE1 and the UE2 perform direct communication.

FIG. 19(b) shows an example of a partial-coverage network scenario for D2D communication.

The partial-coverage network scenario means that D2D communication is performed between D2D UE placed within network coverage and D2D UE placed out of the network coverage.

From FIG. 19(b), it may be seen that UE1 placed within network coverage and UE2 placed out of the network coverage perform communication.

FIG. 19(c) shows an example of an in-coverage-single-cell scenario, and FIG. 19(d) shows an example of an in-coverage-multi-cell scenario.

The in-coverage network scenario means that D2D UEs perform D2D communication through control of an eNB within network coverage.

In FIG. 19(c), UE 1 and UE2 are placed within the same network coverage (or cell) and perform D2D communication under the control of an eNB.

In FIG. 19(d), UE1 and UE2 are placed within network coverage, but are placed within different network coverage. Furthermore, the UE1 and the UE2 perform D2D communication under the control of eNBs managing each of network coverage.

D2D communication is described in more detail below.

D2D communication may be performed in the scenarios of FIG. 19, but may be commonly performed within network coverage (in-coverage) and out of network coverage (out-of-coverage). A link used for D2D communication (i.e., direct communication between UEs) may be called a D2D link, a directlink, or a sidelink, but is hereinafter generally called a sidelink, for convenience of description.

Sidelink transmission may be performed in an uplink spectrum in the case of FDD and may be performed in an uplink (or downlink) subframe in the case of TDD. Time Division Multiplexing (TDM) may be used for the multiplexing of sidelink transmission and uplink transmission.

Sidelink transmission and uplink transmission are not occurred at the same time. Sidelink transmission is not occurred in a sidelink subframe which partially or generally overlaps an uplink subframe or UpPTS used for uplink transmission. Furthermore, the transmission and reception of a sidelink are also not occurred at the same time.

The structure of an uplink physical resource may be identically used as the structure of a physical resource used for sidelink transmission. However, the last symbol of a sidelink subframe includes a guard period and is not used for sidelink transmission.

A sidelink subframe may include an extended Cyclic Prefix (CP) or a normal CP.

D2D communication may be basically divided into discovery, direct communication, and synchronization.

1) Discovery

D2D discovery may be applied within network coverage (including an inter-cell and an intra-cell). In inter-cell discovery, both synchronous and asynchronous cell deployments may be taken into consideration. D2D discovery may be used for various commercial purposes, such as advertising, issuing coupons, and finding friends, to UE within a proximity region.

If UE 1 has a role of sending a discovery message, the UE 1 sends a discovery message, and UE 2 receives the discovery message. The transmission and reception roles of the UE 1 and the UE 2 may be changed. Transmission from the UE 1 may be received by one or more UE(s), such as the UE 2.

The discovery message may include a single MAC PDU. In this case, the single MAC PDU may include a UE ID and an application ID.

A physical sidelink discovery channel (PSDCH) may be defined as a channel for sending the discovery message. The structure of a PUSCH may be reused as the structure of the PSDCH.

Two types Type 1 and Type 2 may be used as a resource allocation method for D2D discovery.

In the case of Type 1, an eNB may allocate a resource for sending a discovery message in a non-UE-specific way.

To be specific, a radio resource pool comprising a plurality of subframe sets and a plurality of resource block sets for transmitting and receiving a discovery message within a specific period (in what follows, 'discovery period') is allocated, and a discovery transmitting UE selects a specific resource within the radio resource pool in an arbitrary manner and transmits a discovery message.

The periodic discovery resource pool can be allocated for transmission of a discovery signal in a semi-static manner.

The configuration information of a discovery resource pool for discovery transmission includes a discovery period, a subframe set which can be used for transmission of a discovery signal within the discovery period, and information about a resource block set. The configuration information of the discovery resource pool can be transmitted to the UE through upper layer signaling. In the case of an in-coverage UE, the discovery resource pool for discovery transmission is set up by an eNB and can be informed to the UE through RRC signaling (for example, System Information Block (SIB)).

The discovery resource pool allocated for discovery within one discovery period can be multiplexed to a time-frequency resource block of the same size through TDM and/or FDM scheme, where the time-frequency resource block of the same size can be called a 'discovery resource'. A discovery resource can be set as one subframe unit and include two Physical Resource Blocks (PRBs) per slot in each subframe. One UE can use one discovery resource for transmission of a discovery MAC PDU.

Also, a UE can transmit a discovery signal repeatedly within a discovery period for transmission of one transport block. Transmission of a MAC PDU by one UE can be repeated (for example, four times) contiguously or non-contiguously within the discovery period (namely radio resource pool). The transmission times of a discovery signal for one transmission block can be transmitted to the UE through upper layer signaling.

UE may randomly select a first discovery resource in a discovery resource set which may be used for the repetitive transmission of an MAC PDU and may determine the remaining discovery resources in relation to the first discovery resource. For example, a specific pattern may be previously determined, and a next discovery resource may be determined according to the predetermined specific pattern depending on the position of a discovery resource first selected by UE. Alternatively, UE may randomly select each discovery resource within a discovery resource set which may be used for the repetitive transmission of an MAC PDU.

In the case of Type 2, a resource for discovery message transmission is allocated in a UE-specific way. Type 2 is subdivided into Type-2A and Type-2B. Type-2A is a method of allocating, by an eNB, a resource at the instance at which UE sends a discovery message within a discovery cycle, and Type-2B is a method of allocating resources semi-persistently.

In the case of Type-2B, RRC_CONNECTED UE requests an eNB to allocate a resource for the transmission of a D2D discovery message through RRC signaling. Furthermore, the eNB may allocate the resource through RRC signaling. When the UE transits to an RRC IDLE state or when the eNB withdraws resource allocation through RRC signaling, the UE releases the most recently allocated transmission resource. As described above, in the case of Type-2B, a radio resource may be allocated through RRC signaling, and the activation/deactivation of an allocated radio resource may be determined by a PDCCH.

A radio resource pool for receiving a discovery message may be configured by an eNB, and UE may be notified of the configured radio resource pool through RRC signaling (e.g., a System Information Block (SIB)).

Discovery message reception UE monitors both the aforementioned discovery resource pools of Type 1 and Type 2 in order to receive a discovery message.

2) Direct Communication

The region to which D2D direct communication is applied includes a network coverage edge area (i.e., edge-of-coverage) in addition to inside and outside network coverage (i.e., in-coverage and out-of-coverage). D2D direct communication may be used for purposes, such as Public Safety (PS).

If UE 1 has a role of direct communication data transmission, the UE 1 sends direct communication data, and UE 2 receives the direct communication data. The transmission and reception roles of the UE 1 and the UE 2 may be changed. The direct communication transmission from the UE 1 may be received by one or more UE(s), such as the UE 2.

D2D discovery and D2D communication may be independently defined without being associated with each other. That is, in groupcast and broadcast direct to communication, D2D discovery is not required. If D2D discovery and D2D direct communication are independently defined as described above, UEs do not need to perceive adjacent UE. In other words, in the case of groupcast and broadcast direct communication, all reception UEs within a group are not required to be adjacent to each other.

A physical sidelink shared channel (PSSCH) may be defined as a channel for sending D2D direct communication data. Furthermore, a physical sidelink control channel (PSCCH) may be defined as a channel for sending control information (e.g., Scheduling Assignment (SA), a transmission format for direct communication data transmission, etc) for D2D direct communication. The structure of a PUSCH may be reused as the structures of the PSSCH and the PSCCH.

Two types of mode 1 and mode 2 may be used as a resource allocation method for D2D direct communication.

Mode 1 refers to a method of scheduling, by an eNB, data for D2D direct communication by UE or a resource used for UE to send control information. Mode 1 is applied to in-coverage.

An eNB configures a resource pool for D2D direct communication. In this case, the resource pool for D2D communication may be divided into a control information pool and a D2D data pool. When an eNB schedules control information and a D2D data transmission resource within a pool configured for transmission D2D UE using a PDCCH or ePDCCH (enhanced PDCCH), the transmission D2D UE sends control information and D2D data using the allocated resource.

Transmission UE requests a transmission resource from an eNB. The eNB schedules a resource for sending control information and D2D direct communication data. That is, in the case of mode 1, the transmission UE needs to be in the RRC_CONNECTED state in order to perform D2D direct communication. The transmission UE sends a scheduling request to the eNB, and a Buffer Status Report (BSR) procedure is performed so that the eNB may determine the amount of resources requested by the transmission UE.

Reception UEs monitors a control information pool. When decoding control information related to reception UE, the reception UE may selectively decode D2D data transmission related to corresponding control information. The reception UE may not decode a D2D data pool based on a result of the decoding of the control information.

Mode 2 refers to a method of randomly selecting, by UE, a specific resource in a resource pool in order to send data or control information for D2D direct communication. Mode 2 is applied to out-of-coverage and/or edge-of-coverage.

In mode 2, a resource pool for sending control information and/or a resource pool for sending D2D direct communication data may be pre-configured or may be configured semi-statically. UE is supplied with a configured resource pool (time and frequency) and selects a resource for D2D communication transmission in the resource pool. That is, the UE may select a resource for control information transmission in a control information resource pool in order to send control information. Furthermore, the UE may select a resource in a data resource pool in order to send D2D direct communication data.

In D2D broadcast communication, control information is transmitted by broadcasting UE. Control information is explicitly and/or implicitly indicative of the position of a resource for data reception in relation to a physical channel (i.e., a PSSCH) on which D2D direct communication data is carried.

3) Synchronization

A D2D Synchronization Signal/sequence (D2DSS) can be used by a UE to obtain time-frequency synchronization. In particular, since the eNB is unable to control a UE located beyond network coverage, a new signal and procedure can be defined to establish synchronization among UEs. A D2D synchronization signal can be called a sidelink synchronization signal.

A UE transmitting a D2D synchronization signal periodically can be called a D2D synchronization source or a sidelink synchronization source. In case a D2D synchronization source is an eNB, the structure of a D2D synchronization signal being transmitted can be identical to that of PSS/SSS. In case the D2D synchronization source is not an eNB (for example, a UE or GNSS (Global Navigation Satellite System)), the structure of a D2D synchronization signal being transmitted can be newly defined.

The D2D synchronization signal is transmitted periodically with a period not shorter than 40 ms. Each UE can have a physical-layer D2D synchronization identity. The physical-layer D2D synchronization identifier may be called a physical-layer sidelink synchronization identity or simply a D2D synchronization identifier.

The D2D synchronization signal includes a D2D primary synchronization signal/sequence and a D2D secondary synchronization signal/sequence. These signals can be called a primary sidelink synchronization signal and a secondary sidelink synchronization signal, respectively.

Before transmitting a D2D synchronization signal, the UE may first search for a D2D synchronization source. If a D2D synchronization source is found, the UE can obtain time-frequency synchronization through a D2D synchronization signal received from the D2D synchronization source found. And the corresponding UE can transmit the D2D synchronization signal.

Also, a channel intended to deliver essential information used for D2D communication along with synchronization may be required, and a channel intended for the aforementioned purpose can be defined. Such a channel can be called a Physical D2D Synchronization Channel (PD2DSCH) or a Physical Sidelink Broadcast Channel (PSBCH).

In D2D communication, direct communication between two devices is described below as an example, for clarity, but the scope of the present invention is not limited thereto. The same principle described in an embodiment of the present invention may be applied to D2D communication between a plurality of two or more devices.

D2D Discovery

One of D2D discovery methods includes a method (hereinafter called "distributed discovery") of performing, by all UEs, discovery in a distributed way. The method of performing distributed D2D discovery means a method of autonomously determining, by all UEs, discovery resources and sending and receiving discovery messages unlike a method of determining resource selection at one place (e.g., an eNB, UE, or a D2D scheduling device) as in a centralized method.

A signal (or message) periodically transmitted by UEs for D2D discovery may be hereinafter called a discovery message, discovery signal, or beacon. The signal is generally called a discovery message, for convenience of description.

In distributed discovery, a dedicated resource may be periodically allocated as a resource for allowing UE to send and receive a discovery message, separately from a cellular resource. This is described below with reference to FIG. 21.

FIG. 20 shows an example in which discovery resources have been allocated according to an embodiment of the present invention.

Referring to FIG. 20, in the distributed discovery method, a discovery subframe (i.e., a "discovery resource pool") 2001 for discovery in all cellular uplink frequency-time resources is allocated fixedly (or dedicatedly), and the remaining region may consist of an existing LTE uplink Wide Area Network (WAN) subframe region 2003. The discovery resource pool may include one or more subframes.

The discovery resource pool may be periodically allocated at a specific time interval (i.e., "discovery cycle"). Furthermore, the discovery resource pool may be repeatedly configured within one discovery cycle.

FIG. 20 shows an example in which a discovery resource pool is allocated in a discovery cycle of 10 sec and 64 contiguous subframes are allocated to each discovery resource pool, but a discovery cycle and the size of time/frequency resources of a discovery resource pool are not limited thereto.

UE autonomously selects a resource (i.e., "discovery resource") for sending its discovery message in a dedicated allocated discovery pool and sends the discovery message through the selected resource. This is described below with reference to FIG. 21.

FIG. 21 is a simplified diagram illustrating a discovery process according to an embodiment of the present invention.

Referring to FIGS. 20 and 21, a discovery method basically includes a 3-step procedure, such as a resource sensing step S2101 for discovery message transmission, a resource selection step S2103 for discovery message transmission, and a discovery message transmission and reception step S2105.

First, in the resource sensing step S2101 for discovery message transmission, all UEs performing D2D discovery receive (i.e., sense) all discovery messages in a distributed way (i.e., autonomously) during 1 cycle (period) of a D2D discovery resource (i.e., a discovery resource pool). For example, assuming that an uplink bandwidth is 10 MHz in FIG. 20, all UEs receive (i.e., sense) all discovery messages transmitted in N=44 RBs (6 RBs of a total of 50 RBs are used for PUCCH transmission because the entire uplink bandwidth is 10 MHz) during K=64 msec (64 subframes).

Furthermore, in the resource selection step S2103 for discovery message transmission, UE selects resources that belong to the sensed resources and that have a low energy level and randomly selects a discovery resource within a specific range (e.g., within lower x % (x=a specific integer, 5, 7, 10, . . . )) from the selected resources.

A discovery resource may include one or more resource blocks having the same size and may be multiplexed within a discovery resource pool in a TDM and/or FDM way.

The reason why the UE selects the resources having a low energy level as the discovery resources may be considered to mean that UEs do not use the same D2D discovery resource a lot nearby in the case of resources of a low energy level. That is, this disprove that the number of UEs performing D2D discovery procedures that causes interference is not many nearly. Accordingly, if resources having a low energy level are selected as described above, there is every probability that interference is small when a discovery message is transmitted.

Furthermore, the reason why a resource having the lowest energy level is not selected, but discovery resources are randomly selected within a predetermined range (i.e., within lower x %) is that there is a possibility that if a resource having the lowest energy level is selected, several UEs may select the same resource corresponding to the lowest energy level at the same time. That is, a lot of interference may be caused because UEs select the same resource corresponding to the lowest energy level. Accordingly, a discovery resource may be randomly selected within a predetermined range (i.e., configuring a candidate pool for selectable resources). In this case, for example, the range of the energy level may be variably configured depending on the design of a D2D system.

Furthermore, in the discovery message transmission and reception step S2105, that is, the last step, the UE transmits and receives discovery messages based on the discovery resource after a discovery cycle (after P=10 seconds in FIG. 20) and periodically transmits and receives discovery messages depending on a random resource hopping pattern in subsequent discovery cycles.

Such a D2D discovery procedure continues to be performed even in an RRC IDLE state not having connection with an eNB as well as in an RRC CONNECTED state in which the UE has connection with the eNB.

If such a discovery method is taken into consideration, all UEs senses all resources (i.e., discovery resource pools) transmitted by surrounding UEs and randomly selects discovery resources from all the sensed resources within a specific range (e.g., within lower x %).

However, the method above has a drawback that a UE has to receive the entire resources that are currently used by the UEs involved in D2D discovery as well as neighboring UEs irrespective of distribution of the neighboring UEs or usage of resources. In other words, since UEs select discovery resources in an arbitrary manner, it is not possible to know to which position each UE transmits a discovery message. Therefore, it is disadvantageous that all of the UEs have to monitor existence of a signal in the corresponding resources across the whole frequency band over the whole time period to determine whether to perform detection or to attempt detection.

The received energy level according to the use of discovery resources is not an absolute value but a relative one. For example, choosing the lower 5% of a distribution is a relative concept that can be interpreted differently for each of the UEs. That is, in case the number of neighboring UEs is large, interference may still be developed even if the received energy level is selected as a value within less than 1%; on the other hand, if very few UEs are found in the vicinity, interference may not be developed even if the energy level is selected as a value beyond the lower 20%.

The energy level used for distributive resource selection of UEs is a probabilistic concept, which is used for selection of discovery resources, and how many UEs are present currently in the vicinity of a UE to use discovery resources is actually more important than selecting the energy level as a value within lower percentage. An important issue when selecting resources at a low energy level is that the purpose of resource selection for discovery is to properly select resources currently not used in the vicinity of a UE by selecting resources at a low energy level. Thus, the goal of the scheme above is to discover lots of UEs by having as many UEs as possible receive a discovery message broadcast in the discovery process.

Also, taking into account the mobility of a UE moving around in a random fashion, a UE may start discovery sensing when there are many other UEs in the surroundings thereof or when there are very few of them. In the end, the energy level of D2D discovery can change in various manner according to the discovery time and distribution of neighboring UEs.

To summarize, as described with respect to the method above, it is inefficient to have all of the UEs unconditionally receive and sense the whole D2D discovery resource pool.

Accordingly, in what follows, the present invention proposes an adaptive, energy-level based sensing method to solve the problem of sensing the whole discovery resources. In other words, the present invention provides a method for adaptively determining a specific resource region to be sensed within a D2D discovery resource pool on the basis of an energy level detected over a predetermined energy detection interval and selecting discovery resources within the specific region.

FIG. 22 illustrates a method for transmitting a D2D discovery message according to one embodiment of the present invention.

With reference to FIG. 22, the UE calculates (namely estimates) the energy level over an energy detection interval S2201.

To select discovery resources, the UE at first calculates (namely estimates) the energy level of an energy detection interval by receiving discovery messages that neighboring UEs transmit from a predetermined region to the energy detection interval instead of sensing the whole discovery resource pool.

At this time, one or more subframe intervals can be configured as the energy detection interval, or one or more symbol intervals can be configured as the energy detection interval.

For example, in the corresponding discovery resource pool, a predetermined subframe (or symbol) interval can be configured as the energy detection interval.

Also, the energy detection interval can be configured once within one discovery period, or it can be set more than once being repeated within one discovery period.

For example, in case a plurality of discovery resource pools are allocated within one discovery period, a predetermined subframe (or symbol) interval can be configured as the energy detection interval only for the first discovery resource pool among the plurality of discovery resource pools. Also, a predetermined subframe (or symbol) interval of each discovery resource pool may be configured as the energy detection interval.

Also, multiple energy detection intervals may be configured within one discovery resource pool.

For example, a discovery resource pool can be divided into predetermined time periods, and a predetermined subframe (or symbol) interval can be configured as an energy detection interval for each predetermined time period. Also, a first symbol interval (or a predetermined number of symbol intervals) can be configured as an energy detection interval for each subframe within the discovery resource pool.

The UE determines a discovery resource region (namely discovery resource sensing region) on the basis of an energy level calculated (namely estimated) over the energy detection interval S2203.

In other words, the UE determines the discovery resource region variably according to the amount of discovery resources used by neighboring UEs in the energy detection interval.

At this time, the discovery resource region refers to a candidate region in which the UE senses discovery messages from neighboring UEs to select discovery resources to be used by the UE and selects discovery resources. In other words, the discovery resource region refers to a resource region in which UEs grouped according to the energy level detected over the energy detection interval perform a discovery procedure according to a group-wise manner.

A discovery resource region can comprise a combination of one or more of the frequency, time, and spatial region. For example, in case uplink frequency band is 10 MHz, the UE sets 10 MHz (or 44 RB) as the discovery resource region (namely range) if the energy level is larger than a predetermined threshold value according to the energy detection result; if the energy level is less than the predetermined threshold value, the UE sets 5 MHz (or 22 RB) as the discovery resource region (namely range). Also, in case 64 subframes are used as a discovery resource pool, the UE sets the 64 subframes as the discovery resource region (namely interval) if the energy level is larger than a predetermined threshold value according to the energy detection result; if the energy level is less than the predetermined threshold value, the UE may set 32 subframes as the discovery resource region (namely interval).

At this time, while determining the size of the discovery resource region adaptively according to the energy level, the UE may determine the position of the discovery resource region arbitrarily. For example, by using the identifier of the UE, position of the discovery resource region may be determined in an arbitrary manner.

Also, the start position of the discovery resource region may be predetermined in the time, frequency, or spatial domain. In other words, while the size of the discovery resource region is determined variably according to the detected energy level, the discovery resource region can start from a predetermined position of the frequency, time, or spatial domain. For example, in case the discovery resource region is determined adaptively in the frequency domain, the position of the discovery resource region can be determined by using a Physical Resource Block (PRB) index predetermined in the discovery resource pool.

Suppose discovery resources are selected in a random fashion from within the lower percentage of the resources in a low energy level as in the method for selecting discovery resources described above. There can be two options depending on the frequency: a method for selecting discovery resources by receiving the whole 10 MHz frequency and a method for selecting discovery resources by receiving 5 MHz frequency selectively. In this case, if there are only a few UEs which use D2D discovery resources, a sufficient amount of discovery resources are available irrespective of the frequency range for sensing, and therefore, only the number of samples of available discovery resources varies according to the sensing frequency. In other words, the case of sensing 10 MHz frequency differs from the case of sensing 5 MHz frequency only by the fact that the number of available discovery resources for the former case is larger than that for the latter case. High energy level indicates that there are many UEs in the vicinity while low energy level indicates that the number of neighboring UEs is small. After all, what is important in selecting discovery resources is not the lower percentage according to a relative energy level but how many neighboring UEs are actually transmitting discovery messages at the time of sensing.

In what follows, described in detail will be a method for a UE to determine a discovery resource region adaptively on the basis of an energy level detected over an energy detection interval.

A UE senses discovery resources within a predetermined discovery resource region and selects resources for discovery message transmission S2205. In other words, the UE receives (namely senses) all of the discovery messages transmitted from the discovery resource region determined in the S2203 step, identifies the resources in a low energy level, and selects discovery resources that fall within a predetermined range (for example, lower x percent of the resources (where x is an arbitrary integer, 5, 7, 10, . . . ) in a random fashion.

The UE transmits a discovery message from the selected resource S2207. And the UE transmits and receives a discovery message periodically according to a random resource hopping pattern for subsequent discovery periods.

Meanwhile, in the S2203 step, the UE may determine a discovery resource region on the basis of configuration information about the discovery resource region received from an eNB and the energy level calculated by the UE. In this case, before the S2201 step, a step of the UE's receiving configuration information about a discovery resource region from the eNB can be additionally included.

The configuration information about the discovery resource region denotes the information representing the relationship (namely mapping information) between the energy level that the UE has calculated over the energy detection interval and the discovery resource region. Also, the configuration information may be represented by an equation or a rule by which to determine a discovery resource region on the basis of the energy level that the UE has calculated.

The discovery resource region can be determined being identified (or being separated) in the form of a combination of one or more of the frequency, time, or spatial domain.

The configuration information about the discovery resource region can specify only the size of the discovery resource region (namely frequency band, the number of RBs, or the number of subframes) mapped to the energy level that the UE has calculated over the energy detection interval. For example, in case the uplink frequency band is 10 MHz, if the energy level that the UE has calculated exceeds a threshold value, the size of the discovery region is mapped to 10 MHz (or 44 RB); on the other hand, if the energy level is smaller than the threshold value, the size of the discovery region is mapped to 5 MHz (or 22 RB). In this case, the UE may determine the size of the discovery resource region mapped to the energy level on the basis of the configuration information about the discovery resource region, and the position of the discovery resource region may be determined as a predetermined position or as an arbitrary position determined by the UE as described in detail above.

Also, the configuration information about the discovery resource region can specify the size of the discovery resource region (namely frequency band, the number of RBs, or the number of subframes) and the position of the discovery resource region mapped to the energy level that the UE has calculated over the energy detection interval. In other words, suppose a total of 44 RBs are used as a discovery resource pool and the discovery resource region is divided into subregions in the frequency domain. Then the size and the position of a discovery resource region ranging from the first RB to the 22-th RB; and the size and the position of a discovery resource region ranging from the first RB to the 44-th RB can be predetermined. In this case, the UE can determine the size and the position of the discovery resource region mapped to an energy level on the basis of the configuration information about the discovery resource region.

The discovery resource region can be configured dynamically for each discovery resource pool and can be configured in a semi-static manner for one or more discovery periods.

Also, the discovery resource region, being configured in a cell-specific manner, can be applied commonly to the UEs belonging to the corresponding cell or can be configured in a UE-specific manner for each UE.

The configuration information about the discovery resource region configured as described above can be broadcast to the UE periodically as system information such as System Information Block (SIB) or Master Information Block (MIB). Also, the configuration information may be transmitted to the UE through RRC signaling or through a physical layer channel (for example, PDCCH or PDCCH).

FIG. 23 illustrates a method for adaptively determining a discovery resource region in the frequency domain according to one embodiment of the present invention.

In FIG. 23, small rectangles represent discovery resources currently used by other UEs, and different patterns applied for the rectangles indicate that discovery resources are used by different UEs.

FIG. 23 assumes that a discovery resource pool 2301 comprises 44 RB pairs (namely 10 MHz) in the frequency domain while it comprises 64 subframes in the time domain. It is further assumed that one or more subframes (or symbols) of the discovery resource pool 2301 comprise an energy detection interval 2303.

As shown in FIG. 23, UE1 and UE2 calculate (namely estimate) the energy level over the energy detection interval 2303 and determines different discovery resource regions (namely sensing ranges) 2305, 2307 in the frequency domain according to the calculated energy levels.

Even if the UE1 and the UE2 calculate the energy level over the same energy detection interval 2303, the energy levels calculated by the UE1 and the UE2 can be different from each other depending on their positions.

At this time, it is assumed that the UE1 and the UE2 calculate (namely estimate) the energy level over the energy detection interval 2303, and the energy level calculated (namely estimated) by the UE1 is less than a predetermined threshold value while the energy level calculated (namely estimated) by the UE2 is larger than the predetermined threshold value.

In this case, the UE1 has only a few neighboring UEs, the whole discovery resource region (namely sensing range) 2305 is set to be smaller than 10 MHz, and discovery resources are selected from among the configured discovery resource region. Meanwhile, the UE2 has a large number of neighboring UEs, and different from the UE1, discovery resources can be selected by configuring the discovery resource region (namely sensing range) 2307 to be larger than that of the UE1 (for example, the whole frequency band).

The UE1 and the UE2 determine the size of their discovery resource region according to the energy level estimated over the energy detection interval 2303, but the position of the discovery resource region may be determined in a random fashion. At this time, the position of the discovery resource region can be determined in a random fashion by using the identifier of the UE (for example, C-RNTI). For example, from the whole discovery resource pool, the position from which the discovery resource region starts (for example, the first PRB index, the 11-th PRB index, the $22^{nd}$ PRB index, and the $33^{rd}$ PRB index of the discovery resource pool) can be determined beforehand, and the position from which the discovery resource region starts can be determined by applying modular-4 operation to the UE identifier.

Also, the start position of the discovery resource region can be fixed. For example, the position of the discovery resource region can be determined as the one starting from a predetermined position in the discovery resource pool (for example, the first PRB index of the discovery resource pool).

Meanwhile, FIG. 23 illustrates a case where the discovery resource region of the UE1 (namely UE1 sensing range) 2305 does not overlap with the discovery resource region of the UE2 (namely UE2 sensing range) 2307; however, the discovery resource region of the UE1 (namely UE1 sensing range) 2305 can be made to overlap with the discovery resource region of the UE2 (namely UE2 sensing range) 2307.

FIG. 24 illustrates a method for adaptively determining a discovery resource region in the time domain according to one embodiment of the present invention.

In FIG. 24, small rectangles represent discovery resources currently used by other UEs, and different patterns applied for the rectangles indicate that discovery resources are used by different UEs.

FIG. 24 assumes that a discovery resource pool 2401 comprises 44 RB pairs (namely 10 MHz) in the frequency domain while it comprises 64 subframes in the time domain. It is further assumed that one or more subframes (or symbols) of the discovery resource pool 2401 comprise an energy detection interval 2403.

As shown in FIG. 24, UE1 and UE2 calculate (namely estimate) the energy level over the energy detection interval 2403 and determines different discovery resource regions (namely sensing ranges) 2405, 2407 in the time domain according to the calculated energy levels.

At this time, it is assumed that the UE1 and the UE2 calculate (namely estimate) the energy level over the energy detection interval 2403, and the energy level calculated (namely estimated) by the UE1 is less than a predetermined threshold value while the energy level calculated (namely estimated) by the UE2 is larger than the predetermined threshold value.

In this case, the UE1 has only a few neighboring UEs, the whole discovery resource region (namely sensing range) 2405 is set to be smaller than 64 subframes at maximum, and discovery resources are selected from among the configured discovery resource region. Meanwhile, the UE2 has a large number of neighboring UEs, and different from the UE1, discovery resources can be selected by configuring the discovery resource region (namely sensing range) 2407 to be larger than that of the UE1 (for example, the discovery resource pool time interval).

The UE1 and the UE2 determine the size of their discovery resource region according to the energy level estimated over the energy detection interval 2403, but the position of the discovery resource region may be determined in a random fashion. At this time, the position of the discovery resource region can be determined in a random fashion by using the identifier of the UE (for example, C-RNTI). For example, from the whole discovery resource pool, the position from which the discovery resource region starts (for example, the first subframe index, the 16-th subframe index, the $32^{nd}$ subframe index, and the 48-th subframe index of the discovery resource pool) can be determined beforehand, and the position from which the discovery resource region starts can be determined by applying modular-4operation to the UE identifier.

Also, the start position of the discovery resource region can be fixed. For example, the position of the discovery resource region can be determined as the one starting from a predetermined position in the discovery resource pool (for example, the first subframe index after the energy detection interval 2403 of the discovery resource pool).

Meanwhile, FIG. 24 illustrates a case where the discovery resource region of the UE1 (namely UE1 sensing range) 2405 does not overlap with the discovery resource region of the UE2 (namely UE2 sensing range) 2407; however, the discovery resource region of the UE1 (namely UE1 sensing range) 2405 can be made to overlap with the discovery resource region of the UE2 (namely UE2 sensing range) 2407.

Through the method above, namely according to the distribution of neighboring UEs, the discovery message to reception range (or interval) is reduced so that resource sensing power for transmitting discovery messages of UEs can be saved. Furthermore, if the discovery message reception range (or interval) is set to be small, processing overhead from selecting sensed resources by classifying them according to energy levels within a predetermined range (for example, within a lower percentage) can be reduced, and fast sensing and selection of discovery resources is possible. The numbers introduced above are only examples for the purpose of description and can be set differently according to various other methods.

FIG. 25 illustrates an energy detection interval set in the time domain in a repetitive manner according to one embodiment of the present invention.

In FIG. 25, small rectangles represent discovery resources currently used by other UEs, and different patterns applied for the rectangles indicate that discovery resources are used by different UEs.

FIG. 25 assumes that a discovery resource pool 2501 comprises 44 RB pairs (namely 10 MHz) in the frequency domain while it comprises 64 subframes in the time domain.

As shown in FIG. 25, a plurality of energy detection intervals 2503 can be set up in the discovery resource pool 2501. In other words, the whole resource pool 2501 is divided into a plurality of time slots (in the case of FIG. 25, 3), and one or more subframes (or symbols) can be configured as an energy detection interval 2503 in each time slot. Through this scheme, UEs can sense resources for transmitting discovery messages sequentially in the respective energy detection intervals 2503 and determine discovery resources adaptively for the respective time slots according to the sensed energy level. In other words, for the respective time slots, discovery resource regions can be determined independently from each other. And the UEs can select discovery resources in the discovery resource regions determined.

In this case, if a random discovery message transmission pattern is used, a specific hopping pattern may cause a large amount of discovery message transmission in the 3rd slot, whereby the energy level can be increased abruptly.

In this case, as shown in FIG. 25, even if discovery messages are abundantly used suddenly in the 3rd time slot to increase the energy level, the sensing interval (namely discovery resource region) can still be configured to be small for the first and the second time slot while the discovery message sensing interval (namely discovery resource region) can be configured to be large for the 3rd time slot in order to accommodate the discovery message energy level sent from the surroundings. Therefore, the UE can select the discovery resources of a low energy level from within the sensing interval configured to be large (namely discovery resource region), which will be described in more detail below with reference to FIGS. 26 and 27.

FIG. 26 illustrates a method for adaptively determining a discovery resource region in the frequency domain in case an energy detection interval is set repeatedly in the time domain according to one embodiment of the present invention.

With reference to FIG. 26, UE1 calculates (namely estimates) energy levels of the energy detection intervals 2603, 2605, 2607 set up in the respective time slots and determines discovery resource regions (namely sensing ranges) 2609, 2611, 2613 different from each other in the frequency domain within the respective time slots according to the calculated energy levels.

At this time, based on the energy levels calculated (namely estimated) for the respective energy detection intervals 2603, 2605, 2607, UE1 assumes that the energy levels calculated (namely estimated) over the first 2603 and the second energy detection interval 2605 are less than a predetermine threshold value while the energy level calculated (namely estimated) over the third energy detection interval 2607 is larger than the predetermined threshold value.

In this case, determining that very few neighboring UEs exist in the first and the second time slot, the UE1 can configure the discovery resource region (namely sensing range) 2609, 2611 to be smaller than 10 MHz at maximum and select discovery resources from within the configured is discovery resource region. On the other hand, determining that a large number of neighboring UEs exist in the 3rd time slot, the UE1 can configure the discovery resource region (namely sensing range) 2613 to be larger (for example, the whole frequency band) than the discovery resource regions 2609, 2611 of the first/second time slot and select the discovery resources from within the configured discovery resource region.

In other words, the whole discovery resource pool can be divided in units of time slots, and discovery resource regions (namely sensing ranges) for UEs can be configured differently from each other in the frequency domain according to the energy detection results over the respective time slots.

At this time, although the UE1 determines the size of each discovery resource region 2609, 2611, 2613 according to the energy level estimated over each energy detection interval 2603, 2605, 2607, as described above with reference to FIG. 23, the position of each discovery resource region can be determined in a random fashion. For example, the position of a discovery resource region can be determined by using the UE identifier. Also, the start position of a discovery resource region may be fixed. For example, a discovery resource region can start from the position of a predetermined PRB index.

FIG. 27 illustrates a method for adaptively determining a discovery resource region in the time domain in case an energy detection interval is set repeatedly in the time domain according to one embodiment of the present invention.

With reference to FIG. 27, UE1 calculates (namely estimates) energy levels of the energy detection intervals 2703, 2705, 2707 set up in the respective time slots and determines discovery resource regions (namely sensing ranges) 2709, 2711, 2713 different from each other in the time domain within the respective time slots according to the calculated energy levels.

At this time, based on the energy levels calculated (namely estimated) for the respective energy detection intervals 2703, 2705, 2707, UE1 assumes that the energy levels calculated (namely estimated) over the first 2703 and the second energy detection interval 2705 are less than a predetermine threshold value while the energy level calculated (namely estimated) over the third energy detection interval 2707 is larger than the predetermined threshold value.

In this case, determining that very few neighboring UEs exist in the first and the second time slot, the UE1 can configure the discovery resource region (namely sensing range) 2709, 2711 to be smaller than the maximum time slot interval and select discovery resources from within the configured discovery resource region. On the other hand, determining that a large number of neighboring UEs exist in the 3rd time slot, the UE1 can configure the discovery resource region (namely sensing range) 2713 to be larger (for example, the whole frequency band) than the discovery resource regions 2709, 2711 of the first/second time slot and select the discovery resources from within the configured discovery resource region.

In other words, the whole discovery resource pool can be divided in units of time slots, and discovery resource regions (namely sensing ranges) for UEs can be configured differently from each other in the time domain according to the energy detection results over the respective time slots.

At this time, although the UE1 determines the size of each discovery resource region 2709, 2711, 2713 according to the energy level estimated over each energy detection interval 2703, 2705, 2707, as described above with reference to FIG. 24, the position of each discovery resource region can be determined in a random fashion. For example, the position of a discovery resource region can be determined by using the UE identifier. Also, the start position of a discovery resource region may be fixed. For example, a discovery resource region can start from the position of a predetermined subframe index.

Meanwhile, referring again to FIG. 25, by performing sensing over only part of the time slots and selecting discovery resources, the UE may not perform sensing over the remaining time slots, which will be described in more detail below with reference to FIG. 28.

FIG. 28 illustrates a method for adaptively determining a discovery resource region in the time domain in case an energy detection interval is set repeatedly in the time domain according to one embodiment of the present invention.

With reference to FIG. 28, from the energy detection result over an energy detection interval 2803 set up in the first time slot, the UE can determine that there are only a few neighboring UEs since the discovery message energy level from the neighboring UEs is very low (for example, less than a predetermined threshold value). In this case, the UE can select discovery resources from the first time slot, but may not perform sensing over the remaining second and third time slot in search of the resources for transmitting a discovery message.

In this way, since the UE selects discovery resources directly from the first time slot and does not perform sensing during the other time slots, energy can be saved.

Also, different from the embodiment of FIG. 28, from the energy detection result over the energy detection interval 2803 set up in the first time slot, the UE can determine that there are quite a few neighboring UEs since the discovery message energy level from the neighboring UEs is high (for example, more than a predetermined threshold value). In this case, the UE can perform energy detection again over the energy detection interval 2803 set up in the second time slot. And from the energy detection result over the energy detection interval 2803 set up in the second time slot, the UE can determine that there are very few neighboring UEs since the discovery message energy level is too low (for example, less than a predetermined threshold value). In this case, the UE can select discovery resources from the second time slot, but may not perform sensing over the remaining third time slot in search of the resources for transmitting a discovery message.

Also, the sensing interval (namely, the number of time slots) to discover resources for the UE to transmit a discovery message can be determined according to the energy level measured over the energy detection interval 2803 set up in the first time slot. For example, if the energy level measured over the energy detection interval 2803 set up in the first time slot is less than a predetermined first threshold value, the UE can perform sensing the resources for transmission of a discovery message only over the first time slot. And if the energy level measured over the energy detection interval 2803 set up in the first time slot is larger than the predetermined first threshold value but less than a predetermined second threshold value, the UE can perform sensing the resources for transmission of a discovery message over the first and the second time slot. And if the energy level measured over the energy detection interval 2803 set up in the first time slot is larger than the predetermined second threshold value, the UE can perform sensing the resources for transmission of a discovery message over the first, the second, and the third time slot.

As described above, if the UE selects discovery resources from the first time slot, the energy consumed at the time of searching for discovery resources can be saved by as much as the time slot (1/slot) by which the whole discovery resource pool is divided. At this time, although more energy can be as the number of time slots is increased, it is preferable that the number of time slots should be determined in a proper manner within the whole discovery resource pool by taking into account the minimum number of sensing resources required to select appropriate discovery resources through sensing. In the case of FIG. 28, if it is assumed that three time slots are used and a specific UE completes sensing the resources for transmission of a discovery message over the first time slot, the energy consumed for D2D discovery sensing can be reduced by three times. The aforementioned number is only an example to describe the embodiment, which can be determined in various other ways.

Also, the method for adaptively sensing resources for transmission of a discovery message on the basis of time slots according to the present invention can reduce the delay generated from the D2D discovery procedure.

First, suppose a time slot of 64 ms from the whole discovery period lasting 10 s is allocated to the D2D discovery resource pool. At this time, according to an existing D2D discovery method, if the time at which the UE is powered on and starts D2D discovery corresponds to a time interval for cellular communication rather than the time interval of 64 ms for which the periodic D2D discovery resource pool is set up, the UE starts the D2D discovery at the next discovery period.

However, the time at which the UE is powered on and starts D2D discovery corresponds to a time interval for which the D2D discovery resource pool is set up. According to the example above, this time slot falls within 64 ms from within the whole discovery period of 10 s for which the D2D discovery resource pool is set up (namely 64 ms/10 s), yielding a probability of 0.64%. In this case, UEs can start sensing the resources immediately in the time slot is for which the D2D discovery resource pool is set up.

However, even for this case, too, according to the existing discovery method, if sensing is started in the middle of the discovery resource pool, since the UE is unable to receive discovery messages from other UEs across the whole discovery resource pool, the UE becomes unable to select the discovery resources. Therefore, in order for the UE to receive discovery messages from other UEs across the whole discovery resource pool, the UE waits for another 10 s of the next discovery period and selects discovery resources by sensing them over the whole discovery resource pool during 64 ms. After all, the UEs starting sensing the resources in the middle of 64 ms experience a very long delay of 10 s during the D2D discovery procedure.

On the other hand, as described in the embodiment of FIG. 25, according to the resource sensing method for transmitting a discovery message on the basis of time slots according to the present invention, the UE can select discovery resources even if the UE does not receive discovery messages of neighboring UEs across the whole discovery resource pool, which will be described below with reference to FIG. 29.

FIG. 29 illustrates a method for adaptively determining a discovery resource region in the time domain in case an energy detection interval is set repeatedly in the time domain according to one embodiment of the present invention.

FIG. 29 assumes that the UE is powered on and starts sensing for D2d discovery from the second time slot.

In this way, even if the UE has started sensing for D2D discovery from the second time slot (namely from the middle of the discovery resource pool), the UE can perform sensing from the third time slot and immediately select discovery resources without receiving the whole discovery resource pool in case there are only a few neighboring UEs. In other words, since the UE selects discovery resources even when the UE performs sensing of only part of the discovery resource pool, the UE can reduce the delay of waiting for the next discovery period. The numbers introduced above are only examples for the purpose of description and can be set differently according to various other methods.

In this way, the present invention can configure the discovery resource region (namely the resource sensing region for transmission of a discovery message) adaptively in the time or frequency domain on the basis of the energy level measured over the energy detection interval.

According to the adaptive sensing method of the present invention, the frequency/time interval over which the UE performs sensing can be reduced variably on the basis of the amount of resources used according to a relative distribution of other UEs in the vicinity of the UE, and thus the sensing power of the UEs can be reduced. Also, since the frequency/time interval for sensing is reduced, overhead generated in the processing stage can be reduced in an effective manner.

Also, since the UE operates on the basis of time slots and doesn't necessarily have to perform sensing whole interval in case that the UE uses an adaptive sensing method based on time slots according to the present invention, the UE can not only reduce the energy consumed for D2D discovery but reduce a delay by selectively selecting discovery resources even if UEs start sensing from the middle of the discovery resource pool; therefore the UE becomes capable of selecting discovery resources and transmitting a discovery message more quickly than existing methods.

To be more specific, if the energy level is low because of the energy detection performed over a predetermined specific resource region (for example, one or more subframes or one or more symbols), it indicates that only a few UEs are transmitting discovery messages in the vicinity of the UE. In this case, the probability of collision with other UEs can be small even if the UEs select resources in a random fashion and transmit discovery messages. However, as described above, it is preferable that the UEs identify resources of low energy levels from among sensed resources, select one from among the resources falling within a predetermined range of the energy level in a random fashion, and transmit discovery messages by using the selected resource.

However, estimating energy by sensing the whole bandwidth or the whole time interval (discovery 1 period) to find resources with an energy level within a predetermined range (for example, less than lower x %) is inefficient from a standpoint of power consumption. To alleviate this problem, in case the detected energy over a particular region is small, the present invention still obtains the same effect by performing energy estimation over only part of the bandwidth or the interval without necessarily performing energy estimation over the whole range to find a resource region with an energy level less than x %; selecting resources with energy levels less than x % from within the part of the whole domain (even a small number of samples are sufficient for this purpose); and to transmitting a discovery message by selecting one from among the selected resources. Moreover, since the energy sensing range is reduced considerably, the present invention is more advantageous in terms of power consumption. On the contrary, if energy detected over a particular region becomes large, energy sensing can be performed over the whole frequency or time region. However, it should be noted that even in this case, power consumption can be improved by adjusting the energy sensing region variably in a step-wise manner according to the energy value detected over a particular region.

With reference to the embodiments of the present invention above, a method for adaptively configuring a discovery resource region in the time domain or frequency domain has been described. However, the method above is only an example introduced for the purpose of description, and the present invention is not limited to the description above. In other words, a discovery resource region can also be set up adaptively by combining the frequency and the time domain according to the present invention in the same way as described above.

Also, the discovery resource region can still be set up over the spatial domain by applying the same method for setting up a discovery resource region in the frequency and time domain. Also, the discovery resource region can also be set up by combining the spatial domain with the frequency domain in the same way as the method for setting up a discovery resource region by combining the time and frequency domain. Furthermore, operations according to the present invention may be performed by combining other domains (for example, UE IDs, cell IDs, and so on) in addition to the time, frequency, and spatial domain.

Method for Reducing Interference in D2D Process

The present invention provides a method for avoiding or mitigating collision of resources by indicating resource collision to overcome performance degradation due to interference generated from collision of transmission resources during a D2D discovery or direct communication process.

In other words, the present invention provides a method for preventing or mitigating resource collision in case a D2D UE selects resources arbitrarily from a resource pool and transmits a discovery message or control information for direct communication or direct communication data.

In what follows, for the convenience of description, a discovery message/signal (namely PSDCH) that a D2D UE transmits by selecting resources arbitrarily from a resource pool or control information for direct communication (namely PSCCH) or direct communication data (namely PSSCH) is collectively called a 'D2D signal'.

D2D communication (namely discovery and direct communication) uses spatial reuse of resources to increase frequency efficiency, which also increases the probability of D2D interference due to collision as the same resources are selected simultaneously by different UEs. Therefore, resource reuse and interference requires a trade-off and necessitates a method for efficiently controlling resource reuse and interference at the same time.

Also, in the D2D discovery step, to solve the half-duplex problem occurring at the time of transmission, a discovery message (or a beacon signal or synchronization signal or direct communication data) is transmitted by hopping over different time and/or frequency resources for each period. During the D2D discovery process, UEs are unable to know the state of a discovery message that the UEs want to use. Even if a UE manages to select resources of a channel in a good condition without being influenced by interference, since different resources are used for each individual period according to a hopping pattern, selecting good resources for some particular period is not a dependable approach.

After all, since each UE uses the same amount of resources in the same way during the D2D discovery process, it may be determined that the best resources are those without being influenced by interference. Also, this scheme can also be applied when the UE determines resources for transmitting control information and/or data during the D2D direct communication process.

However, even if a UE selects low-interference resources by sensing those resources not influenced by interference, in the case of a hot spot having a high density of UEs, distances among D2D UEs become very short, and interference may be generated as the same resources are used. Also, taking into account the mobility of UEs, interference may still be generated as UEs utilizing the same resources freely move close to each other.

Moreover, in case D2D discovery or D2D direct communication is being performed in the RRC_IDLE state, it is not possible to know exactly when and where the UEs move, not to mention the density of UEs for each cell/sector. Therefore, it is impossible to allocate D2D discovery resources adaptively for each cell according to UE density.

Also, in the public-safety environment, while all of the UEs out of coverage are unable to perform cellular communication, a plurality of UEs participate in D2D communication; thus severe interference can be developed as UEs more than available resources participate in D2D discovery or D2D direct communication.

Meanwhile, taking into account the advantages of D2D communication such as reuse of resources, cellular traffic offloading, and power saving, it is preferable to use D2D communication with neighboring UEs in a highly dense environment in a sense that the advantages offered by D2D communication are maximized.

FIG. 30 illustrates a situation where D2D signal transmission resources of UEs collide with each other.

Suppose that UEs select the same transmission resources to transmit a D2D signal (namely a discovery message (namely PSDCH) or control information for direct communication (namely PSCCH) or direct communication data (namely PSDCH)) in the D2D discovery process. In other words, as shown in FIG. 30, in case UE 1 and UE 2 transmit D2D signals by using the same resources, UE 1 and UE 2 can generate strong interference on the neighboring UEs since the same resources are used.

However, different from cellular communication, D2D communication may not use a controller for interference control or resource allocation, such as an eNB. In this case, UEs may use resources generating interference without knowing the fact that collision has occurred. In other words, UEs (namely UE 1 and UE 2) do not recognize the interference exerted on the neighboring UEs.

The degree of interference increases in proportion to to the number of UEs using the resources running into collision and can be expressed by a total sum of interference generated. When interference increases, the possibility of receiving a D2D signal is reduced accordingly since reception SINR (Signal to Interference plus Noise Ratio) with respect to D2D signals of interference-receiving UEs becomes small, which leads to degraded performance of D2D communication.

To solve the aforementioned interference problem generated due to frequency reuse during the D2D discovery or D2D direct communication process, the following method can be used.

First, a method for adjusting power of UEs utilizing the same resources for transmission of D2D signals can be used. For example, a D2D signal can be transmitted by reducing transmission power of a UE for D2D discovery or D2D direct communication.

If the method for adjusting transmission power is used, interference on the receiving UEs can be reduced; however, at the same time, the transmission range of a D2D signal is shortened, and strength of a D2D signal arriving at the UE is weakened, leading to degradation of performance of detecting a D2D signal.

As another method, UEs generating interference may change transmission resources of a D2D signal, which will be described with reference to the related drawing below.

FIG. 31 illustrates a method for reducing interference in D2D communication according to one embodiment of the present invention.

FIG. 31 illustrates a case where UE 1 and UE 2 transmit D2D signals by using the same resources as in the example of FIG. 30. As described above, since UE 1 and UE 2 utilize the same resources for transmission of D2D signals, they can generate strong interference on the neighboring UEs.

A UE receiving a D2D signal determines the resources generating interference on the basis of strength of the received D2D signal and the interference generated (or detected) from the resources which have transmitted the corresponding D2D signal.

Also, a UE receiving a D2D signal may determine the resources which do not generating interference. At this time, all of the resources except for those generating interference may be determined as the resources not generating interference. However, when strength of a received D2D signal is strong and the interference generated (or detected) from the resources from which the corresponding D2D signal has been transmitted is weak, the corresponding resources may be determined as not generating interference.

The resources generating interference (and/or not generating interference) can be determined on the basis of signal strength of a received D2D signal and intensity of detected interference. For example, a receiving UE can determine the resources generating interference (and/or those not generating interference) by calculating RSSI and SINR with respect to a received signal on the basis of strength of a received signal and interference and by comparing the calculated values with predetermined threshold values.

A method for determining resources generating interference and/or resources not generating resources will be described later.

And the D2D signal receiving UE transmits information about resources generating interference (in what follows, 'interference resource information'). Also, the D2D signal receiving UE may transmit information about resources not generating interference (in what follows, 'non-interference resource information').

The D2D signal receiving UE may transmit interference resource information (and/or non-interference resource information) according to the broadcast scheme, but may transmit the interference resource information to the UE which has transmitted the corresponding D2D signal (namely multiple UEs using the same resources) according to the unicast scheme.

Various messages/signals or channels can be used to transmit the interference resource information (and/or non-interference resource information).

For example, interference resource information can be transmitted through a discovery sequence/preamble transmitted periodically or discovery message/channel (namely PSDCH). Meanwhile, in the public safety environment or multi-cell environment, neighboring UEs transmit synchronization signals periodically to synchronize them with each other, where the interference resource information can also be informed through a synchronization signal, synchronization message/channel, broadcast channel (namely PSBCH), and so on. Also, interference resource information can be informed to UEs through a data channel for D2D direct communication (namely PSSCH) or scheduling assignment (namely PSCCH) used for transmitting resource allocation information of the data channel, HARQ parameter, and so on. Also, if cellular communication is possible, resources generating interference may be indicated through cellular communication.

A method for transmitting interference resource information (and/or non-interference resource information) will be described in more detail later.

In this way, if collision between transmission resources occurs according as a plurality of UEs use the same transmission resources, a UE which has received the corresponding D2D signal transmits interference resource information (and/or non-interference resource information). Therefore, a plurality of UEs using the same resources change transmission resources for the next transmission opportunity (time and/or frequency) and avoid mutual collision by using different transmission resources (time and/or frequency), eventually reducing or removing interference.

For example, recognizing interference generating resources and informing a UE transmitting a D2D signal of the information about colliding resources, receiving UEs can guide the transmitting UE to perform an appropriate operation (for example, change of transmission resources, random resource hopping, predefined resource hopping, and muting) to avoid collision with the D2D signal.

Therefore, the present invention achieves an effect similar to link adaptation or channel-dependent scheduling where an eNB selects another good resources through channel state information with respect to a UE and enables the UE to reselect frequency and time of resources.

In what follows, a method for determining interference generating resources and/or resources which do not generate interference will be described.

To determine resources generating large interference, a UE receiving a D2D signal has to determine accurately has to determine correctly whether SINR with respect to a received D2D signal is reduced due to a large distance from the UE which has transmitted the D2D signal (namely, due to weak signal strength) or whether SINR with respect to a received D2D signal is reduced due to strong interference in the surroundings (namely due to strong interference or occurrence of collision).

In particular, in the case of a signal and channel with fixed transmission power (for example, transmission with predetermined transmission power and transmission with transmission power already known to UEs), a receiving UE can easily figure out transmission signal strength and attenuation information.

Table 6 illustrates signal strength values and interference strength values which determine the SINR of a D2D signal; and resultant SINR values.

TABLE 6

|  | Signal(S) | Interference (I) | SINR | S + I (RSSI) |
| --- | --- | --- | --- | --- |
| Case #1 | −85 dBm | −115 dBm | 30 dB |  |
| Case #2 | −110 dBm | −115 dBm | 5 dB | $1.3 \times 10^{-11}$ |
| Case #3 | −85 dBm | −90 dBm | 5 dB | $4.1 \times 10^{-9}$ |

Referring to Table 6, the receiving SINR of a reference signal of case #1 is relatively higher than those of other cases; thus case #1 is readily discernible from the other cases.

On the other hand, case #2 and case #3 show the same SINR value and are not discernible by SINR values. In this case, a different method is needed to determine interference generating resources.

More specifically, both of the strength of a D2D signal and the strength of interference are small in case #2, where the receiving SINR of a D2D signal is low. Since strength of a D2D signal is weak, it can be readily determined that the corresponding D2D signal has been transmitted from a long distance. And since interference strength is also weak, it can be determined that there are only a few UEs in the surroundings which cause interference. On the other hand, both of the values of the strength of a D2D signal and the strength of interference are large in case #3, where the receiving SINR of a D2D signal is low. In other words, a D2D signal is received from a relatively close distance, but it can be determined that there are UEs within a close distance which cause interference.

Since a neighboring UE using the same resources cause large interference in case #3, it is more advantageous to for a UE transmitting a D2D signal to change D2D signal transmission resources.

Therefore, if SINR is less than a predetermined threshold value according to the determination of a UE which has received a D2D signal, it can be determined that there is an interference-generating cause in the surroundings of the UE.

In particular, if the receiver energy level (namely RSSI) is larger than a predetermined threshold value or SINR is less than a predetermined threshold value, it may be determined that there is an interference-generating cause in the surroundings of the UE.

In other words, a receiving UE can determine the resources from which the corresponding D2D signal has been transmitted as the resources which have generated interference due to collision.

For example, if a UE receiving a D2D signal observes continuously that RSSI is larger than a predetermined threshold value, but SINR is less than a predetermined threshold value (for example, at consecutive subframes), the UE can determine that there is a neighboring UE which use the same resource, thereby generating interference.

From the determination, if it is determined that transmission resources of a D2D signal is influenced by interference, the D2D signal receiving UE transmits information of the interference-generating resources (namely interference resource information) to the UE which has transmitted the corresponding D2D signal according to the broadcasting scheme.

In other words, in case SINR is small (in particular, in case RSSI is large), the UE can transmit an indication signal (for example, a resource index) to command change of resources for transmission of a D2D signal.

On the contrary, the receiving UE can determine that the remaining resources except for those determined as generating interference due to collision do not generate interference.

However, if frequency hopping is applied for transmission of a D2D signal even when receiving sensitivity is good and measured interference is very small, resources for transmitting the next D2D signal can be changed. Therefore, in this case, instead of determining that the resources except for those resources determined as generating interference do not cause interference, the resources which do not generate interference can be determined separately.

To be more specific, if RSSI with respect to a received D2D signal is larger than a predetermined threshold value but SINR is also larger than a predetermined threshold value, it can be regarded that there is no interference-generating UE in the surroundings, and the received D2D signal originates within a close distance.

Also, if RSSI is less than a predetermined threshold but SINR is larger than a predetermined threshold, it can be regarded that it is a clear environment without interference or an environment with some degree of interference, but signals are received with relatively large strength.

In other words, a receiving UE can determine the resources which have transmitted the corresponding D2D signal as not generating interference due to collision.

Since the aforementioned case utilizes appropriate resources, there is no need to particularly change resources. Therefore, to this purpose, a signal informing of being unnecessary to change transmission resources may be transmitted. For example, in case a method which changes position of a resource frequently, such as hopping, is applied, an indication signal (for example, resource index) commanding not to change resources may be transmitted when SINR is large. In other words, a D2D signal receiving UE can transmit information of resources not generating interference (namely non-interference resource information) to the UE which has transmitted the corresponding D2D signal according to the broadcasting scheme.

Meanwhile, strength of a D2D signal transmitted from particular resources may be determined through a reference signal of a received D2D signal. In other words, strength of a D2D signal may be determined indirectly through the strength of a reference signal. In this case, the D2D signal includes the reference signal.

It should be noted that the term of reference signal is used for the convenience of descriptions, signals and channels transmitted to and from UEs can be used for the aforementioned use. For example, a discovery message/channel for discovery among UEs (namely PSDCH), synchronization signal for synchronizing UEs, channel for transmitting essential information for D2D communication (namely PSBCH), channel for transmitting control information required for D2D direct communication (namely PSCCH), and channel for transmitting data for D2D direct communication (namely PSSCH) can be used as the reference signal.

In other words, a channel for transmitting control information required for D2D direct communication to determine received strength of a discovery message (namely PSCCH) or a channel for transmitting data for D2D direct communication (namely PSSCH) can be used as the reference signal. On the contrary, a D2D discovery message may be used as the reference signal to determine received strength of a control channel of D2D direct communication (namely PSCCH) or received strength of a D2D direct communication data channel (namely PSSCH).

In what follows, described will be a method for transmitting interference resource information (and/or non-interference resource information).

1) First, indication information (namely interference resource information and/or non-interference resource information) can be transmitted being included in a discovery message/signal. In other words, a UE receiving a D2D signal to be transmitted to another UE can transmit interference resource information (and/or non-interference resource information) by including it in the discovery message/signal that the receiving UE transmits.

UEs receiving a D2D signal transmit interference resource information (and/or non-interference resource information) about the resources generating interference in a distributed manner to reduce interference, thereby reducing interference due to resource collision.

In case interference is generated, the UE can transmit interference resource information (and/or non-interference resource information) by piggybacking the information on the discovery message/signal (namely PSDCH) or D2D discovery sequence that the UE itself transmits periodically for D2D discovery.

By using the method above, interference can be reduced by transmitting a discovery signal periodically according to a current D2D discovery method without using a certain channel or interface, which will be described with reference to the related drawing below.

FIG. 32 illustrates an example of transmitting interference resource information according to one embodiment of the present invention.

If the UE which has received a D2D signal (namely D2D discovery message, PSCCH, or PSSCH) from other UEs detects severe interference at a D2D signal transmitted from the k-th resource index from among the received D2D signals, the UE can inform the UEs which use (or may use) the corresponding resources of the occurrence of severe interference by transmitting a discovery message together with the k-th resource information.

At this time, the index of a resource from which a D2D signal is transmitted can be determined sequentially according to a time-first scheme or frequency-first scheme for each D2D signal resource unit within a resource pool for the D2D signal (namely discovery resource pool, PSCCH resource pool, or PSSCH resource pool).

At this time, interference resource information (and/or non-interference resource information) can be piggybacked on a particular region within the resource unit to which a discovery message is transmitted. In other words, interference resource information (and/or non-interference resource information) can be mapped to a particular region (for example, one symbol) of the PSDCH.

As shown in FIG. 32, in case one symbol (for example the 6-th symbol of the second slot) is allocated within the discovery message (beacon in the example of FIG. 32) to transmit 12 bits, the total number of information that can be expressed is $2^{12}$=4096, and thus a maximum of 4096 D2D signal resources (namely discovery resource, PSCCH resource, or PSSCH resource) can be expressed (where QPSK 1/2 code and normal CP are assumed).

Also, the entire bits can be grouped by predetermined units, and a D2D signal resource (namely discovery resource, PSCCH resource, or PSSCH resource) may be indicated for each bit group. For example, the entire 12 bits are divided into 3 groups each of which comprising 4 bits, and 4 bits of each group can indicate a D2D signal resource (namely discovery resource, PSCCH resource, or PSSCH resource).

Also, the entire bits or bit groups may comprise the bits indicating interference resource indices and the bits indicating resource change. For example, in case 12 bits are used to indicate one resource, 11 bits can be used to indicate D2D signal resources (namely, discovery resources, PSCCH resources, or PSSCH resources) and the remaining one bit can be used to indicate whether to change transmission resources or not.

As described above, if one discovery resource unit comprises two resource blocks and one of them is allocated to handle information about resources generating interference and/or resources not generating interference, overhead measured about 7% (=12/168 bit) of the whole discovery resources can be generated.

2) Since an eNB is not defined in the public safety environment, a cluster head which functions the role of the eNB is selected, and UEs are synchronized with respect to the cluster head.

A cluster head periodically transmits a D2D synchronization signal/sequence for synchronization of D2D UEs, such as PSS/SSS, the synchronization signal of the eNB, or a message through a synchronization channel.

Also, in case UEs located at the cell edge performs D2D discovery or direct communication in a multi-cell environment with the UEs in a neighboring cell, the UEs at the cell edge may fail to synchronize with the UEs in the neighboring cell. To solve the synchronization problem, UEs located at the cell edge receive a synchronization signal coming from the eNB and transmits the synchronization signal to the UEs in the neighboring cell, thereby performing D2D discovery or direct communication operation among the UEs at the cell edge.

At this time, if interference occurs among UEs transmitting a D2D signal, a UE performing the role of a cluster head can inform the D2D UEs of interference resource information (and/or non-interference resource information) through a D2D synchronization signal/sequence or through a message on the synchronization channel.

On the other hand, in case the UE which has received a D2D signal does not perform the role of a cluster head, interference resource information (and/or non-interference resource information) can be transmitted through the cluster head UE. In other words, in case interference is developed among UEs transmitting D2D signals, D2D UEs inform the cluster head of the interference resource information (and/or non-interference resource information), and the cluster head can inform the D2D UEs of the interference resource information (and/or non-interference resource information) through a D2D synchronization information (and/or non-interference resource information) through a D2D synchronization signal/sequence transmitted periodically or through a message on the synchronization channel, which will be described with reference to the related drawing below.

FIG. 33 illustrates an example of transmitting interference resource information according to one embodiment of the present invention.

As shown in FIG. 33, information about resources generating interference and/or information about resources not generating interference can be transmitted by piggybacking the information on a D2D synchronization signal transmitted periodically.

If the UE which has received a D2D signal (namely D2D discovery message, PSCCH, or PSSCH) from other UEs detects severe interference at a D2D signal transmitted from the k-th resource index from among the received D2D signals, the UE can inform the UEs which use (or may use) the corresponding resources of the occurrence of severe interference by transmitting a discovery message together with the k-th resource information.

As described above, the index of a resource from which a D2D signal is transmitted can be determined sequentially according to a time-first scheme or frequency-first scheme for each D2D signal resource unit within a resource pool for the D2D signal (namely discovery resource pool, PSCCH resource pool, or PSSCH resource pool).

At this time, interference resource information (and/or non-interference resource information) can be piggybacked on part of the resource region to which a synchronization signal is mapped. For example, as shown in FIG. 33, interference resource information (and/or non-interference resource information) can be mapped to the last symbol in the region of the time domain to which a synchronization signal is mapped and to the subcarrier located at the center of the region of the frequency domain to which a synchronization signal is mapped.

Also, since a synchronization signal can be mapped to subcarriers out of 6 resource blocks (namely 72 subcarriers), the interference resource information (and/or non-interference resource information) can be mapped to 5 subcarriers at each of the both ends of the symbol to which the synchronization signal is transmitted.

As shown in FIG. 33, in case 12 bits are allocated to transmit interference resource information (and/or non-interference resource information) within a synchronization signal/sequence, the total number of information that can be expressed is $2^{12}$=4096, and thus a maximum of 4096 D2D signal resources (namely discovery resource, PSSCH resource, or PSSCH resource) can be expressed (where QPSK 1/2 code and normal CP are assumed).

Also, the entire bits can be grouped by predetermined units, and a D2D signal resource (namely discovery resource, PSCCH resource, or PSSCH resource) may be indicated for each bit group. For example, the entire 12 bits are divided into 3 groups each of which comprising 4 bits, and 4 bits of each group can indicate a D2D signal resource (namely discovery resource, PSCCH resource, or PSSCH resource).

Also, the entire bits or bit groups may comprise the bits indicating interference resource indices and the bits indicating resource change. For example, in case 12 bits are used to indicate one resource, 11 bits can be used to indicate D2D signal resources (namely, discovery resources, PSCCH resources, or PSSCH resources) and the remaining one bit can be used to indicate whether to change transmission resources or not.

3) Also, interference resource information (and/or non-interference resource information) can be transmitted to a scheduling assignment used for delivering resource allocation information of a D2D direct communication data channel (namely PSSCH), HARQ parameters, and so on.

As described above, when interference resource information (and/or non-interference resource information) is transmitted through a discovery message or a synchronization signal, the interference resource information (and/or non-interference resource information) can be transmitted according to the broadcasting scheme; however, this method transmits interference resource information (and/or non-interference resource information) to the UE which has transmitted the corresponding signal (namely a plurality of UEs which use the same resources) according to the unicasting scheme.

For example, as in the previous embodiment, if 12 bits are allocated to transmit interference resource information (and/or non-interference resource information), the total number of information that can be expressed is $2^{12}$=4096, and thus a maximum of 4096 D2D signal resources (namely discovery resource, PSCCH resource, or PSSCH resource) can be expressed (where QPSK 1/2 code and normal CP are assumed).

Also, the entire bits can be grouped by predetermined units, and a D2D signal resource (namely discovery resource, PSCCH resource, or PSSCH resource) may be indicated for each bit group. For example, the entire 12 bits are divided into 3 groups each of which comprising 4 bits, and 4 bits of each group can indicate a D2D signal resource (namely discovery resource, PSCCH resource, or PSSCH resource).

Also, the entire bits or bit groups may comprise the bits indicating interference resource indices and the bits indicating resource change. In other words, interference resource information can include interference resource index information and resource change indication information. For example, in case 12 bits are used to indicate one resource, 11 bits can be used to indicate D2D signal resources (namely, discovery resources, PSCCH resources, or PSSCH resources) and the remaining one bit can be used to indicate whether to change transmission resources or not.

Also, scheduling assignment can be used not only for assigning a schedule of a data channel but also for delivering collision indication and re-allocating resources.

In this case, interference resource information may include resource re-allocation information. A D2D signal receiving UE can prevent collision of D2D signal transmission resources while transmitting only resource re-allocation information for transmission of a D2D signal (namely index of a resource which does not generate interference).

Also, by delivering resource re-allocation information (namely an index of a resource which does not generate interference) together with an indication signal which indicates occurrence of collision, it is possible to let the UE know why resources have been changed.

Also, the scheduling assignment is made to deliver only indication information for indicating occurrence of collision while the remaining bits are utilized as redundant bits for obtaining channel coding gain. If a UE which has transmitted a D2D signal receives indication information indicating occurrence of interference from a D2D signal receiving UE while performing resource hopping at regular intervals, resources may be reset at the start of the hopping pattern; or current resources may be utilized until preset time, and resource position may be changed after a predetermined time period or at a particular subframe appearing after a predetermined time period (for example, subframe #0).

FIG. 34 illustrates a method for reducing interference in D2D communication according to one embodiment of the present invention.

With reference to FIG. 34, a UE receives a D2D signal from other UE(s) S3401.

At this time, a D2D signal refers to a discovery message/signal (namely PSDCH) that a D2D UE can transmit by selecting resources from a resource pool in an arbitrary manner or control information (namely PSCCH) for direct communication or direct communication data (namely PSSCH).

The UE determines whether interference is generated from the resource from which a received D2D signal has been transmitted S3403.

The UE determines on the basis of strength of a received D2D signal and strength of interference whether the resources from which the corresponding D2D signal has been transmitted receive interference from other UE(s) (namely whether collision of a D2D signal has occurred).

For example, the UE can determine that interference has been generated if SINR measured over the resources from which the D2D signal has been transmitted is less than a predetermined threshold value. Also, if SINR measured over the resources from which the D2D signal has been transmitted is less than a predetermined threshold value and RSSI is larger than a predetermined threshold value, the UE may determine that interference has been generated.

Also, the UE determines on the basis of strength of a received D2D signal and strength of interference whether the resources from which the corresponding D2D signal has been transmitted receive interference from other UE(s).

For example, if SINR measured over the resources from which a D2D signal has been transmitted is larger than a predetermined threshold value and RSSI is larger than a predetermined threshold value, the UE may determine that interference has not been generated. Also, if SINR measured over the resources from which a D2D signal has been transmitted is larger than a predetermined threshold value and RSSI is less than a predetermined threshold value, the UE may determine that interference has not been generated.

The UE transmits interference resource information for indicating that interference has been generated from the resources which have transmitted the D2D signal and/or non-interference resource information for indicating that interference has not been generated from the resources which have transmitted the D2D signal S3405.

At this time, interference resource information or non-interference resource information can indicate the index of a time/frequency resource from which a D2D signal has been transmitted.

Interference resource information and/or non-interference resource information can be transmitted through one of a discovery sequence/preamble, discovery message/channel (namely PSDCH), synchronization signal, synchronization message/channel, broadcast channel (namely PSBCH), data channel for D2D direct communication (namely PSSCH), and scheduling assignment with respect to a data channel for D2D direct communication (namely PSCCH). Also, if cellular communication is possible, resources generating interference may be indicated through cellular communication.

A UE which has received the interference resource information changes transmission resources of a D2D signal.

Also, a UE receiving non-interference resource information retains transmission resources of a D2D signal.

In other words, if interference resource information is transmitted being piggybacked on a discovery message, the UE which uses colliding resources determines that interference is being generated and reselects resources. For example, if the resource index indicated by interference resource information is 8, UEs using a resource index 8 determine that discovery resources being transmitted are generating interference and reselect the discovery resources to reduce interference. If a method for selecting discovery resources selects discovery resources in a random fashion, the discovery resources can be reselected again in an arbitrary manner. Also, if discovery resources are selected arbitrarily while the energy level of the resources is within a predetermined range (for example, within a lower x (where x is an arbitrary integer such that x=5, 7, 10, and the like) percent of the whole energy level), the resources previously selected (namely the resources indicated by interference resource information) are excluded, and other resources are selected arbitrarily again within a predetermined range of energy level.

As described above, if interference is removed (or reduced) with the help of UEs in a distributed manner according to the present invention, interference can be removed by using an existing discovery message or synchronization signal, which can be performed without introducing a newly defined, particular protocol or interface among D2D UEs. In this way, if colliding resources are detected and UEs are allowed to reselect the resources, UEs can improve receiving SINR by reducing interference among the UEs in a distributed manner without involving a controller such as an eNB, leading to improvement of performance of D2D discovery or D2D direct communication.

General Wireless Communication Device to which an Embodiment of the Present Invention May be Applied FIG. 35 illustrates a block diagram of a wireless communication device according to an embodiment of the present invention.

Referring to FIG. 35, the wireless communication system includes an eNB 3510 and a plurality of UEs 3520 placed within the area of the eNB 3510.

The eNB 3510 includes a processor 3511, memory 3512, and a Radio Frequency (RF) unit 3513. The processor 3511 implements the functions, processes and/or methods proposed with reference to FIGS. 1 to 34. The layers of the radio interface protocol may be implemented by the processor 3511. The memory 3512 is connected to the processor 3511 and stores various types of information for driving the processor 3511. The RF unit 3513 is connected to the processor 3511 and sends and/or receives radio signals.

The UE 3520 includes a processor 3521, memory 3522, and an RF unit 3523. The processor 3521 implements the functions, processes and/or methods proposed with reference to FIGS. 1 to 34. The layers of the radio interface protocol may be implemented by the processor 3521. The memory 3522 is connected to the processor 3521 and stores various types of information for driving the processor 3521. The RF unit 3523 is connected to the processor 3521 and sends and/or receives radio signals.

The memory 3512, 3522 may be placed inside or outside the processor 3511, 3521 and may be connected to the processor 3511, 3521 by well-known various means. Furthermore, the eNB 3510 and/or the UE 3520 may have a single antenna or multiple antennas.

Hereinafter, detailed embodiments of the present invention are described in detail with reference to the accompanying drawings. Each of elements or characteristics may be considered to be optional unless otherwise described explicitly. Each element or characteristic may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for reducing interference of D2D communication in a wireless communication system according to an embodiment of the present invention has been illustrated as being applied to 3GPP LTE/LTE-A systems, but may be applied to various wireless communication systems other than the 3GPP LTE/LTE-A systems.

The invention claimed is:

1. A method for reducing interference in Device-to-Device (D2D) communication in a wireless communication system supporting D2D communication, the method comprising:

receiving, by a user equipment (UE), a D2D signal;

determining, by the UE, whether interference is generated from a resource in which the D2D signal has been transmitted; and when it is determined that interference is generated from the resource in which the D2D signal has been transmitted, transmitting, by the UE, interference resource information for indicating that interference has been generated from the resource in which the D2D signal has been transmitted, wherein the D2D signal is transmitted by hopping over a different resource for each period according to a hopping pattern, and wherein when the interference resource information is received while the D2D signal is being hopped, the hopping pattern for the D2D signal is reset to a start of the hopping pattern.

2. The method of claim 1, wherein the D2D signal is one of a Physical Sidelink Discovery Channel (PSDCH), a Physical Sidelink Shared Channel (PSSCH) and a Physical Sidelink Control Channel (PSCCH).

3. The method of claim 1, wherein, if Signal to Interference plus Noise Ratio (SINR) measured over the resource in which the D2D signal has been transmitted is less than a predetermined threshold value, it is determined that interference has been generated.

4. The method of claim 1, wherein, if Signal to Interference plus Noise Ratio (SINR) measured over the resource in which the D2D signal has been transmitted is less than a predetermined threshold value and Received Signal Strength Indicator (RSSI) is larger than a predetermined threshold value, it is determined that interference has been generated.

5. The method of claim 1, wherein the interference resource information includes an index of a time/frequency resource in which the D2D signal has been transmitted.

6. The method of claim 1, wherein the interference resource information is transmitted from one of a Physical Sidelink Discovery Channel (PSDCH), a synchronization signal and a Physical Sidelink Control Channel (PSCCH).

7. The method of claim 6, wherein, when the interference resource information is transmitted on the PSCCH, the interference resource information includes resource re-allocation information for transmission of the D2D signal.

8. The method of claim 6, wherein, when the interference resource information is transmitted on the PSDCH, the interference resource information is mapped to one symbol within a resource unit of the PSDCH.

9. The method of claim 6, wherein, when the interference resource information is transmitted on the synchronization signal, the interference resource information is mapped to the last symbol within the region to which the synchronization signal is transmitted.

10. The method of claim 1, further comprising transmitting, by the UE, non-interference resource information for indicating that interference has not been generated from the resource in which the D2D signal has been transmitted if it is determined that interference is not generated from the resource in which the D2D signal has been transmitted.

11. The method of claim 10, wherein, if Signal to Interference plus Noise Ratio (SINR) measured over the resource in which the D2D signal has been transmitted is larger than a predetermined threshold value and Received Signal Strength Indicator (RSSI) is larger than a predetermined threshold value, it is determined that interference has not been generated.

12. The method of claim 10, wherein, if Signal to Interference plus Noise Ratio (SINR) measured over the resource in which the D2D signal has been transmitted is larger than a predetermined threshold value and Received Signal Strength Indicator (RSSI) is less than a predetermined threshold value, it is determined that interference has not been generated.

13. A user equipment (UE) for reducing interference in Device-to-Device (D2D) communication in a wireless communication system supporting D2D communication, the UE comprising:

a transceiver to transmit and receive a radio signal; and
a processor, wherein the processor is configured to:
receive a D2D signal,
determine whether interference is generated from a resource in which the D2D signal has been transmitted, and
when it is determined that interference is generated from the resource in which the D2D signal has been transmitted, transmit interference resource information for indicating that interference has been generated from the resource in which the D2D signal has been transmitted,
wherein the D2D signal is transmitted by hopping over a different resource for each period according to a hopping pattern, and
wherein when the interference resource information is received while the D2D signal is being hopped, the hopping pattern for the D2D signal is reset to a start of the hopping pattern.

\* \* \* \* \*